Jan. 25, 1966  F. M. GOETZ ETAL  3,231,866
TRAFFIC DATA PROCESSING SYSTEM
Filed Sept. 8, 1961  38 Sheets-Sheet 1

INVENTORS  F. M. GOETZ
V. L. RANSOM
C. R. TRENDOWSKI
BY Howard R Popper
ATTORNEY

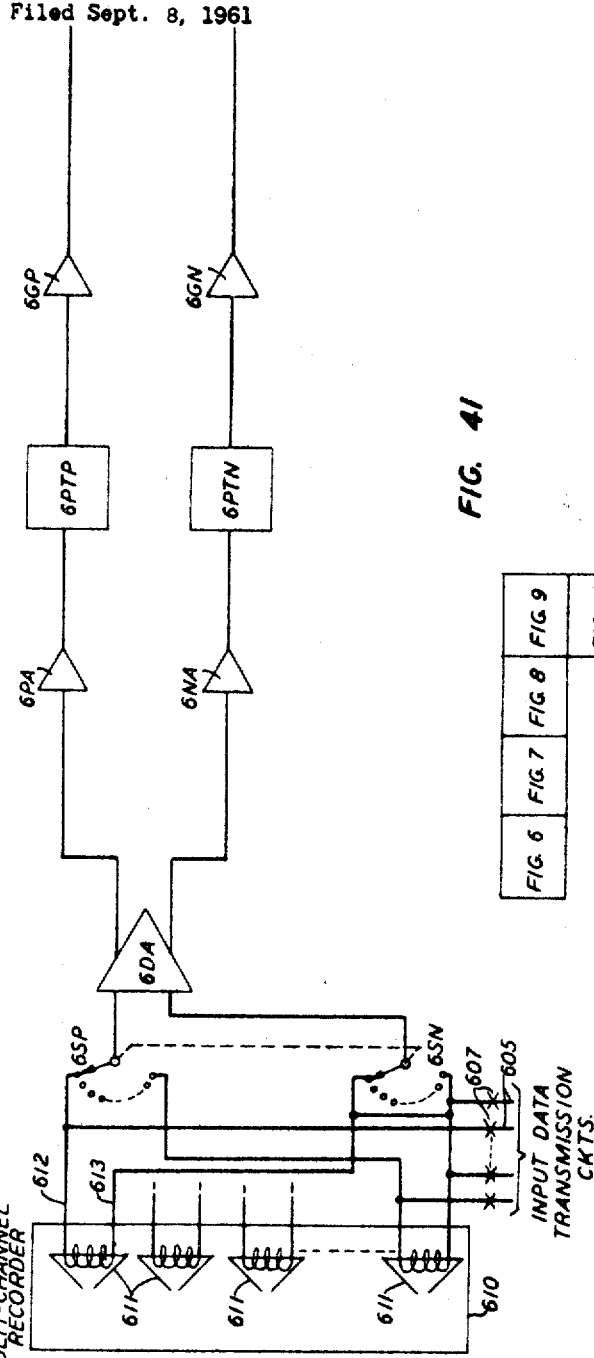

INVENTORS F. M. GOETZ
V. L. RANSOM
C. R. TRENDOWSKI

BY Howard R. Popper

ATTORNEY

INVENTORS F. M. GOETZ
V. L. RANSOM
C. R. TRENDOWSKI

BY Howard R Popper
ATTORNEY

Jan. 25, 1966  F. M. GOETZ ETAL  3,231,866
TRAFFIC DATA PROCESSING SYSTEM
Filed Sept. 8, 1961  38 Sheets-Sheet 23

FIG. 25

INVENTORS
F. M. GOETZ
V. L. RANSOM
C. R. TRENDOWSKI
BY
Howard R. Popper
ATTORNEY INVENTORS
F. M. GOETZ
V. L. RANSOM
C. R. TRENDOWSKI
BY Howard R. Popper
ATTORNEY INVENTORS F. M. GOETZ
V. L. RANSOM
C. R. TRENDOWSKI
BY Howard R. Popper
ATTORNEY 3,231,866
TRAFFIC DATA PROCESSING SYSTEM
Frank M. Goetz, Franklin Square, and Victor L. Ransom, Hollis, N.Y., and Chester R. Trendowski, Caldwell Township, Essex County, N.J., assignors to Bell Telephone Laboratories, Incorporated, New York, N.Y., a corporation of New York
Filed Sept. 8, 1961, Ser. No. 136,880
26 Claims. (Cl. 340—172.5)

This invention relates to data processing equipment and more particularly to data processing equipment for analyzing statistical data and for providing a readily interpretable record in accordance with the analysis.

A major concern in nearly every field of business today is efficient and effective operation and utilization of equipment. Ever continuing analysis of the various factors and conditions affecting the efficiency and the effectiveness of business operation yields tremendous amounts of statistical data which must be sorted and summarized for proper and ready interpretation. The accumulation and processing of these large quantities of statistical data in themselves present numerous considerations related to efficiency and effectiveness. The data must be obtained and placed in usable form with a minimum of labor and cost, and the processing must be done rapidly and with a minimum of error. These considerations, as well as the quantity of data which can be accumulated and processed, are principally determined by the degree of mechanization and by the techniques employed. Accordingly, the increased mechanization of accumulation and processing of statistical data is of considerable importance today in order to provide the data in an accurate and readily interpretable form with greater speed and economy.

In the telephone industry, for example, studies are conducted to determine the effectiveness and efficiency of telephone equipment utilization to provide satisfactory service to all telephone customers, while maintaining maximum economy of operation consistent therewith. The studies are conducted regularly and periodically since the conditions affecting telephone service vary greatly according to the class of service, the hours of the day, the days of the week, the seasons of the year, current trends, and numerous other factors. The tremendous quantities of data obtained from such telephone traffic studies must be sorted, summarized and processed into a usable form for proper interpretation. Interpretation of the data facilitates the proper assignment and disposition of the various telephone lines and equipments, determines the quantities of equipment necessary to handle given volumes of telephone traffic, and provides information for future planning with regard to probable telephone equipment requirements. Thus, sufficiency of present units of equipment may be determined, units may be relocated to areas of greater need, additional units may be allotted, the number of circuits between exchanges altered, or other appropriate action taken to provide optimum service consistent with overall economy of operation.

The data obtained in these traffic studies may take various forms, but it is principally of two types. One of these types of data relates to traffic volumes, or "peg counts," and provides information on how many calls were made, or how often the particular unit of equipment was used in a given period of time. This traffic data may be obtained by connecting monitoring equipment to the various units of telephone equipment to be observed and registering an indication upon the seizure of the unit of equipment. No regard is given to the length of time the unit of equipment is seized, but only to the total number of seizures. Peg count data is necessarily obtained, therefore, on a random basis. The other type of data principally obtained from traffic studies relates to traffic density, or percentage usage of the various units of equipment, and provides information combining the number of seizures and the period of seizures. This usage data may be obtained by repeatedly scanning the various units of equipment at regular intervals and registering indications of whether the individual units of equipment are seized at the time of the scan. By assuming that a seizure which is present at the time of the scan exists for the interval beween successive scans, then each indication registered is indicative of a precise period of usage of the individual unit of equipment being measured. Proper selection of the scanning interval provides the usage data in standard units of traffic measurement; for example, a scanning rate of thirty-six scans per hour produces usage indications in terms of hundred call seconds (CCS).

Various traffic measuring equipments are known in the art for obtaining peg count data and for obtaining traffic usage data. For example, in patent application Serial No. 1602, filed Jan. 11, 1960, by D. H. Barnes, traffic measuring equipment is disclosed for obtaining both peg count and usage data in a form wherein the data is peculiarly identified with the particular units of telephone equipment from which it is derived. The measuring equipment disclosed therein monitors the desired units of equipment and encodes in reflected binary notation the observed condition thereof, whether the information is received on a random basis or on a sequentially sampled basis. The data is encoded to peculiarly identify the particular unit of observed equipment from which the data is obtained.

Before the accumulated statistical data can be of practical use, heretofore considerable time and energy have been required in compiling, interpreting and summarizing such data into basic units of traffic measurement. The time and effort required in processing the data to place it in a usable form necessarily limits the quantity of data that can be accumulated and processed economically. Further, manual and clerical manipulations of the data have been a major source of error therein. Therefore, it is desirable to accumulate and process the statistical data automatically by centralized traffic data processing equipment. Such processing equipment should be capable of receiving traffic data directly from monitoring equipment, such as disclosed in the above-mentioned Barnes application, of analyzing the data, and of producing therefrom a readily interpretable record, without the need for intervening manual or clerical processes. Moreover, the centralized data processing equipment should be capable of receiving the data from a plurality of diversely-situated traffic monitoring equipments simultaneously, and of processing the accumulated data very rapidly and accurately.

Accordingly, it is a general object of this invention to provide a simple, economical and compact traffic data processing system which automatically analyzes statistical traffic data from a large number of telephone equipment units.

It is another object of this invention to provide a data processing system which analyzes traffic data with greater accuracy and greater speed than heretofore possible.

It is another object of this invention to provide a data processing system which produces a readily interpretable traffic record automatically from encoded statistical traffic data.

Another object of this invention is to provide an automatic traffic data processing system to eliminate the necessity of manual or clerical manipulations.

In an illustrative embodiment of the present invention the foregoing and other objects are accomplished by a traffic data processing system which receives traffic data from a plurality of traffic measuring equipments, sorts and summarizes the data on an individual basis and on a group basis, and transfers the processed data to a final storage medium from which desired data may be selected and a printed record thereof made. The data received from the plurality of traffic measuring equipments is collected from each simultaneously and serially recorded in respective individual magnetic tracks of an input storage medium. The data advantageously consists of symmetrical composite blocks of statistical traffic information collected over a period of time, e.g., one hour, and includes encoded identity data identifying each particular block of traffic information with respect to the traffic measuring equipment from which the data is received. The traffic data within the composite block is encoded to identify the individual units of observed telephone equipment from which the data is obtained. The identity data is associated with the traffic data during processing and is transferred with the processed traffic data to the final storage medium, thus enabling subsequent identification of desired data for printing a record thereof.

Accordingly, a feature of this invention relates to a traffic data processing system comprising apparatus for storing traffic data and identity data from a plurality of observed units in the form of coded signals, circuitry for distinguishing between the traffic data and the identity data for sorting and summarizing the traffic data and transferring it along with the associated identity data to semipermanent storage apparatus, and circuitry for selecting desired data and producing a permanent record therefrom.

The recordation of the input traffic data is accomplished at minimum recording speed to permit the maximum amount of data to be recorded in a given length of magnetic track and to maximize the ratio of playback speed to recording speed. A large speedup ratio for playback permits the centralized processing equipment to be time-shared among the plurality of diversely-situated traffic measuring equipments. Thus, the traffic data recorded on each magnetic track of the input storage medium may be independently processed, one track at a time, and transferred to a final storage medium. Due to the symmetry of the composite blocks of input traffic information and the logic circuitry of the processing equipment, processing may be accomplished advantageously with the input magnetic storage medium moving in either the forward or the reverse direction. This permits the successive processing of the data without it being necessary to renormalize the storage medium each time. Thus, the data on one track of the storage medium may be processed while the medium moves in the forward direction; and subsequently, the data on another track may be processed while the medium moves in the reverse direction.

Therefore, a further feature of this invention relates to centralized traffic data processing circuitry for receiving traffic data from a plurality of diversely situated traffic monitoring equipments, for simultaneously recording the traffic data in respective individual tracks of a magnetic storage medium, and for subsequently processing the recorded data on respective tracks on a time-shared basis in alternate directions of play-back movement of the storage medium.

In the illustrative embodiment of the present invention the traffic data recorded on the input storage medium is sorted and summarized on both an individual basis and a group basis, and is temporarily stored in a summarization storage medium comprising a plurality of storage registers.

As the serially recorded data is read from the input storage medium, each word is converted to parallel form and gated into an access register where it is checked for error. If a traffic data error is detected the word is discarded as data, and a count thereof is made in a specified error location in the summarization store. The count of errors thus detected provides a "figure of merit" on the overall reliability of the data processing system. After the word is determined to be complete and correct, subsequent processing depends upon whether the word contains identity data or traffic data. Assuming the presence of identity data, the procedure is to transfer the word directly to one of the identity registers in the summarization store. Such transfer of identity data is effected, upon recognition thereof via a program circuit, by addressing a predetermined one of the identity registers and gating the identity data thereto. However, if the word in the access register contains traffic data, the individual register in the summarization store temporarily associated with the telephone circuit from which the traffic data obtained is addressed and the traffic count stored thereat is numerically increased. It is convenient to consider the traffic data, or words containing traffic information, as an address in the summarization store, i.e., as information for selecting the particular register associated with the origin of the traffic data. Therefore, the gating of the traffic data to address register translation circuitry enables the selection of the particular register whereat the traffic count is to be increased. Thereupon add-one circuitry, including the access register, functions to increase the count stored in the addressed summarization store register numerically by one.

After the traffic count has been registered in the summarization register associated with the individual unit of observed equipment from which the data derived, it may be desired to register the traffic count further on an arbitrary group basis. A determination is made in the program circuit of the particular group to which this individual unit belongs and the traffic data word in the address translation circuitry is modified to address the appropriate group summarization register. The add-one circuitry is energized to increase the count stored in the addressed group register numerically by one.

Accordingly, it is another feature of this invention that a traffic data processing system include a summarization storage medium having a plurality of traffic data registers individually associated with the monitored circuits from which the data is obtained and having a plurality of identity data registers associated with the particular traffic monitoring equipment.

It is a further feature of this invention that a traffic data processing system include circuitry for distinguishing between traffic data and identity data, circuitry for transferring the identity data directly to the identity registers in the summarization storage medium, and address translation circuitry responsive to the detection of traffic data for selectively addressing the respective traffic registers.

A still further feature of this invention relates to the add-one circuitry for numerically increasing the traffic data count stored in the respective registers addressed by the address translation circuitry.

Another feature of this invention relates to the provision of circuitry for providing an indication of the reliability of the summarized traffic data including error-count registers in the summarization store and circuitry responsive to the detection of errors in the traffic data for storing an indication thereof in the error-count registers.

Still another feature of this invention pertains to a traffic data processing system including circuitry for automatically analyzing and processing traffic data on an individual basis and on a group basis.

Another feature in accordance with this invention relates to the provision of circuitry for determining the arbitrary group to which an individual observed unit belongs and for modifying the traffic data therefrom to selectively address special group registers in the summarization store to increase numerically the count stored thereat.

A further feature in accordance with this invention pertains to the provision of registers in the summarization store having various count capacities, means for associating these registers with observed units in accordance with the probable quantities of data to be received therefrom, and circuitry responsive to the count capacity of a register and a capacity count stored therein for selectively recycling predetermined ones of the registers.

After a composite block of data from one of the tracks of the input storage medium has been sorted and summarized, a readily interpretable record may be printed therefrom. The summarized data and associated identity data is called out of the summarization store in an orderly sequential fashion to provide a printed or punched record through suitable translation circuitry. It is desirable to remove the data from the store as rapidly as possible to release it for use in processing the next composite block of data. However, printing and punching apparatus is necessarily limited by mechanical manipulations. Therefore a semipermanent, buffer storage medium, e.g., a magnetic tape, is employed to receive and store the processed data from the summarization store and, subsequently, to provide the data to the output recording apparatus to generate a readily interpretable printed record. The identity data associated with each block of summarized traffic data peculiarly identifies that block of data and permits the location thereof through scanning of the buffer storage medium. Accordingly, when it is desired to print out only a particular block of summarized traffic data, the buffer storage medium is scanned until the particular block of data is located through recognition of the associated identity data, whereupon only the desired data is directed to the output recording apparatus. Advantageously, subsequent blocks of traffic information may be processed concurrently with the scanning and printing operation.

Therefore, a further feature of this invention pertains to circuitry for automatically recognizing the receipt and processing of a complete block of traffic information and for transferring the processed traffic data and associated identity data to a semipermanent storage medium, thereby releasing the summarization store immediately for processing subsequent blocks of traffic information.

A still further feature of this invention pertains to circuitry for modifying at least a portion of the associated identity data to provide a unique identity code therewith, and to circuitry for scanning the data in the semipermanent storage medium and responsive to the concurrent detection of particular identity data and the unique identity code for selectively printing a record of desired summarized traffic data and associated identity data.

Another feature of this invention relates to circuitry responsive to the completed transfer of the summarized traffic data and associated identity data from the summarization store to the semipermanent storage medium for immediately printing a record of the data and to circuitry for selectively inhibiting the operation of the printing circuitry to print a record of only particular summarized traffic data.

Yet another feature of this invention relates to centralized traffic data processing circuitry for processing a block of traffic information to produce summarized traffic data and for concurrently printing a record of the summarized traffic data from a priorly processed block of traffic information.

The above and other objects and features of this invention will be better understood upon consideration of the following description and the accompanying drawing, in which:

FIGS. 1 through 3 comprise a block diagram representation of a traffic data processing system in accordance with the principles of the present invention;

FIG. 4 shows the arrangement of FIGS. 1 through 3;

FIG. 5 illustrates a typical recordation pattern of a composite block of statistical traffic information;

FIGS. 6 through 40 comprise a schematic diagram of a specific illustrative embodiment of the invention;

FIG. 41 shows the arrangement of FIGS. 6 through 40; and

Figure 31:
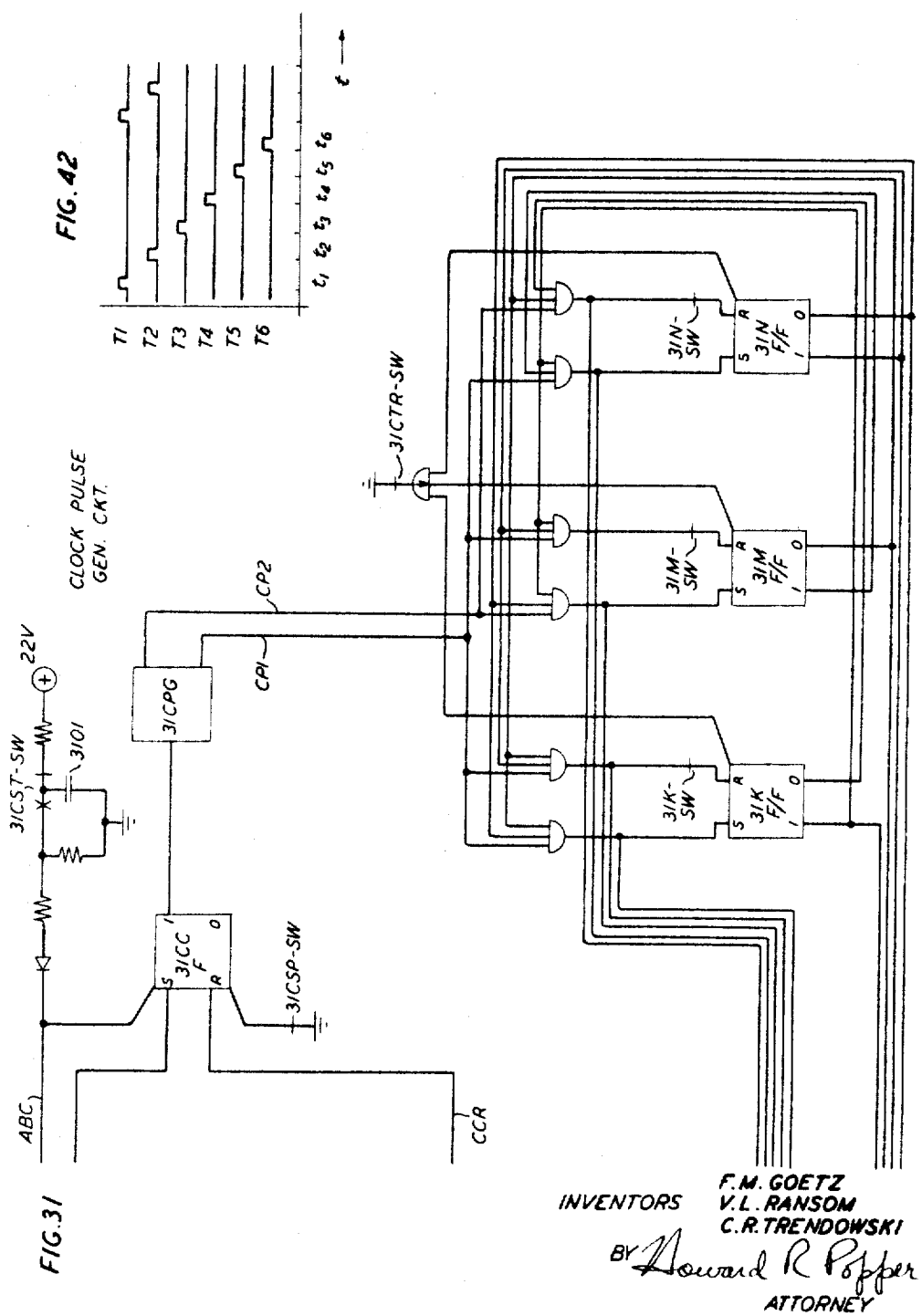
Figure 32:
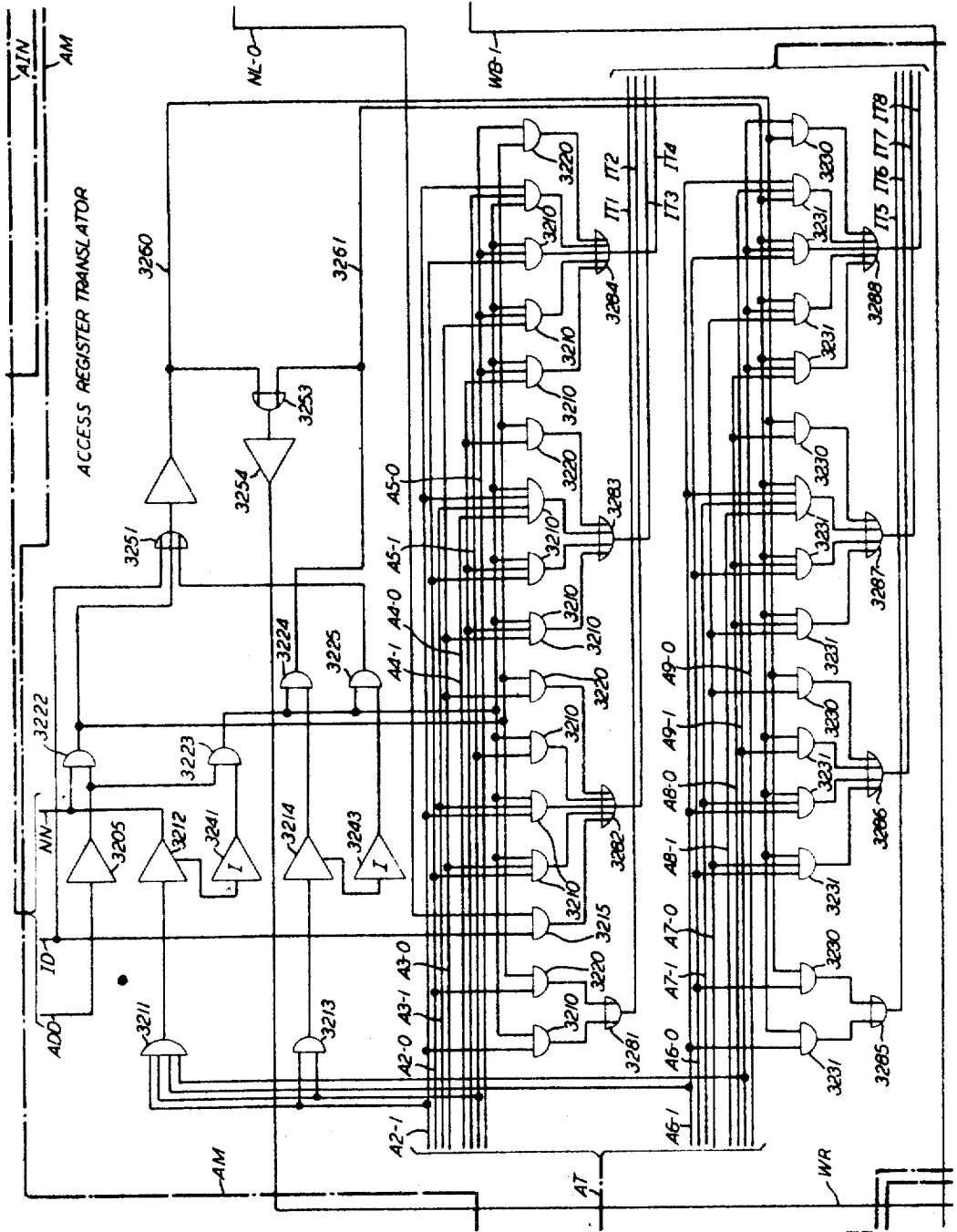
Figure 33:
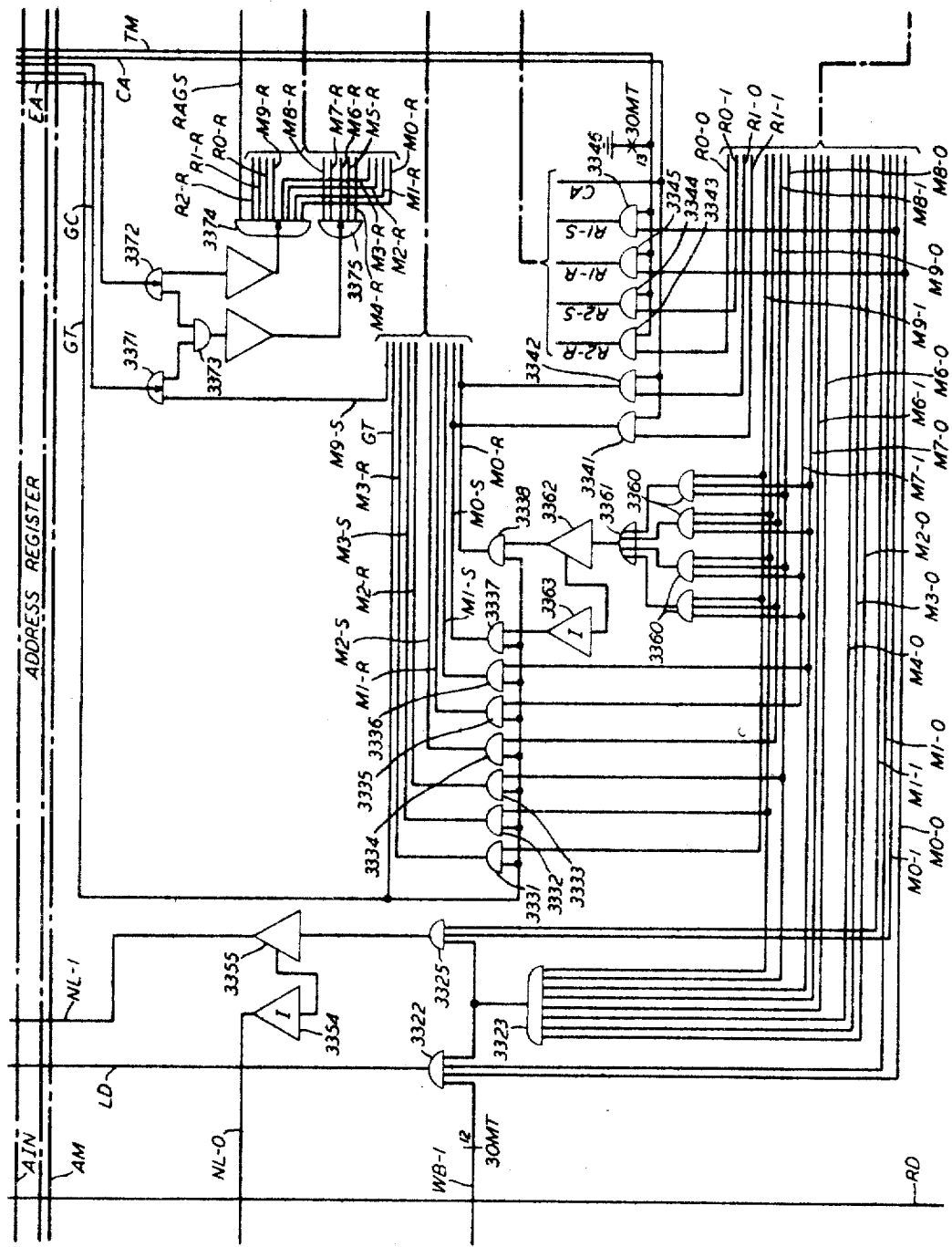
Figure 34:
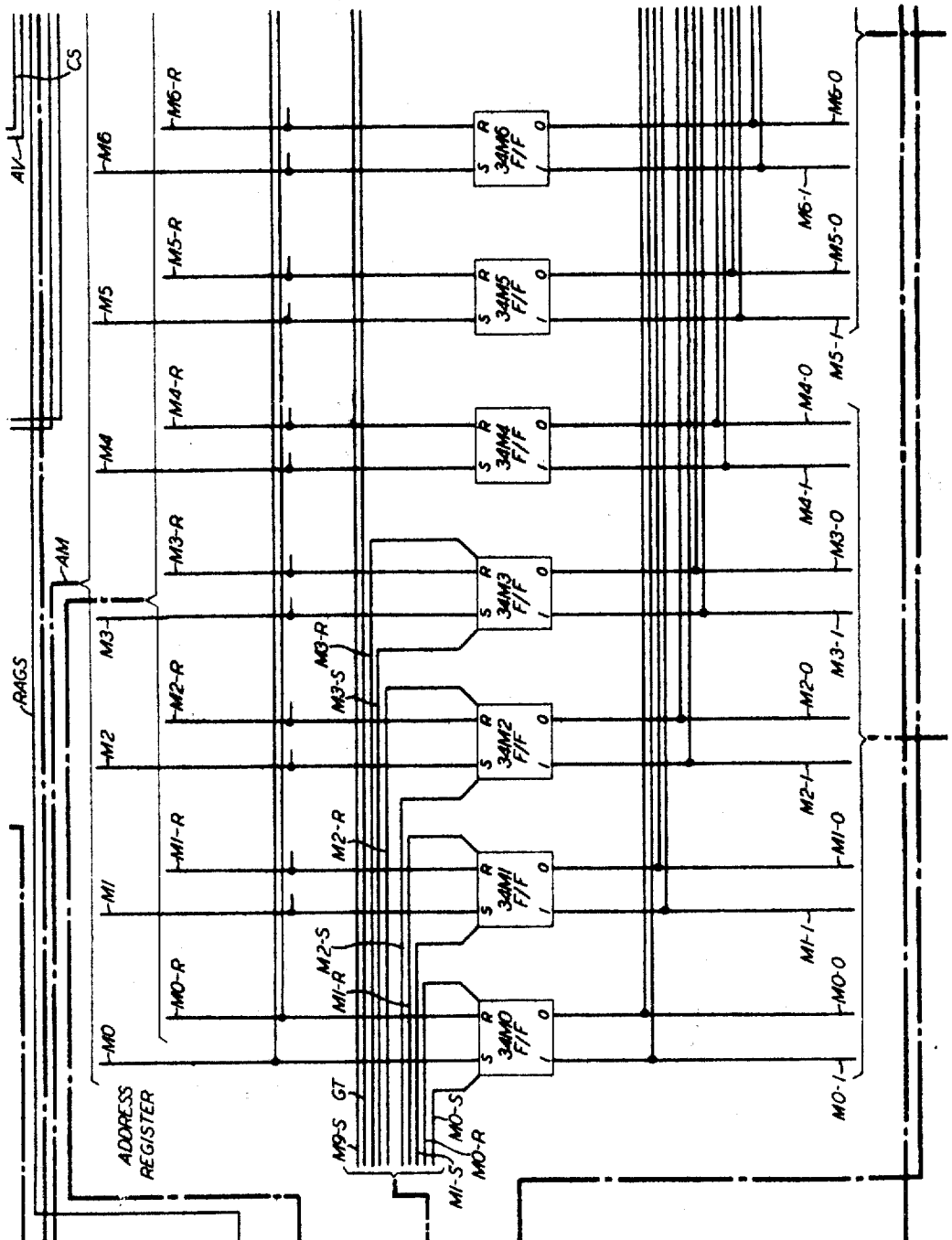
Figure 35:
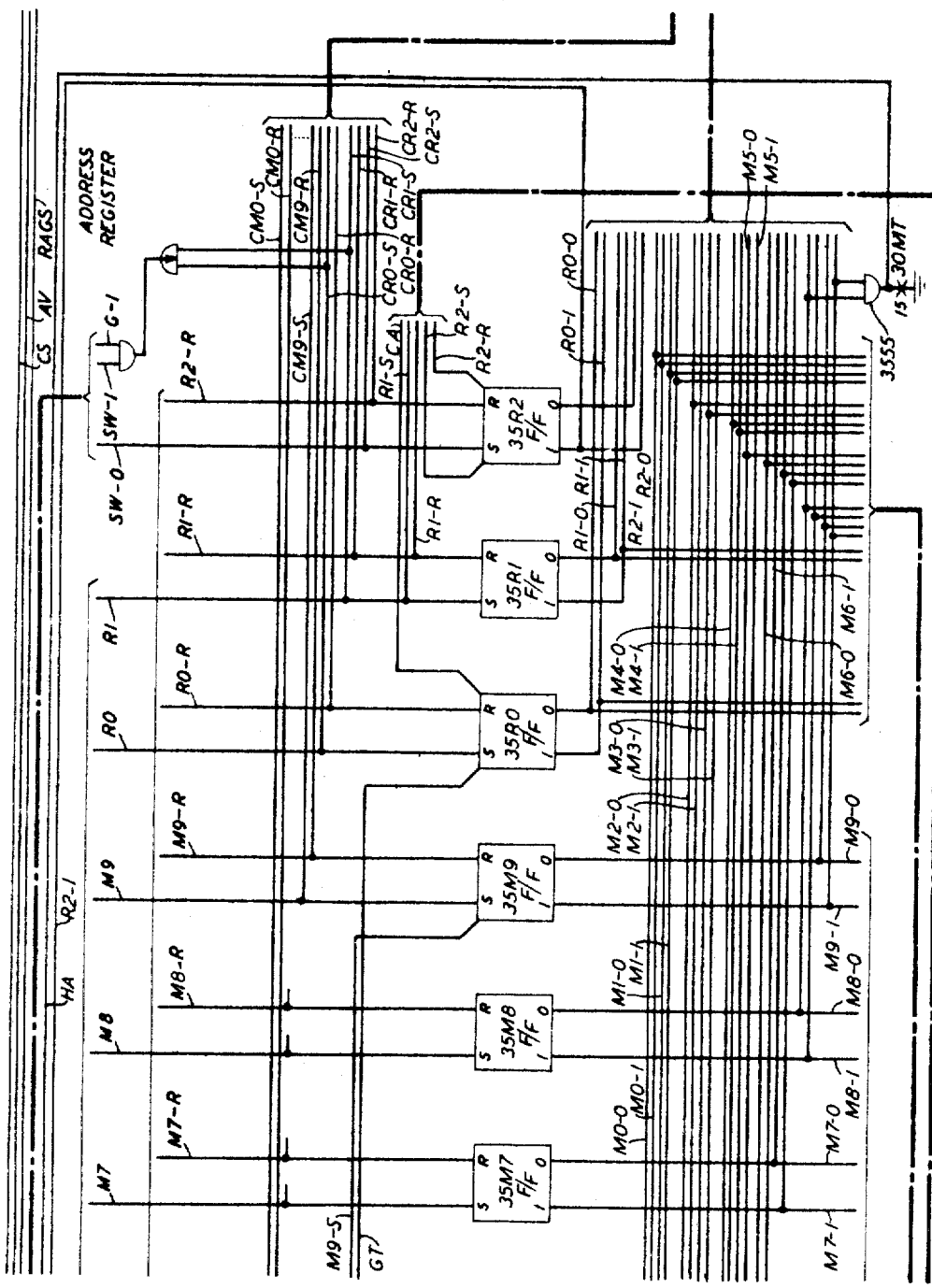
Figure 36:
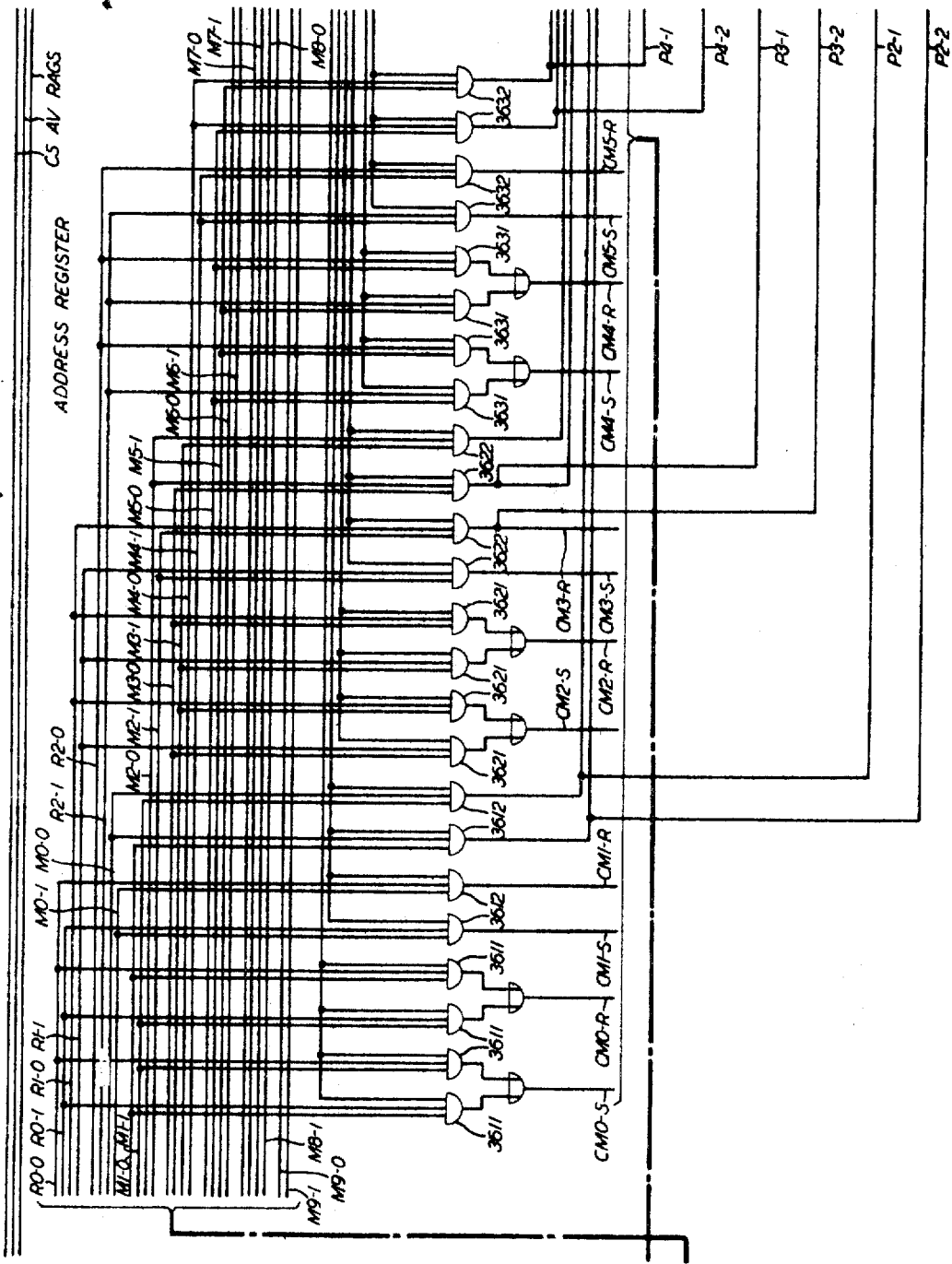
Figure 37:
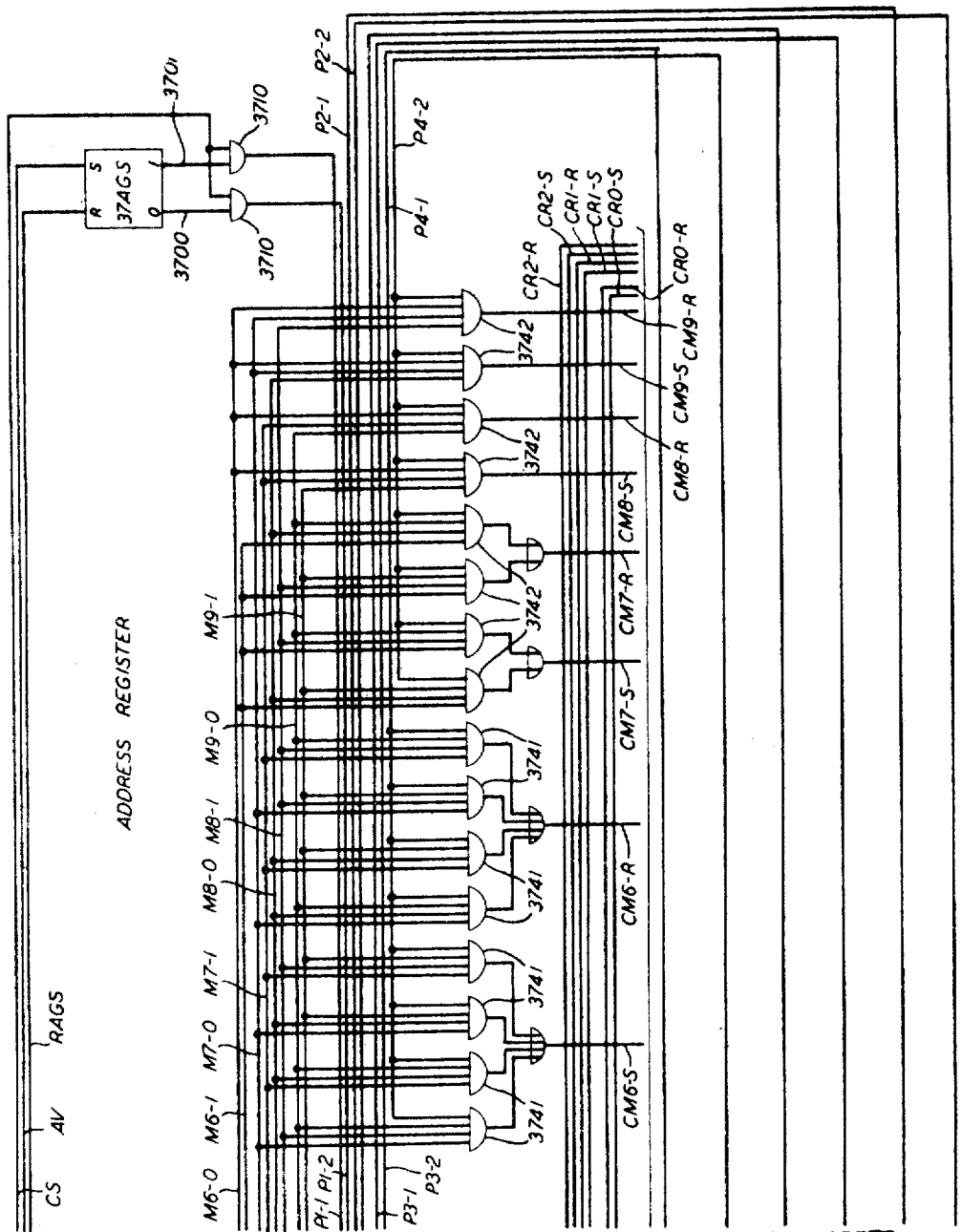
Figure 38:
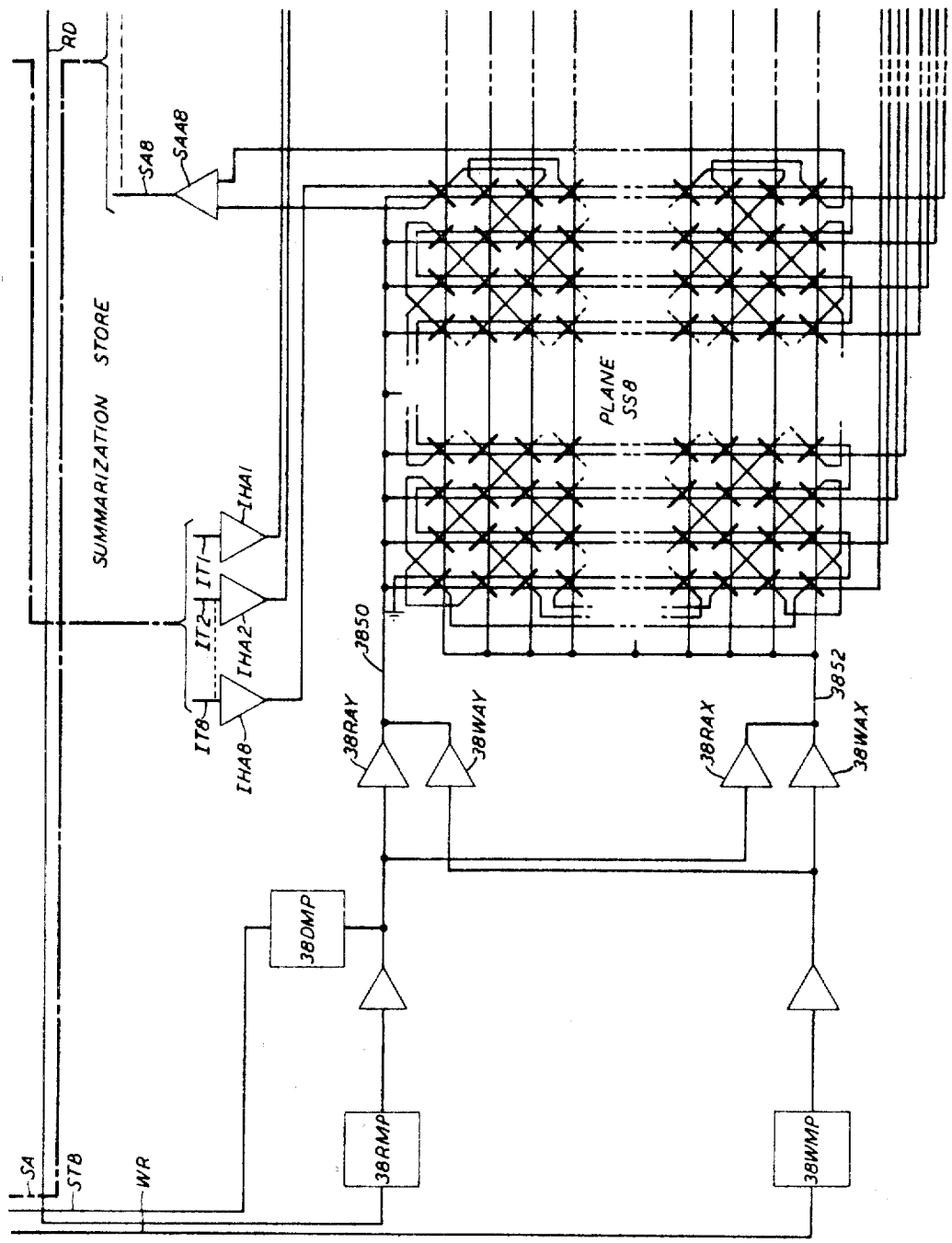
Figure 39:
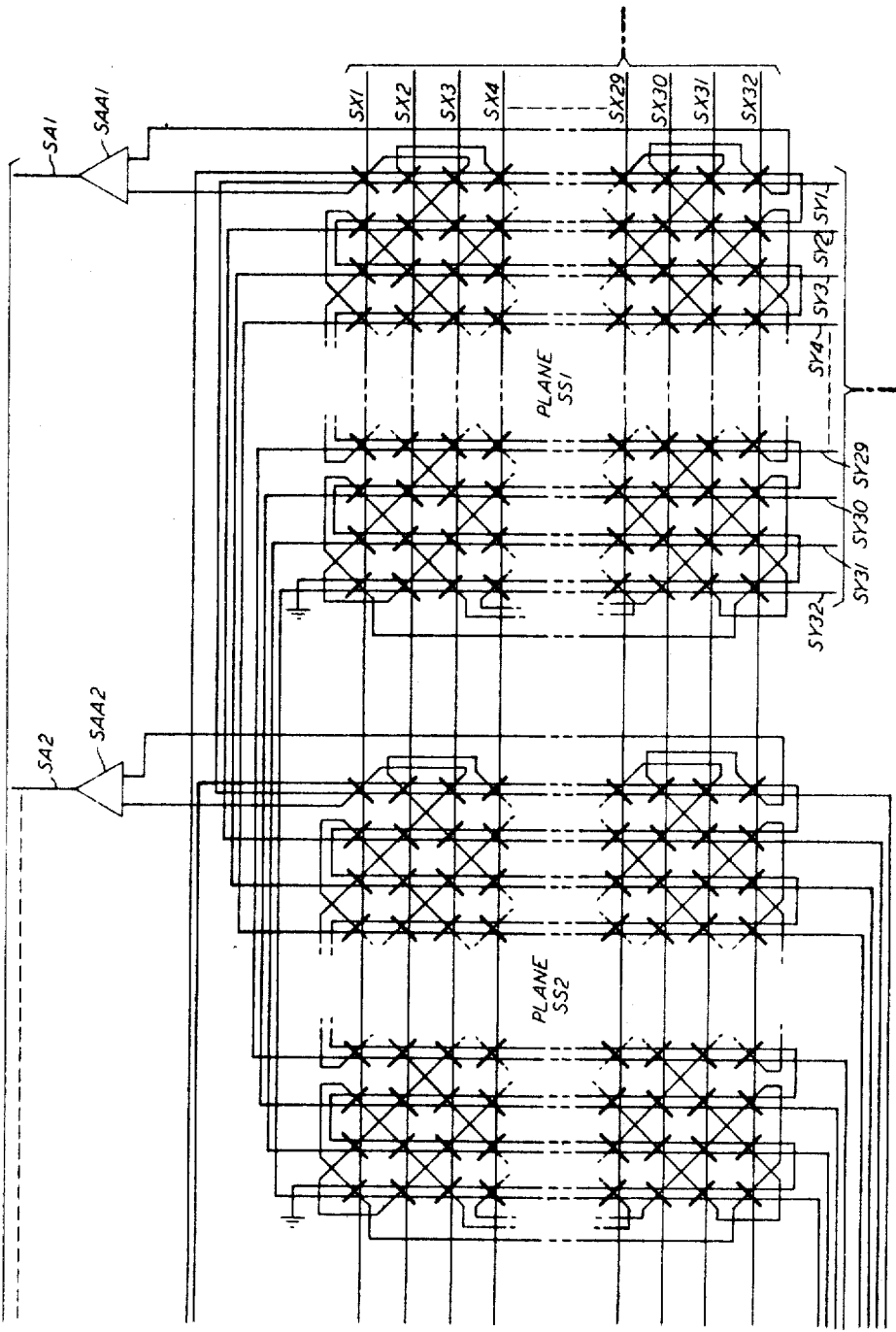
Figure 40:
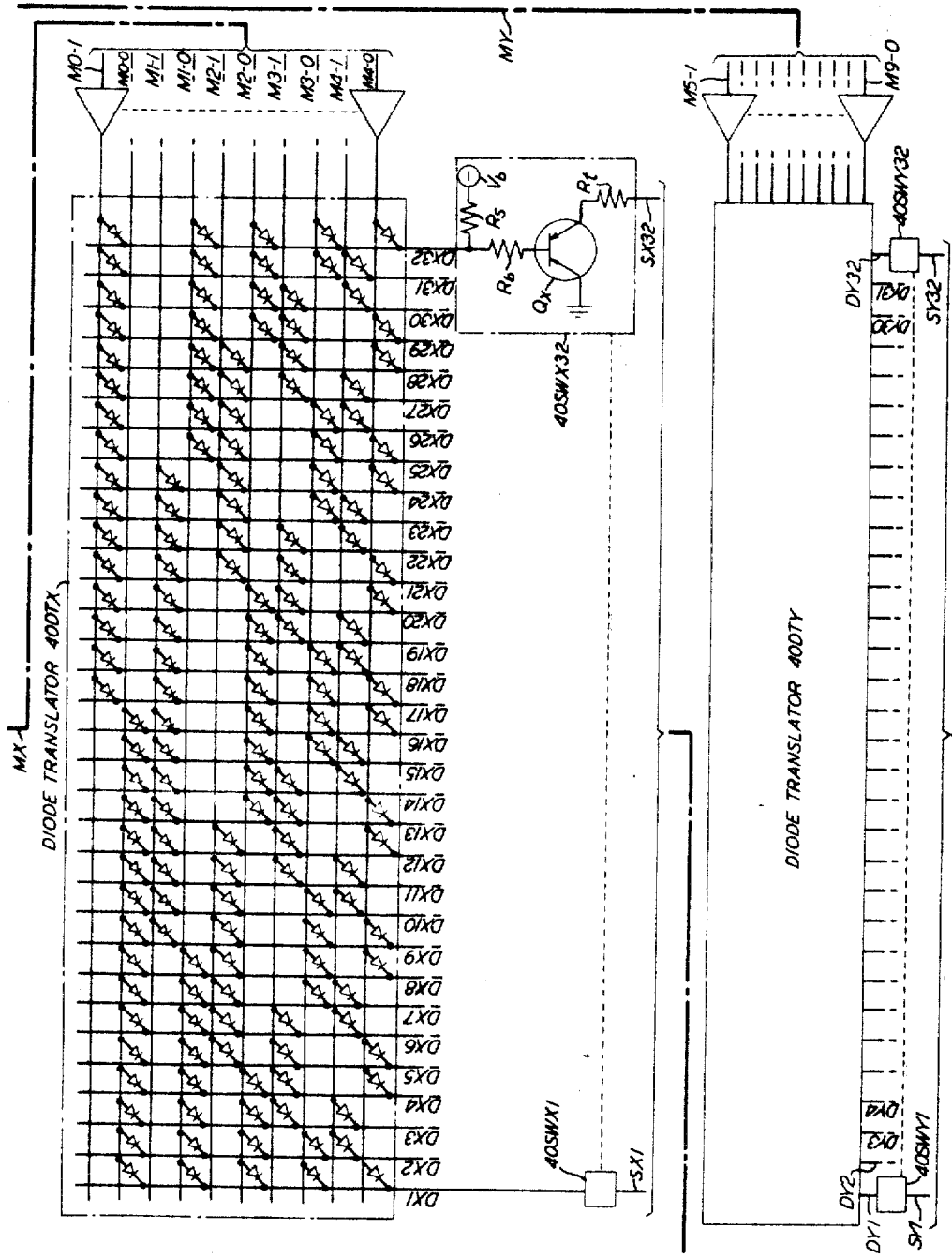

FIG. 42 depicts the timing of pulses generated by the clock pulse generator circuit shown in FIG. 31.

GENERAL DESCRIPTION

Figure 1:
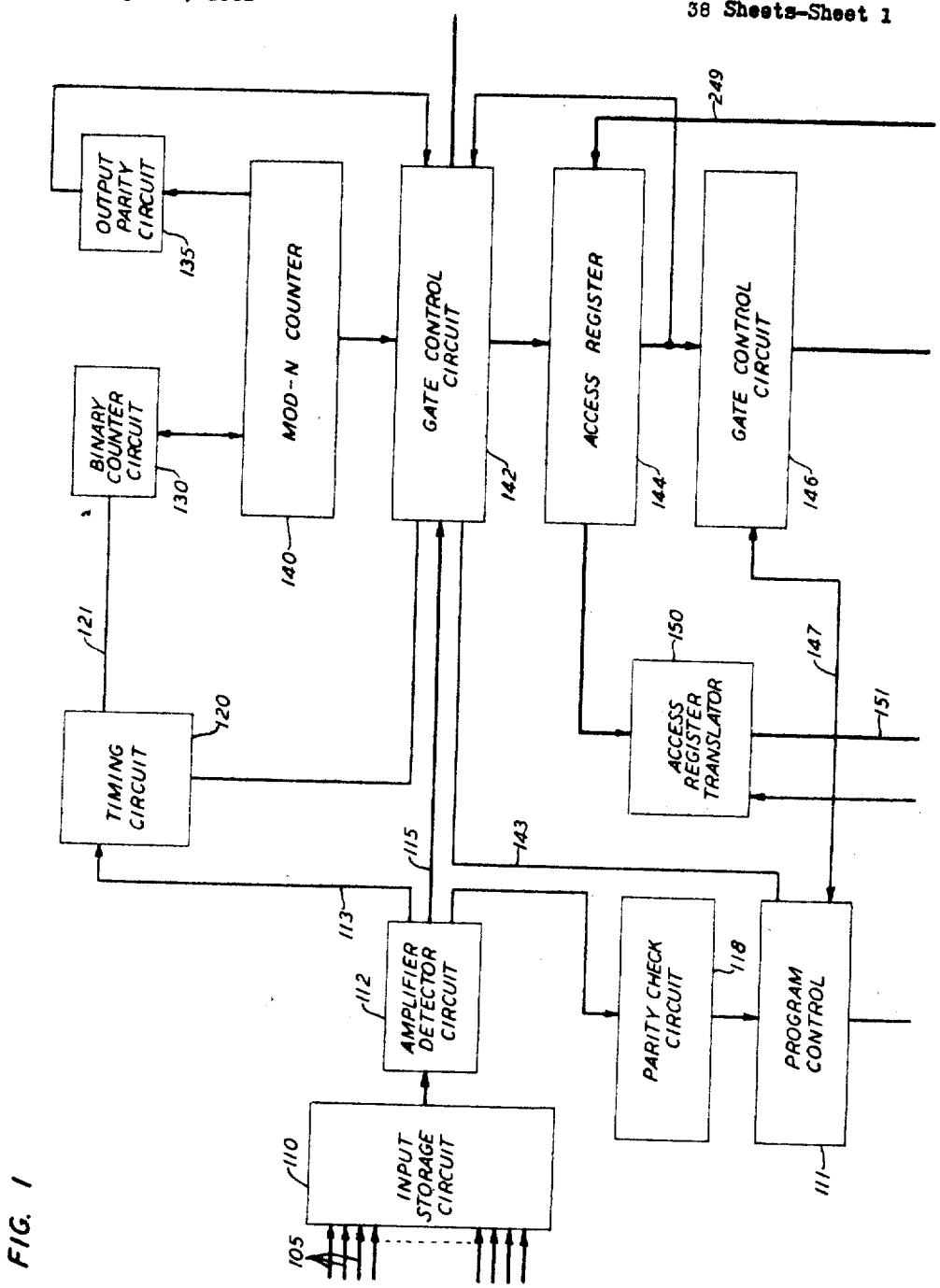
Figure 2:
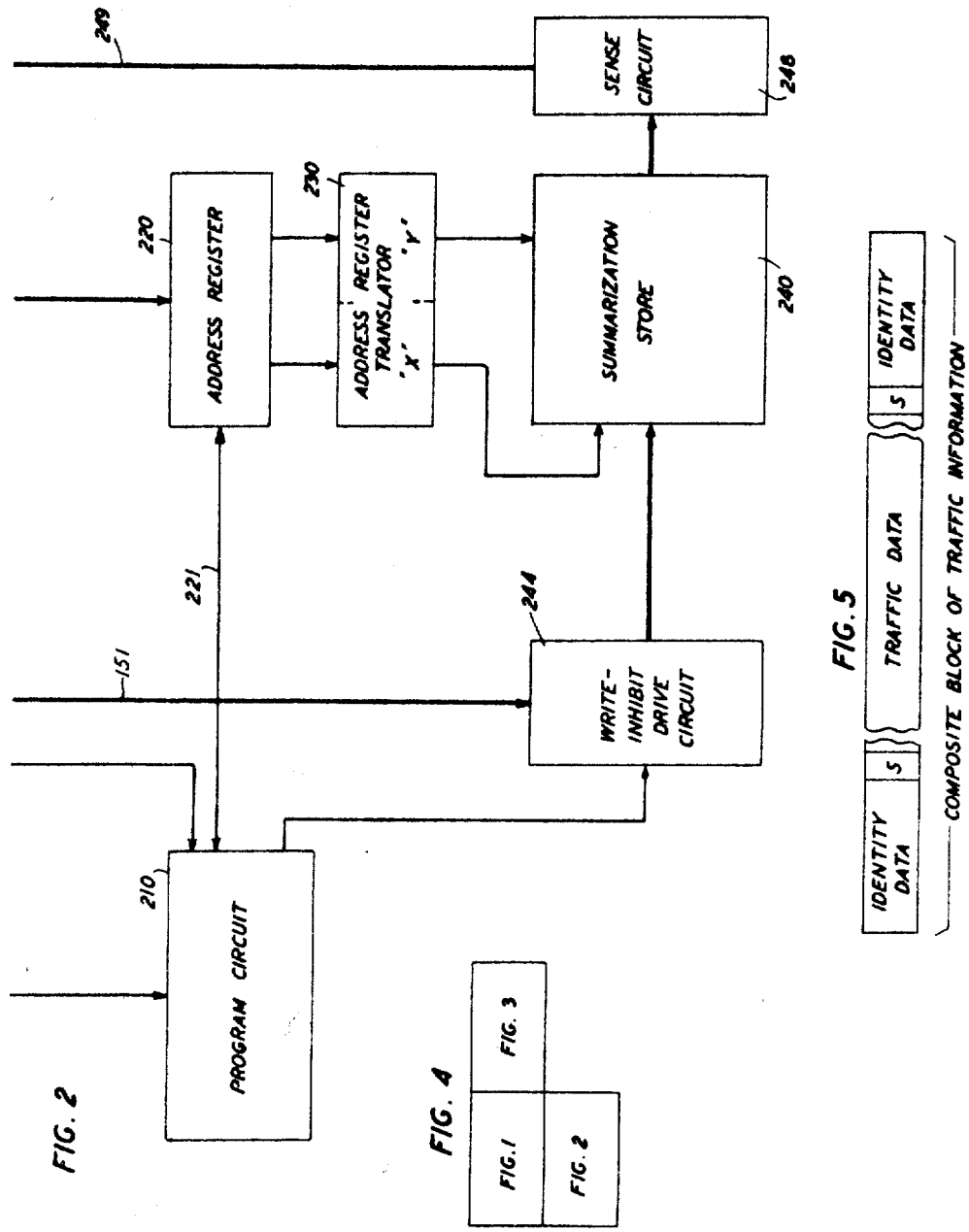
Figure 3:
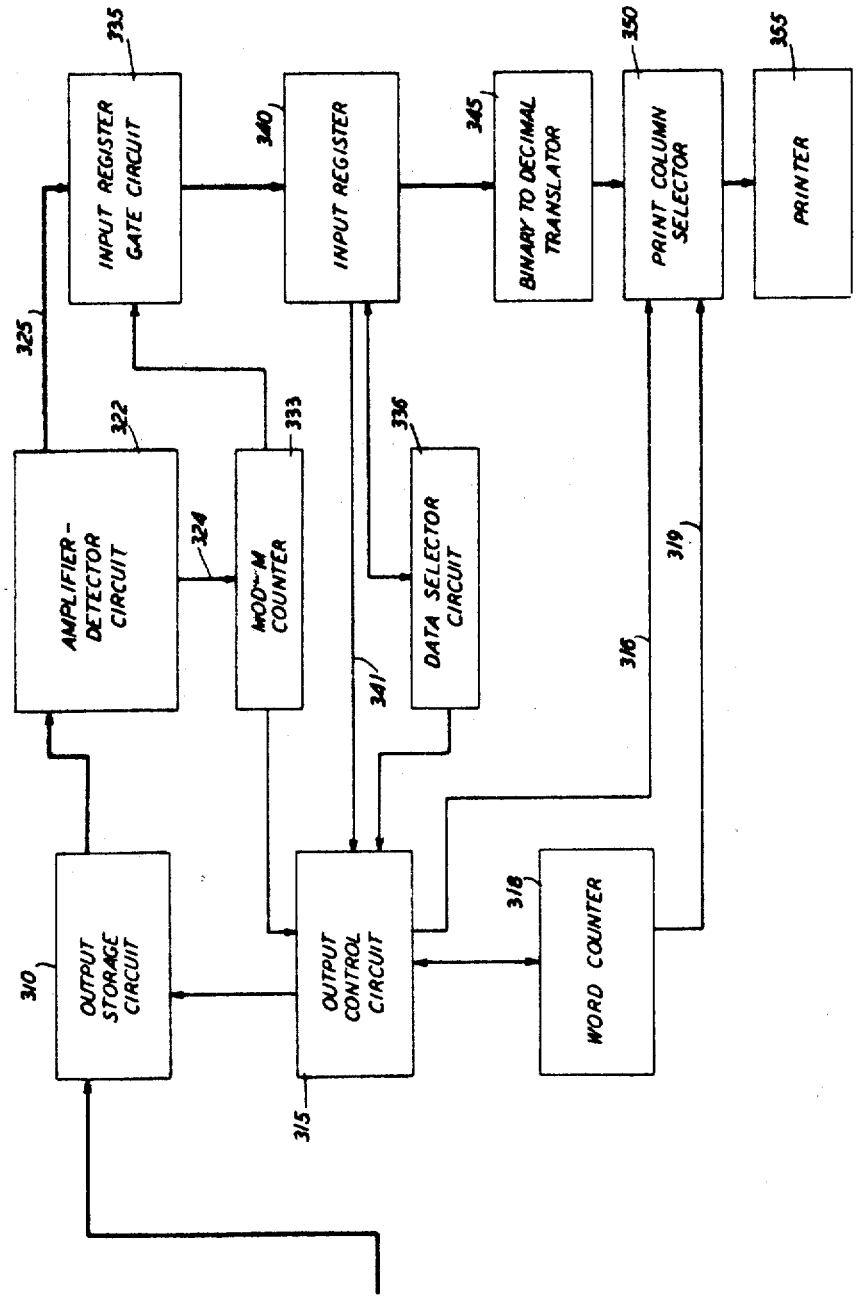

Referring to FIGS. 1 through 3, arranged in accordance with FIG. 4, a block diagram of a traffic data processing system is shown following the principles of the present invention and comprising basically three functional components: an input stage, an accumulator stage and an output stage. The input stage, generally represented in FIG. 1, serves the basic functions of receiving and recording the input statistical traffic information from the various traffic measuring sources, of detecting, checking, converting and directing the data contained therein to the accumulator stage, and of receiving, converting and directing the summarized data from the accumulator stage to the output stage. The accumulator stage, generally represented in FIG. 2, functions to sort and summarize the traffic data detected by the input stage on both an individual basis and a group basis, to directly store certain identity data associated with each composite block of traffic information, and to sequentially read out and direct the summarized traffic data and the associated identity data to the input stage. The output stage, generally depicted in FIG. 3, comprises circuitry for receiving and storing the summarized traffic data and the identity data, for scanning the stored information to locate desired blocks of traffic data, and for translating the desired data to generate a printed record therefrom.

The input statistical traffic information is received from the various diversely-situated traffic measuring equipments simultaneously on respective input leads 105 and stored in input storage circuit 110. Each lead 105 is uniquely associated with one measuring source of incoming traffic data and directs the data therefrom to storage circuit 110 where it is stored on respective magnetic tracks for subsequent processing. Suitable traffic measuring equipment may, for example, take the form of that disclosed in the Barnes application No. 1602 mentioned hereinabove for monitoring a plurality of units of telephone equipment on a random or periodic basis for accumulating statistical data for traffic studies. As fully disclosed therein, the traffic measuring equipment provides the statistical data in an encoded form suitable for processing by automatic data processing equipment. Each indication of a predetermined traffic condition generates a multibit reflected binary code notation, including a parity bit, which peculiarly designates the particular unit of telephone equipment from which the data obtained.

To further identify the traffic data, the particular traffic measuring equipment generating the data is peculiarly designated by certain identity data in the form of multibit binary words. Included in the identity data is such information as the switching office number, the date of the measurements, the time of day, and the type of circuit grouping. These identity words are generated advantageously at the beginning and again at the end of each period of measurement to permit subsequent identification of the traffic information from either direction for symmetrical processing thereof. Thus, as depicted in FIG. 5, a typical recordation pattern for a composite block of traffic information received on one of leads 105 comprises a plurality of traffic data words preceded and followed by a group of identity data words. Further, start information S is included to separate the traffic data from the identity data and to define the limits of the traffic measuring interval. A complete description of suitable apparatus for generating such identity data to identify the traffic measuring equipment and to provide the identity data at the beginning and end of a block of traffic information may be found in patent application Serial No. 17,648, filed Mar. 25, 1960, by W. J. Lamneck.

Each of the leads 105 is, accordingly an output lead from a distinct traffic measuring arrangement of the type shown in the above-mentioned Barnes application, and is connected to an input storage circuit 110 which may thus be considered as both the output or last element of the traffic measuring equipment and the input or initial element of the present traffic data processing system.

Input storage circuit 110 comprises one or more magnetic storage mediums having a plurality of magnetic tracks individually associated with respective leads 105. After the recording and storing operation has been completed with respect to one of the magnetic mediums, the information stored thereon is ready to be processed, one track at a time, on a time-shared basis. To facilitate the time-sharing of the automatic processing equipment, the playback of the recorded data is accomplished at a considerably greater speed than that at which it was recorded. Further, due to the symmetry of the blocks of traffic information, the processing of the data may be effected using the same processing logic no matter which direction of magnetic track motion is employed. Therefore, as mentioned hereinbefore, the data stored on one track of the storage medium may be processed while the medium moves in the forward direction, and the data stored on another track may be subsequently processed while the storage medium moves in the reverse direction. There is no requirement to renormalize the storage medium for processing each individual track.

For a better understanding of the operation of the novel data processing system illustrated in FIGS. 1 through 3, the processing cycle will be described in terms of four sequential modes of operation, modes A, B, C and D. During these modes of operation the processing of each composite block of traffic information is substantially the same. Therefore, a complete comprehension of the operation of the system can be obtained from a description of the processing cycle for a single recorded block of traffic information, such as depicted in FIG. 5.

Mode A processing

The primary flow of the traffic information during the processing cycle is indicated by the heavy lines. As the words within the block of traffic information are read from one of the magnetic tracks of storage circuit 110, each bit is serially detected by amplifier-detector 112 and a binary determination thereof is made to provide binary bit pulses on lead 115 to gate control circuit 142. The detection of each bit generates a pulse, which may be termed a clock pulse, on lead 113 to timing circuit 120 which provides an output pulse on lead 121 to binary counter circuit 130. Responsive to the pulses on lead 121, binary counter 130 advances mod-N counter 140 through its successive stages. Each stage of counter 140 provides a unique signal to gate control circuit 142 to direct a concurrently-applied binary pulse on lead 115 to a respective flip-flop location in access register 144. In this manner each binary bit of the multibit word being detected from storage circuit 110 is steered by gate control circuit 142 into successive flip-flops of access register 144 until the entire word has been stored therein. When the entire word has been gated to access register 144, a signal is provided by gate control circuit 142 on lead 143 to program control 111.

Initially, program control 111 is searching for instructions to begin processing the traffic data. This instruction is in the form of a start word recorded in the block of traffic information intermediate the identity data and the traffic data. Until the start word is detected by program control 111, each word gated to access register 144 is ignored by the processing circuitry and discarded in sequence with no action with regard to it taking place. When a start word appears in access register 144 (after each of the identity words preceding it has been discarded), its unique code is detected and a signal through gate control circuit 146 over lead 147 to program control 111 indicates its presence. In response thereto program control 111 signals program circuit 210 to treat words subsequently read from storage circuit 110 as traffic data words. Thus begins mode A of the processing cycle—sorting and summarizing of the traffic data.

During mode A the processing of each traffic data word is essentially the same. Each traffic data word read from storage circuit 110 is serially stored bit by bit in access register 144 in the manner discussed above. Concurrently with the gating operation, a parity check is made of each word by parity check circuit 118 to determine whether an error has developed in transmission or detection of the word. As mentioned hereinbefore, a parity digit is transmitted with each traffic data word to permit subsequent detection of single bit errors in the data in a manner well known in the art. If the parity check indicates the presence of an error in the data word in access register 144, the word is discarded and an error signal is provided to program circuit 210 to cause an error count to be added to a specially-reserved error register in summarization store 240 in a manner described in detail hereinbelow. The count of errors detected provides an indication of the over-all reliability of the data processing operation.

Assuming a successful parity check, program control 111 directs gate control circuit 146 to gate the traffic data word stored in access register 144 in parallel to address register 220. At the same time a command is given to program circuit 210 to initiate a mode A processing cycle. The encoded data word in address register 220 may be conveniently considered as the address of a particular register location within summarization store 240 corresponding to the unit of telephone equipment from which the traffic measurement obtained. At each register location in store 240 a record is kept of the number of times that the particular encoded traffic data word corresponding thereto has appeared; i.e., of the number of times that a particular traffic condition has been observed on the corresponding unit of telephone equipment. Therefore, each appearance of a traffic data word designates a particular corresponding register location in summarization store 240 whereat the count is to be increased numerically by one.

In response to the mode A process signal from program control 111, program circuit 210 resets the flip-flops in access register 144 and directs address register 220 via lead 221 to propagate the data word stored therein through address register translator 230 to select the appropriate register location in summarization store 240. A "read" signal is applied by program circuit 210 to drive circuit 244, and the number stored in summarization store 240 at the address registered in address register 220 is sensed by sense circuit 248 and directed via lead 249 to access register 144. This number represents the number of times this particular address has previously appeared during the block of traffic information being processed. Of course, if this is the first time this address has appeared (as it will be if this is the first traffic data word being processed), the number stored thereat and transferred to access register 144 will be zero. It is in any case then desired to add a count of one to the number in access register 144, such that a number one greater than the number read out of summarization store 240 will be written back into store 240 at the same register location. This add-one operation is accomplished through access register translator 150 upon receipt of a "write" signal from program circuit 210. Access register translator 150 receives the number from access register 144 and provides a number which is numerically one greater on lead 151 to be written back into summarization store 240 by write-inhibit drive circuit 244. The number is written into the register location selected by the traffic data word in address register 220, which is the same register location in store 240 from which the original number was read.

After the traffic data word has been processed on an individual basis in the manner set forth above, it may be processed advantageously on a group basis. Particular units of telephone equipment, and thus particular ones of the register locations in summarization store 240 corresponding thereto, may be grouped to provide a summary of the data derived from the group of telephone equipments. To accomplish this, the traffic data word in address register 220 is modified by program circuit 210 to select the register location corresponding to the group to which the individual unit from which the data obtained belongs. Thereupon program circuit 210 resets access register 144, and applies a "read" signal to drive circuit 244 to cause the number stored at the addressed group register location to be sensed by sense circuit 248 and stored in access register 144. Under control of program circuit 210, access register translator 150 accepts the number from access register 144 and provides a number which is numerically one greater on lead 151, which is written into the addressed group register location in summarization store 240. The processing of the traffic data word is now complete. It has been counted first on an individual basis at its own register location in store 240 and then on a group basis at its group register location. Thus, access register 144 and address register 220 are reset by program circuit 210 in preparation for processing the next traffic data word.

It is recognized that during the observation intervals, some of the observed units will be considerably more active than others and will thus produce greater amounts of data to be analyzed. Accordingly, the traffic count registered in the summarization store registers associated with these individual high activity units will be considerably larger in a given period of time than the traffic count registered on the other individual traffic registers. Further, the traffic count registered on the group traffic registers in a given period of time will be necessarily greater than that stored on the individual traffic registers. Clearly, it is impractical to provide each of the traffic registers with sufficient capacity to register the higher traffic counts from the units of greater activity; and, it is clearly contrary to the effectiveness and quality of the processed data to provide each of the traffic registers with only sufficient capacity to register the traffic counts from the units of average activity. Therefore, summarization store 240 is provided with traffic registers which are organized into high-count and low-count fields, and the observed units of high activity and the special groups are associated with the registers in the high-count field. Thus, the traffic data from the individual observed units, including the high-activity units, and for the special groups may be registered advantageously with a minimum of summarization store register circuitry consistent with effective and accurate processing.

Even with the organization of the registers into high-count and low-count fields of different capacity, however, it is considered that occasionally during periods of unusually high activity some of the traffic registers may reach their capacity. This is particularly true of the group registers; but a check of the traffic count registered on a group register, at least with respect to order of magnitude, is readily available from reference to the total count registered in the various individual registers with which it is associated. Therefore, the group registers in summarization store 240 are arranged to recycle upon reaching their capacity, thereby giving a better indication of the total group traffic count during these periods of unusually high activity. The access register translator 150 detects the presence of a capacity count stored in access register 144 and signals program circuit 210. No write signal is returned by program circuit 210, access register 144 is reset in the normal manner and the selected register location in summarization store 240 is left in the reset or zero state. Subsequent traffic data directed to that register location begins the count cycle anew.

However, the individual registers have no subdivision registrations, and in the absence of other information indicating high activity, they are considered to present a more reliable indication of traffic activity by retaining their capacity count rather than recycling upon reaching it. Therefore, when access register translator 150 detects the presence of a capacity count stored in access register 144, and the traffic data address in address register 220 indicates that the selected register location corresponds to an individual unit of observed equipment, program circuit 210 directs address register translator 150 to write the capacity count back into the selected register location. Thus, the capacity count is locked into the register location to indicate an overflow condition.

During mode A of the processing cycle, therefore, all correct traffic data words read from the composite block of traffic information are sorted and summarized on an individual and group basis, and stored in corresponding register locations in summarization store 240. All incorrect or mutilated traffic data words are detected and a count thereof is registered in a specific error register location in summarization store 240. Throughout the entire mode A of operation, program control 111 examines each word read from the block of traffic information in search of another start word, the presence of which indicates that all of the traffic data has been received and only the identity data words remain. When a subsequent start word is detected by program control 111, a signal is directed to program circuit 210 to terminate mode A operation and to initiate mode B operation—checking and transferring the identity data words to summarization store 240. Program control 111 further directs gate control circuit 146 to transfer the start word from access register 144 to address register 220, but no command is given to program circuit 210 to initiate a mode A processing cycle. Thus, the start word is retained in address register 220 while the succeeding word, i.e., the first identity data word, is obtained from input storage circuit 110.

Mode B operation

The identity data words read from the composite block of traffic information are not counted under mode B operation as the traffic data words were under mode A. Instead, they are modified, as described in detail hereinafter, by the addition of a special code to be used during mode D processing, and they are stored directly in predetermined register locations in summarization store 240. The start word in address register 220 may be selected arbitrarily as the address of the particular register location in summarization store 240 whereat the first identity data word is to be stored. Thereafter, the word stored in address register 220 may be modified successively by program circuit 210 to address the particular register locations of the successive identity data words read from the composite block of traffic information.

In substantially the same manner as discussed hereinabove in connection with the mode A processing cycle, each identity data word read from storage circuit 110 is serially stored bit by bit in access register 144 and a parity check is made. Assuming a successful parity check, program control 111 initiates a mode B processing cycle to transfer the identity data word directly to the selected register location in summarization store 240 via address register translator 150. During mode B operation, address register translator 150 provides the same word at the output thereof on lead 151 that it receives as an input from access register 144. Therefore, the first identity data word received in access register 144 subsequent to the storage of a start word in address register 220 is transferred to the register location in summarization store 240 selected by the start word. The start word in address register 220 is then modified by program circuit 210 to select the next register location for the successive identity data word. This cycle is repeated until all of the identity data words have been read from the composite block of traffic information and transferred to respective register locations in summarization store 240.

It will be recalled that during mode A operation a parity check is made of each traffic data word; and when the parity check fails, the input stage circuitry is restored to normal and a count of the error is made at an error register location in summarization store 240. Detection of errors to provide an indication of the over-all reliability of the data processing operation is considered to be sufficient with regard to the statistical traffic data words. During mode B operation, however, the identity data words must be detected with greater accuracy to permit the summarized traffic data to be correctly and properly identified subsequently. Therefore, the identity data is provided to the traffic data processing system on a single-error correcting basis, as described more fully in the above-mentioned W. J. Lamneck application No. 17,648. With this coding scheme, single errors are detected and corrected by program control 111 and double errors are detected to activate an alarm condition.

*Mode C operation*

When all of the identity data words have been received, checked and stored in summarization store 240, mode B operation is terminated and program circuit 210 initiates mode C operation-transfer of the summarized traffic data and associated identity data to semipermanent storage means to release summarization store 240 for processing of subsequent blocks of traffic information. Mode C operation basically comprises sequentially addressing the successive register locations in summarization store 240 and transferring the information stored therein to access register 144, from which it is directed via gate control circuit 142 to output storage circuit 310 where it may be recorded advantageously on one of a plurality of magnetic storage mediums.

Initially, upon the termination of mode B operation and the initiation of mode C operation, access register 144 is reset and the address of the first register location in summarization store 240 to be read out is stored in address register 220. The address is propagated through address register translator 230 and the multibit data word stored in the selected register location is transferred via sense circuit 248 to access register 144. A serial train of pulses is initiated by timing circuit 120 through binary counter circuit 130 to mod-N counter 140. Each successive pulse is directed by mod-N counter 140 through gate control circuit 142 to sequentially interrogate the storage cells of access register 144 to serially provide the information stored therein, bit by bit, to output storage circuit 310 through gate control circuit 142. An indication of the bits of a particular binary character in the multibit word read out of access register 144 is accomplished by output parity circuit 135 to provide a parity bit to be recorded with the word in output storage circuit 310. Thus, the reading out of each bit of the word in access register 144 and the recording thereof, inclusive of parity bit, in output storage circuit 310 is accomplished synchronously via the timing pulses from timing circuit 120.

Access register 144 is reset and address register 220 is advanced to the next register location in summarization store 240, repeating the mode C cycle of operation described above until all of the summarized traffic data words and associated identity data words have been transferred to output storage circuit 310. The identity data words are grouped sequentially preceding the summarized traffic data words to facilitate subsequent identification and selection of desired data from storage circuit 310 to print or punch a permanent record thereof. When summarization store 240 has been cleared, program circuit 210 ceases mode C operation and the input stage and accumulator stage circuitry is reset for processing the next composite block of traffic information from input storage circuit 110. Program circuit 111 again searches each multibit word read from storage circuit 110 for start information to begin another mode A processing cycle in the manner described above.

*Mode D operation*

Concurrently, a mode D operating cycle may be initiated by output control circuit 315 if it is desired to print a record of particular summarized traffic data stored in output storage circuit 310. As mentioned above in connection with mode B operation, the identity data words read from input storage circuit 110 are modified before being transferred to summarization store 240. In particular, the first identity data word is modified to present a start indication to the output stage circuitry during mode D operation. Thus, the first identity data word recorded in output storage circuit 310 provides a start indication for the identity data and summarized traffic data following it during playback, and further provides an identification of the switching office from which the traffic data initially was obtained.

Therefore, a mode D operating cycle is initiated by placing information in data selector circuit 336 to indicate the switching office from which summarized traffic data is desired to be printed out. Output control circuit 315 energizes output storage circuit 310, and information stored therein is scanned in a search for the desired traffic data. As the multibit data words are read from output storage circuit 310, each bit is serially detected by amplifier-detector circuit 322 and a binary determination thereof is made to provide binary bit pulses on lead 325 to input register gate circuit 335. The detection of each bit generates a clock pulse on lead 324 to advance mod-M counter 333 through its successive stages. Each stage of counter 333 provides an individual signal to input register gate circuit 335 to direct a concurrently-applied binary pulse on lead 325 to a respective flip-flop in input register 340. Each binary bit of the word being detected from storage circuit 310 is thus steered by gate circuit 335 into successive flip-flops of input register 340 until the entire word has been stored therein. When the entire word has been gated to input register 340, a signal is provided on lead 341 to output control circuit 315. Along with the gating operation a parity check is made of each word by input register 340. If the parity check indicates the presence of an error in the detection of the data word, an error bit is associated with the data word which subsequently controls the printing of an error symbol adjacent the printed data.

Data selector circuit 336 examines each word gated into input register 340 in search of start information in the form of identity data in accordance with the desired switching office designation previously placed in circuit 336. Until the proper start information is detected by data selector circuit 336, each word gated to input register 340 is discarded and input register 340 is reset. When a match is obtained, i.e., when the word stored in input register 340 corresponds to the desired switching office designation, a signal is provided to output control circuit 315 to signify that the desired data has been located and that words subsequently read from storage circuit 310 are to be printed out. Thus begins the printing operation of mode D of the processing cycle.

The identity data word in input register 340 and each subsequent identity data word and summarized traffic data word is translated by translator 345 from a binary notation to provide decimal digit indications through print column selector 350 to printer 355. Receipt of each subsequent word in input register 340 provides a signal on lead 341 through output control circuit 315 to word counter 318 wherein a count is maintained of the number of words read from storage circuit 310. In accordance with the count in word counter 318, a signal is provided to output control circuit 315 which is indicative of the class of data words being read from output storage circuit 310; i.e., whether they are identity data words, low-count register data words, or high-count register data words. This permits output control circuit 315 to control print column selector 350 to direct the decimal digit indications from translator 345 to the proper print column of printer 355 of the corresponding digital position of the particular class of data words being recorded. A signal representation of the data word count is also provided on lead 319 to print column selector to permit a summarization store register identification number to be printed adjacent each data word read from storage circuit 310. When the word count registered in word counter 318 indicates that all of the identity data and traffic data words from the desired switching center have been printed out, output control circuit 315 terminates the scanning and printing operation and resets the output stage for printing of subsequently desired data.

If it is desired to print a record of each block of summarized traffic data, rather than only a particular traffic data, data selector circuit 336 may be operated to select each and every block of summarized traffic data for printing a record thereof. In this mode of operation data selector circuit 336 functions only to detect the start indication associated with the first identity word of each block of summarized traffic data, there being no requirement for detection of a particular switching office designation. Accordingly, responsive to the completion of the transfer of the summarized traffic data from summarization store 240 to output storage circuit 310, output control circuit 315 energizes output storage circuit 310 to begin playback of the data. Each word detected by amplifier-detector circuit 322 is examined for a start indication only and, upon its detection, a signal is provided thereby to output control circuit 315 to initiate the printing operation. As above, the data is transferred word by word to input register 340 and reflected through translator 345 into decimal digit indications which are provided through print column selector circuit 350 to printer 355.

In brief summary, therefore, peculiarly identified, input statistical traffic information in the form of composite blocks, inclusive of data identifying the originating switching center, is stored in input storage circuitry; the composite blocks of traffic information are sorted and the statistical traffic data contained therein is summarized in accordance with the units of equipment from which it obtained and further in accordance with arbitrary groups of the units of equipment; the summarized traffic data is stored along with the data identifying the originating switching center in output storage circuitry; and all of the summarized traffic data and associated identity data, or the data originating from particular switching centers, is scanned and provided in a readily interpretable printed record. A more complete and comprehensive description of a specific illustrative embodiment in accordance with the principles of the present invention will be found hereinbelow in the detailed description of the schematic diagram depicted in FIGS. 6 through 40, when arranged as shown in FIG. 41.

DETAILED DESCRIPTION

In the specific embodiment set forth in FIGS. 6 through 40, much of the circuitry which is well known in the art such as AND, OR, flip-flop and amplifier circuits are shown in block diagram form to permit greater clarity and facilitate description of applicants' invention. Further, in some instances, amplifier circuits have been combined or omitted where it was felt they were not necessary to gain a clear understanding of the present invention, and where greater clarity was provided thereby. In actual practice, such amplifier circuits may be provided to the illustrative embodiment to achieve desired signal levels without departing from the principles taught by the present invention.

FIGS. 6 through 14, arranged as shown in FIG. 41, correspond to the input stage circuitry generally represented in FIG. 1, which was described hereinabove. Input statistical traffic information in the form of composite blocks of multibit traffic and identity data words is received from individual units of traffic measuring equipment on respective pairs of leads, such as leads 105. The data on leads 105 is uniquely associated with a particular unit of measuring equipment, and the data therefrom is directed to one of the transducers 611 in multichannel recorder 610 where it is stored on a respective magnetic track for subsequent processing. As described above in connection with FIG. 5, the composite blocks of traffic information are symmetrical in form, comprising a plurality of traffic data words preceded and followed by a plurality of identity data words which particularly identify the measuring source and conditions under which the traffic data was obtained. The traffic data words are encoded in a reflected binary notation to identify the unit of telephone equipment from which the data word was obtained. In the exemplary embodiment herein, each traffic data word comprises 11 binary bits, inclusive of a parity bit.

Assuming the use of traffic measuring equipment such as disclosed in the above-mentioned Barnes application, the traffic and identity data words are provided to multichannel recorder 610 in a form suitable for self-clocked, nonreturn-to-zero recording. Basically, this form of recording utilizes two levels of tape magnetization; binary encoding thereof comprises a single flux reversal from one level to the other to record a binary 0 and two such flux reversals to record a binary 1, both recordations occurring in a digit, or bit, interval of time. Individual bits of each multibit data word, therefore, are provided and recorded synchronously although the data words may be provided by the measuring equipment on a random, nonsynchronous basis.

*Mode A operation*

The data recorded on the respective channels of recorder 610 is subsequently processed one track at a time, the desired track being selected through the operation of selector switches 6SP and 6SN to connect the associated transducer 611 to different amplifier 6DA. Impartation of relative motion between the desired magnetic track and the associated transducer 611 thus provides pulse signals on leads 612 and 613 to the contacts of switches 6SP and 6SN, respectively, the pulses on lead 612 being representative of positive-going flux reversals detected on the desired magnetic track and the pulses on lead 613 being representative of negative-going flux reversals detected thereon. These signals are amplified by difference amplifier 6DA and provided on complementary outputs through amplifiers 6PA and 6NA to peak detector circuits 6PTP and 6PTN, respectively. The outputs of detector circuits 6PTP and 6PTN accurately define a discretely-timed pulse for each input pulse signal, and may be advantageously of the form shown in F. M. Goetz application, Serial No. 65,034, filed Oct. 26, 1960.

Figure 7:
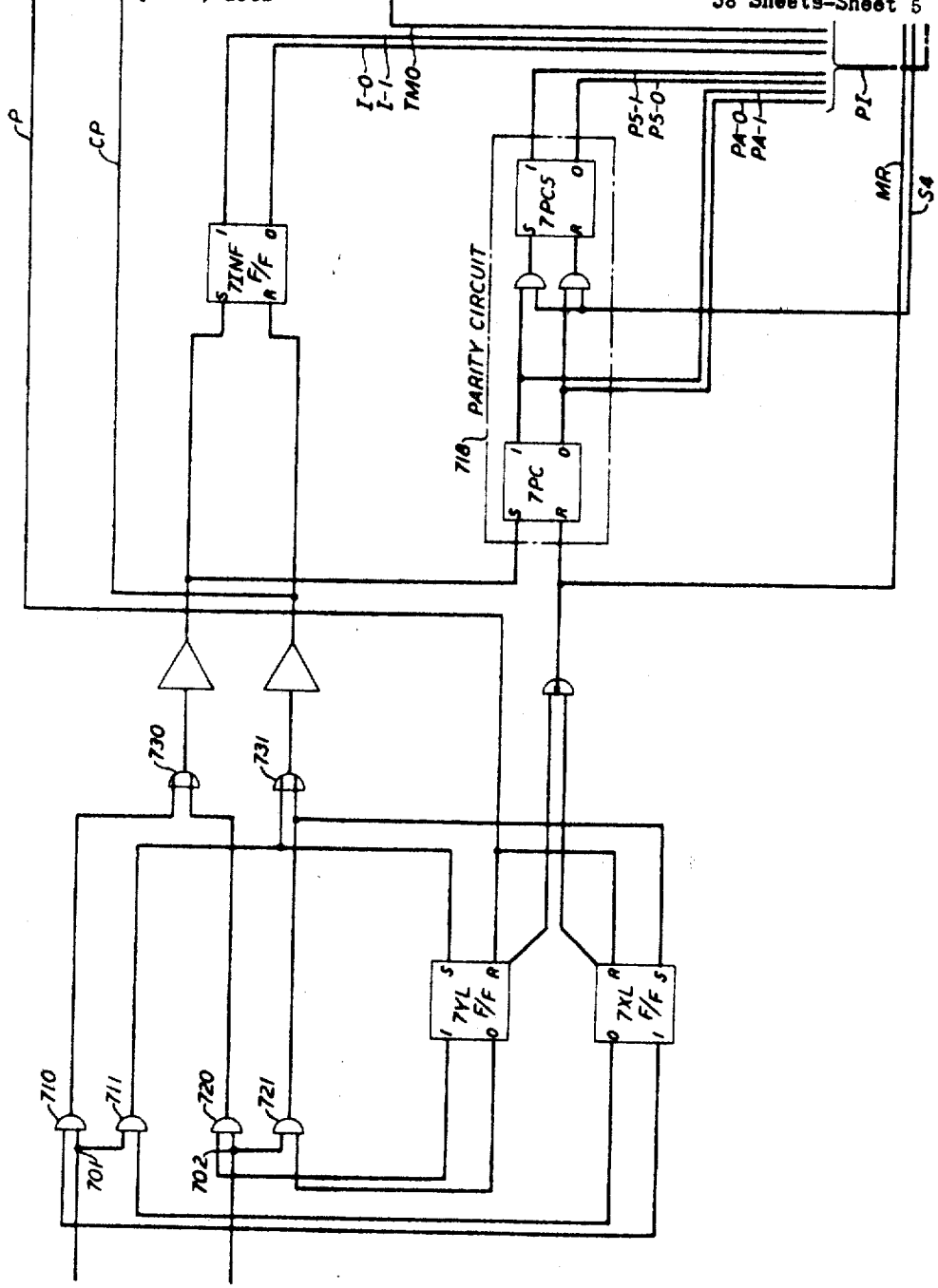

The outputs of peak detector circuits 6PTP and 6PTN are amplified and shaped into suitable gating pulses by gate amplifiers 6GF and 6GN and are applied to the logic detector circuitry of FIG. 7 at points 701 and 702, respectively. Due to the nature of the recorded signals and to the complementary form of detection, pulses appearing at points 701 and 702 alternate in occurrence. Thus a pulse appearing at either point 701 or 702 during a digit time interval represents a single flux reversal, and pulses appearing at both points 701 and 702 during a digit time interval represent the detection of a double flux reversal. Consequently, by utilizing the appearance of a pulse at either point 701 or 702 to establish a period of time to observe the other one of points 701 and 702 for a subsequent pulse, the binary character of the signal recorded in the period of time may be readily determined. The appearance of the subsequent pulse indicates a recorded binary 1 and the absence of the subsequent pulse indicates a recorded binary 0. Accordingly, the first pulse during a digit time interval indicates the presence of a bit of information and may be denominated a clock pulse, and the second pulse during the digit interval (its presence or absence) indicates the binary character thereof and may be denominated an information pulse.

A complete description of the logic detector readout arrangement utilized in the present illustrative embodiment may be found in F. M. Goetz application, Serial No. 79,444, filed Dec. 29, 1960. However, briefly, the operation is as follows: Assume that there has been a considerable interval of time in which no input pulses have been received at points 701 and 702, and flip-flops 7XL and 7YL are reset. Further, remembering that pulses alternate at points 701 and 702, assume that a pulse is received at point 701. This pulse is gated through AND gate 711 setting flip-flop 7YL, through OR gate 731 resetting information flip-flop 7INF, and through OR gate 731, lead CP and the break portion of contact 11 of relay 14MC setting monopulser 8MP1. If this bit is a binary 0, no other pulse will be received at points 701 and 702 within the digit time interval and information flip-flop 7INF will remain reset indicating the binary character of the detected bit as 0. A short time later, monopulser 8MP1 times out and resets flip-flop 7YL over lead P. If the bit is a binary 1, a second or information pulse will be received during the digit time interval at point 702 before monopulser 8MP1 times out. This information pulse is gated through AND gate 720 and OR gate 730 setting information flip-flop 7INF, thus indicating the binary character of the detected bit as 1.

This logic detection operation continues in a similar manner for the detection of each binary bit recorded on the channel of recorder 610 being processed, information flip-flop 7INF indicating the binary character thereof and providing representative signals on leads I-0 and I-1. When the first pulse during the digit time interval appears at point 702, the functions performed by flip-flops 7YL and 7XL interchange, and flip-flop 7XL gates any subsequent information pulse through AND gate 710 to set information flip-flop 7INF. After each digit time interval, flip-flops 7XL and 7YL are reset over lead P upon the time out of monopulser 8MP1.

*Parity check of traffic data*

Concurrently, with the logic detection operation a parity check is made of each 11-bit data word by parity circuit 718 to determine whether an error has developed in transmission or detection of the data word. Each information pulse through OR gate 730 setting information flip-flop 7INF also sets flip-flop 7PC in parity circuit 718. Flip-flop 7PC is reset for each data word over master reset lead MR. Hence, flip-flop 7PC reveals the recorded pattern of each data word and, recalling that each data word includes a parity bit, the output thereof permits detection of single bit errors in a manner well known in the art. The outputs of flip-flop 7PC are provided on leads PA-0 and PA-1 through cable PI to the program control circuit (FIG. 27) to cause an error count to be made in a manner to be described more fully hereinbelow when the parity check indicates the presence of an error in the data word.

Figure 27:
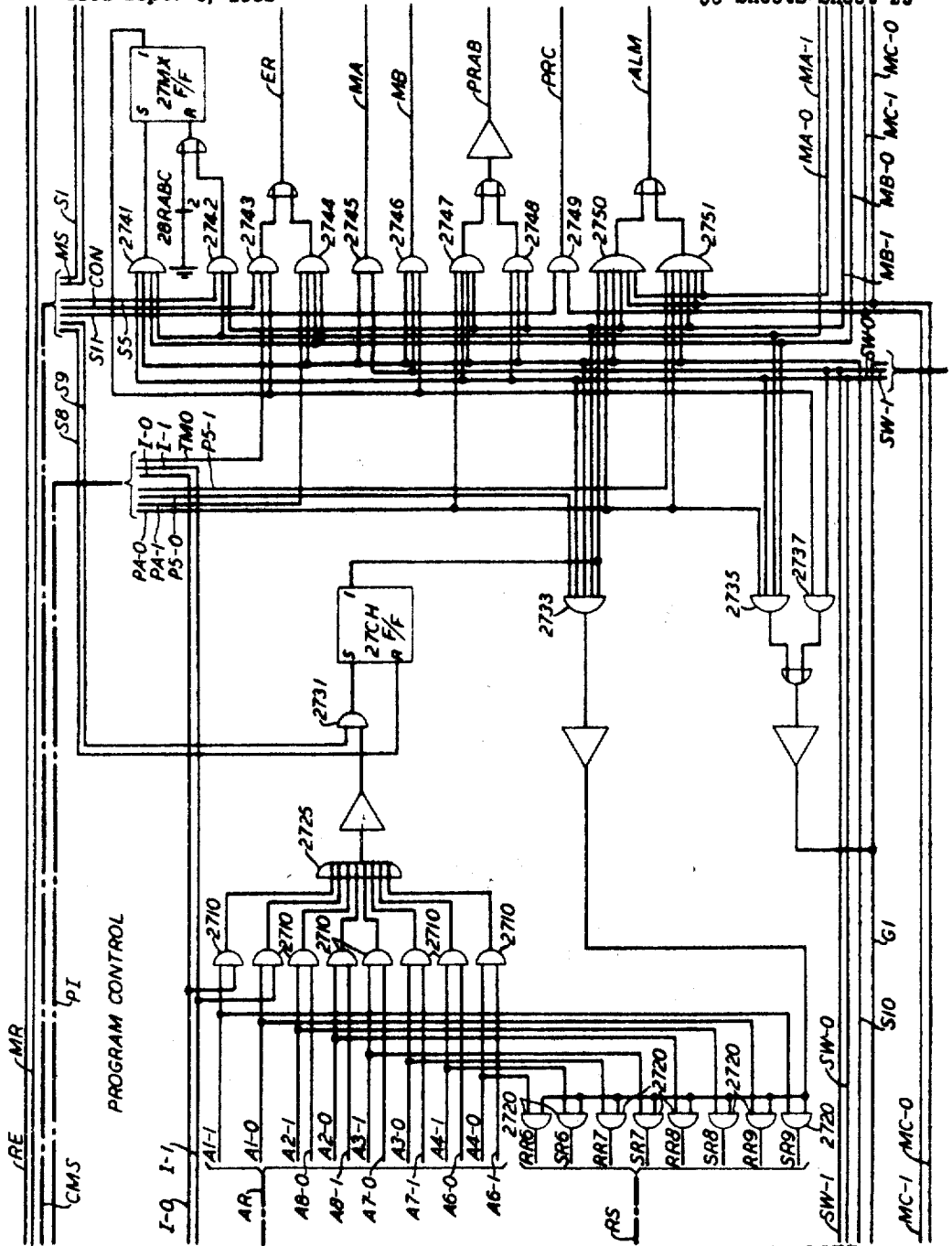

Parity circuit 718 further includes flip-flop 7PC5 to provide an indication of the parity of each input identity data word after its fifth bit has been received. The mod-N counter (FIG. 10) keeps count of the number of bits received for each data word and pulses lead S4 after five bits have been detected. Upon receipt of this pulse the output of flip-flop 7PC is transferred through AND gates 728 to flip-flop 7PC5. The outputs of flip-flop 7PC5 are provided on leads P5-0 and P5-1 through cable PI to the program control circuit (FIG. 27).

*Timing circuit*

Figure 8:
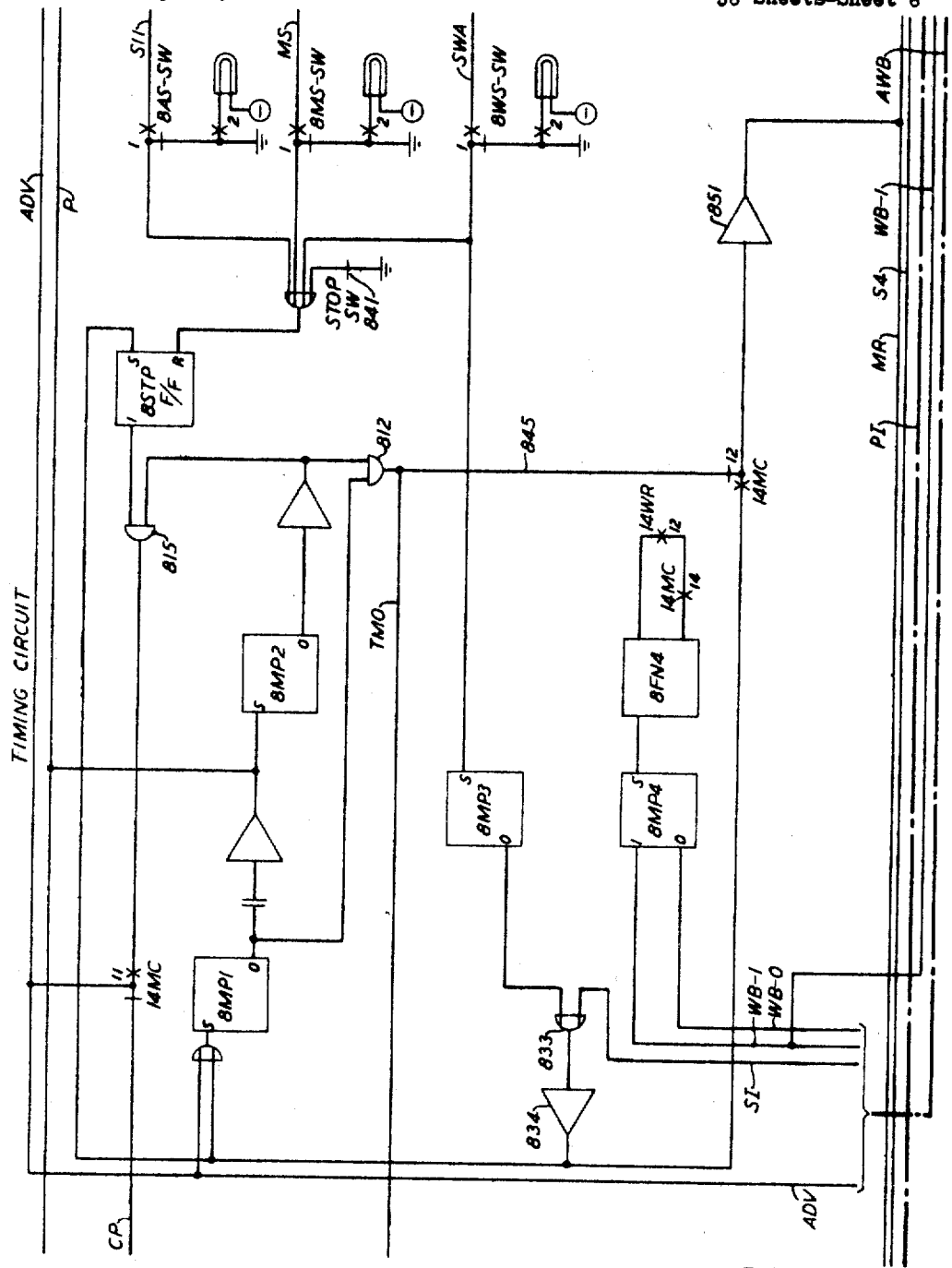

Most of the timing functions for the detection and processing of the data words are provided by the timing circuit shown in FIG. 8. The operation of monopulser 8MP1, that of defining the digit time interval during the detection of traffic and identity data words (modes A and B) has been discussed above. In addition, monopulser 8MP2 is provided to define data word intervals during the mode A and mode B cycles of operation. Upon timeout of monopulser 8MP1 for the first digit time interval of a data word the output thereof sets monopulser 8MP2. Normally, before monopulser 8MP2 times out, monopulser 8MP1 will be set by a subsequent clock pulse on lead CP. If, however, monopulser 8MP1 is not set when monopulser 8MP2 times out (indicating the end of the data word), a pulse is provided through AND gate 812 on lead TM0 through cable PI to the program control circuit (FIG. 27), and on lead 845 through amplifier 851 to lead MR to reset the input stage circuitry. Monopulser 8MP2 similarly provides a pulse on leads TM0 and MR if a bit is lost in the data word being detected, thereby permitting monopulser 8MP2 to time out when monopulser 8MP1 has not been set. This latter signal on lead TM0 indicates an error in the word being detected.

During the mode C cycle of operation monopulsers 8MP1 and 8MP2 function quite differently. It will be recalled that during mode C operation the summarized traffic data and associated identity data words are transferred from the summarization store to semipermanent storage means in the output stage. To provide the transfer on a synchronous basis the output of monopulser 8MP2 is connected through AND gate 815, enabled by flip-flop 8STP, and contact 11 of operated relay 14MC to the input of monopulser 8MP1. The two monopulsers thus connected in a loop form a pulse generator which, when started, provides a serial train of pulses on leads P and ADV as long as flip-flop 8STP remains set. Initially, for mode C operation, monopulser 8MP1 and flip-flop 8STP are set by a pulse on lead SI from blocking circuit 1450 through OR gate 833 and amplifier 834, as will be described in greater detail in the discussion below of mode C operation.

Flip-flop 8STP may be reset by several alternative methods to terminate the generation of pulses on leads P and ADV. Normally, memory switch 8MS-SW is operated during mode C operation. Therefore, when the end of mode C operation is detected a pulse provided on lead MS is transferred through contact 1 of switch 8MS-SW to OR gate 840 to reset flip-flop 8STP, thereby stopping the pulse generation immediately.

The pulse generator formed by monopulsers 8MP1 and 8MP2 may be started and stopped also under control of word separation switch 8WS-SW. When switch 8WS-SW is operated, the last bit of every other data word transferred during mode C operation generates a pulse on lead SWA from word alternator 920 which is transferred through contact 1 of switch 8WS-SW and OR gate 840 to reset flip-flop 8STP and stop the generation of pulses. The pulse on lead SWA also sets monopulser 8MP3 over lead 865 which times out after a predetermined time interval to provide a signal through OR gate 833 and amplifier 834 to restart the pulse generator and set flip-flop 8STP. Thus, operation of word separation switch 8WS-SW provides a predetermined interval of separation between pairs of data words to facilitate mode D operation in a manner set forth in detail hereinbelow.

Flip-flop 8STP may also be reset to stop the generation of pulses by interconnected monopulser 8MP1 and 8MP2 through the manual operation of stop switch 841. Further, an automatic stop switch 8AS-SW is provided which, when operated, causes flip-flop 8STP to reset after every 12th pulse, an indication of which appears on lead S11. This latter switch allows an operator to automatically stop the processing action during mode C operation at the end of each data word for maintenance or observation functions.

In summary therefore, during modes A and B, clock pulses on lead CP initiate operation of monopulser 8MP1 to generate digit interval pulses on lead P. Monopulser 8MP2 detects the end of data words and missing bits therein to generate a signal on lead TM0 to reset the input stage circuitry. Mode C operation is accompanied by operation of relay 14MC, contacts of which cause monopulsers 8MP1 and 8MP2 to form a continuously-operated pulse generator under the control of flip-flop 8STP. This pulse generator may be turned on or off after every data word, or after every other data word via monopulser 8MP3, and is automatically turned off and monopulsers 8MP1 and 8MP2 are reconnected for mode A operation upon the completion of mode C operation.

Binary counter circuit

Figure 9:
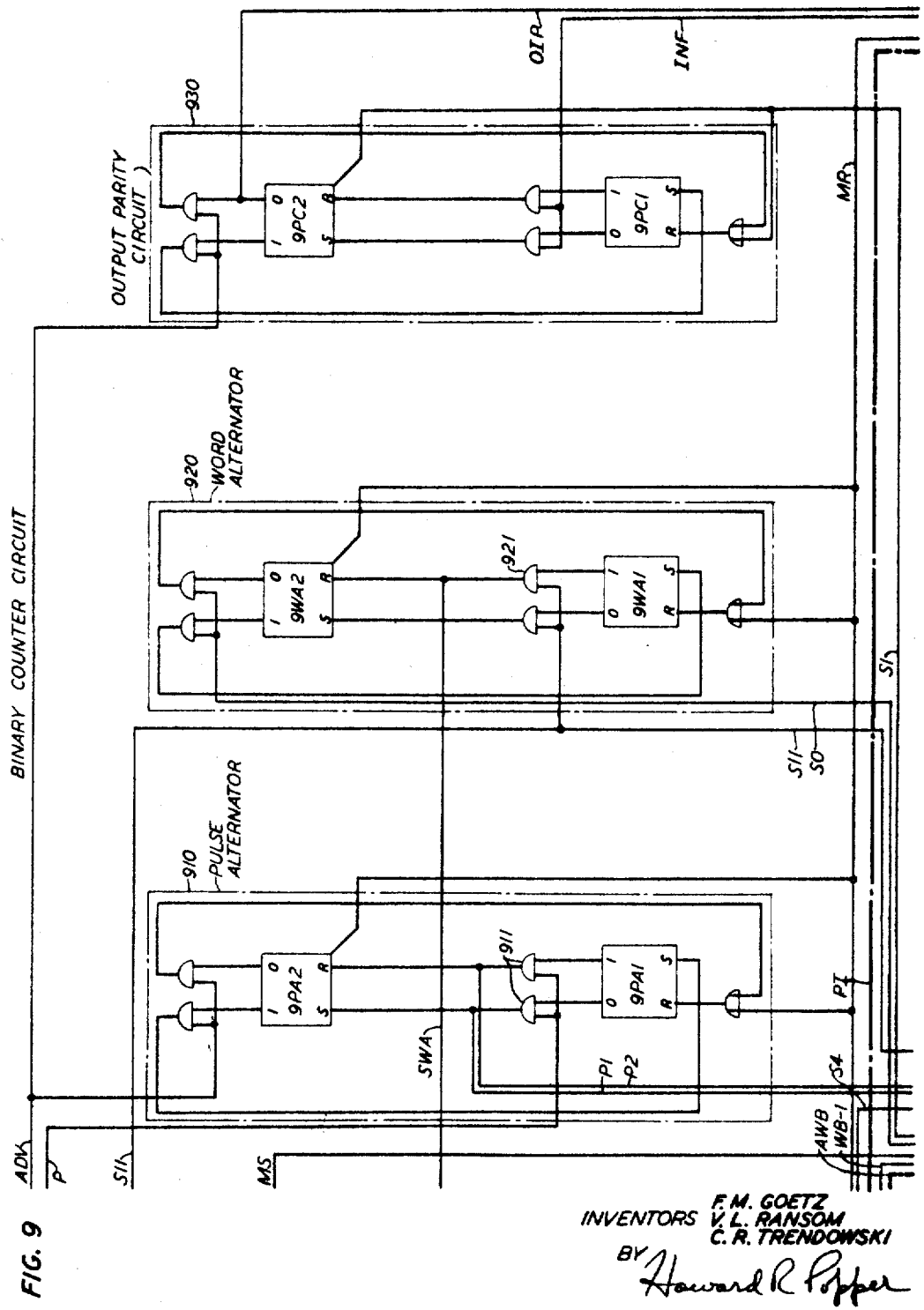
Figure 10:
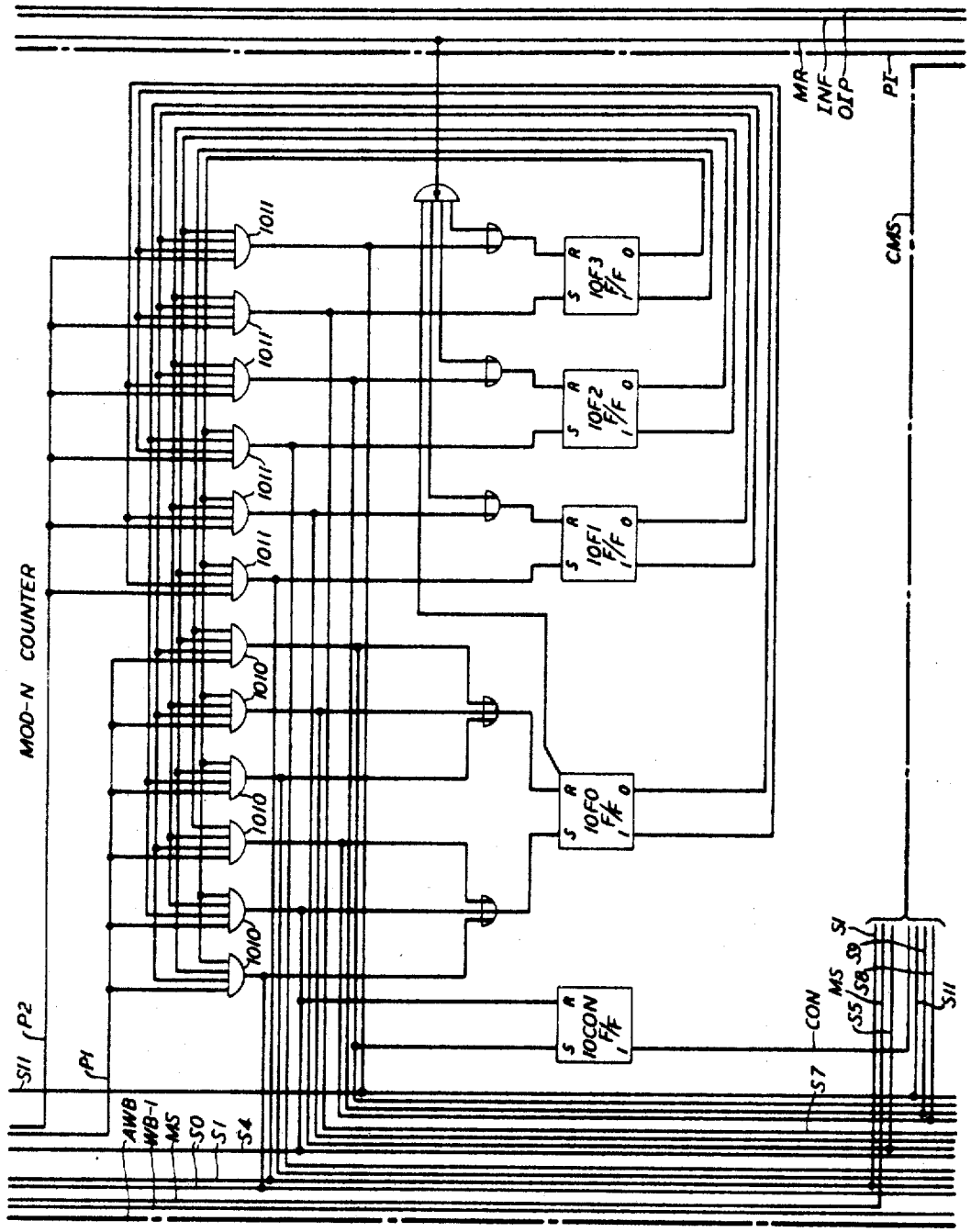

The binary counter circuit in FIG. 9 comprises three binary counters—pulse alternator 910, word alternator 920 and output parity circuit 930. These binary counters each comprise two flip-flops interconnected through AND gate logic to achieve binary counting independent of the rise time or pulse, width of the input pulse signals. Pulse generator 910 is used to alternate steering pulses on leads P1 and P2 to drive the mod-N counter (FIG. 10). The input pulses to be alternated by pulse alternator 910 appear on lead P, and it will be recalled that they occur one for each digit time interval and are generated by monopulser 8MP1. Each pulse on lead P is gated through one or the other of AND gates 911 to place flip-flop 9PA2 in the opposite binary state as flip-flop 9PA1. Before a subsequent pulse appears on lead P, a pulse appears on lead CP through the break portion of contact 11 of relay 14MC on lead ADV which places flip-flop 9PA1 in the same binary state as flip-flop 9PA2. This same pulse also sets monopulser 8MP1 to provide the subsequent pulse on lead P. In this manner, the pulses on lead P are provided alternately at the outputs of AND gate 911 on leads P1 and P2, respectively. Both flip-flops 9PA1 and 9PA2 are reset by pulses on master reset lead MR.

Word alternator 920 functions in a similar manner to provide pulses indicating the last bit of alternate data words through AND gate 921 on lead SWA to turn on and off the pulse generator formed by monopulser 8MP1 and 8MP2 during mode C operation. The input pulses to word alternator 920 appear on lead S11 from the mod-N counter (FIG. 10). Pulses on steering lead S0 from the mod-N counter are utilized to advance word alternator 920, that is, to place flip-flop 9WA1 in the same binary state as flip-flop 9WA2. Flip-flops 9WA1 and 9WA2 are reset by pulses on master resent lead MR.

Output parity circuit 930 is employed during mode C operation to count the number of binary ones in each data word being transferred to output recorder 1510 to control the recording of a parity bit therewith. The input pulses appear on lead INF from gate control circuit I (FIG. 11), while pulses on lead ADV are utilized to place flip-flop 9PC1 in the same binary state as flip-flop 9PC2. After recording the information content of each data word at the output recorder 1510, the binary state of flip-flop 9PC2 provides an indication on lead OIP to control the recording of the parity bit therewith.

Generation of steering pulses by mod-N counter

Figure 11:
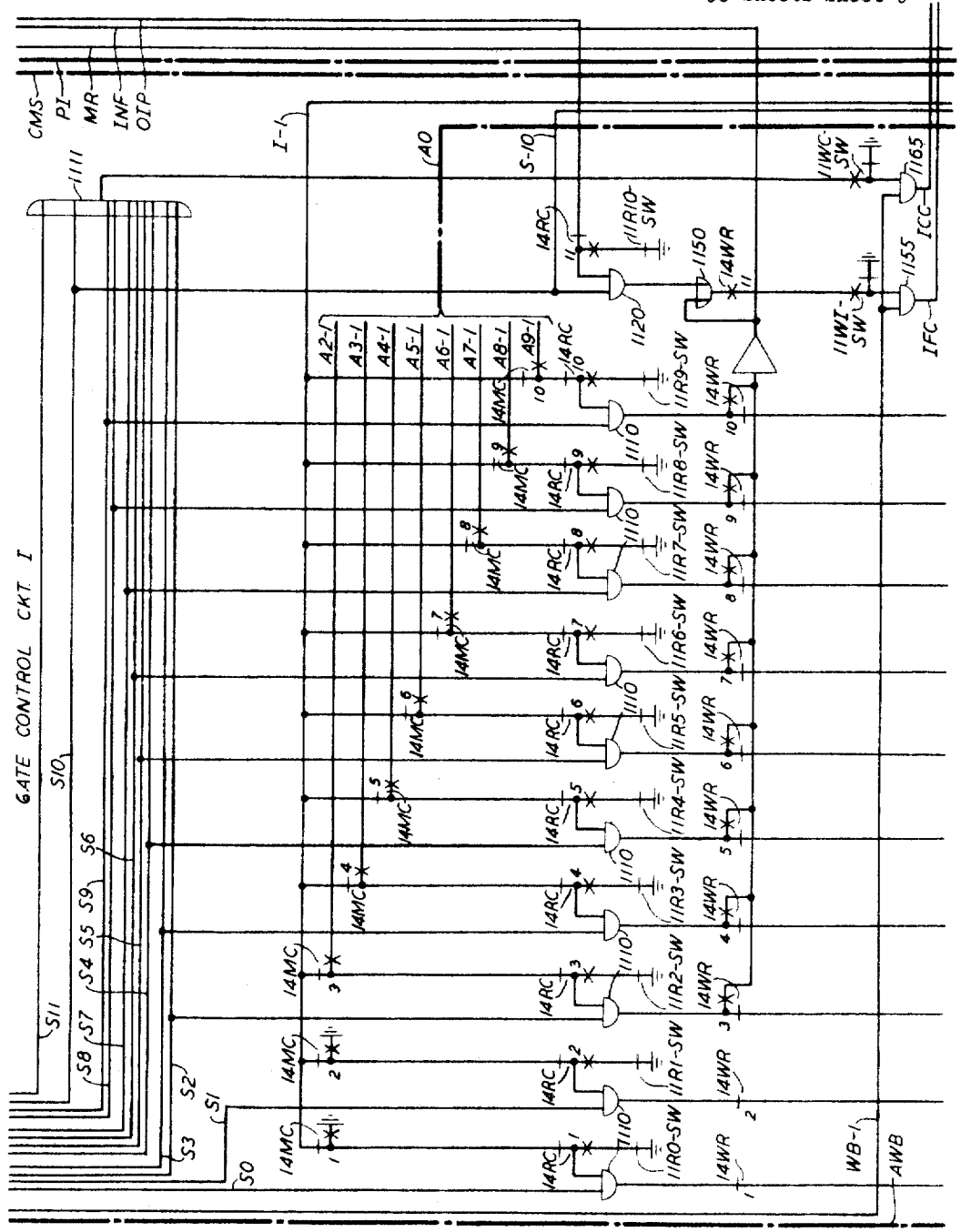
Figure 12:
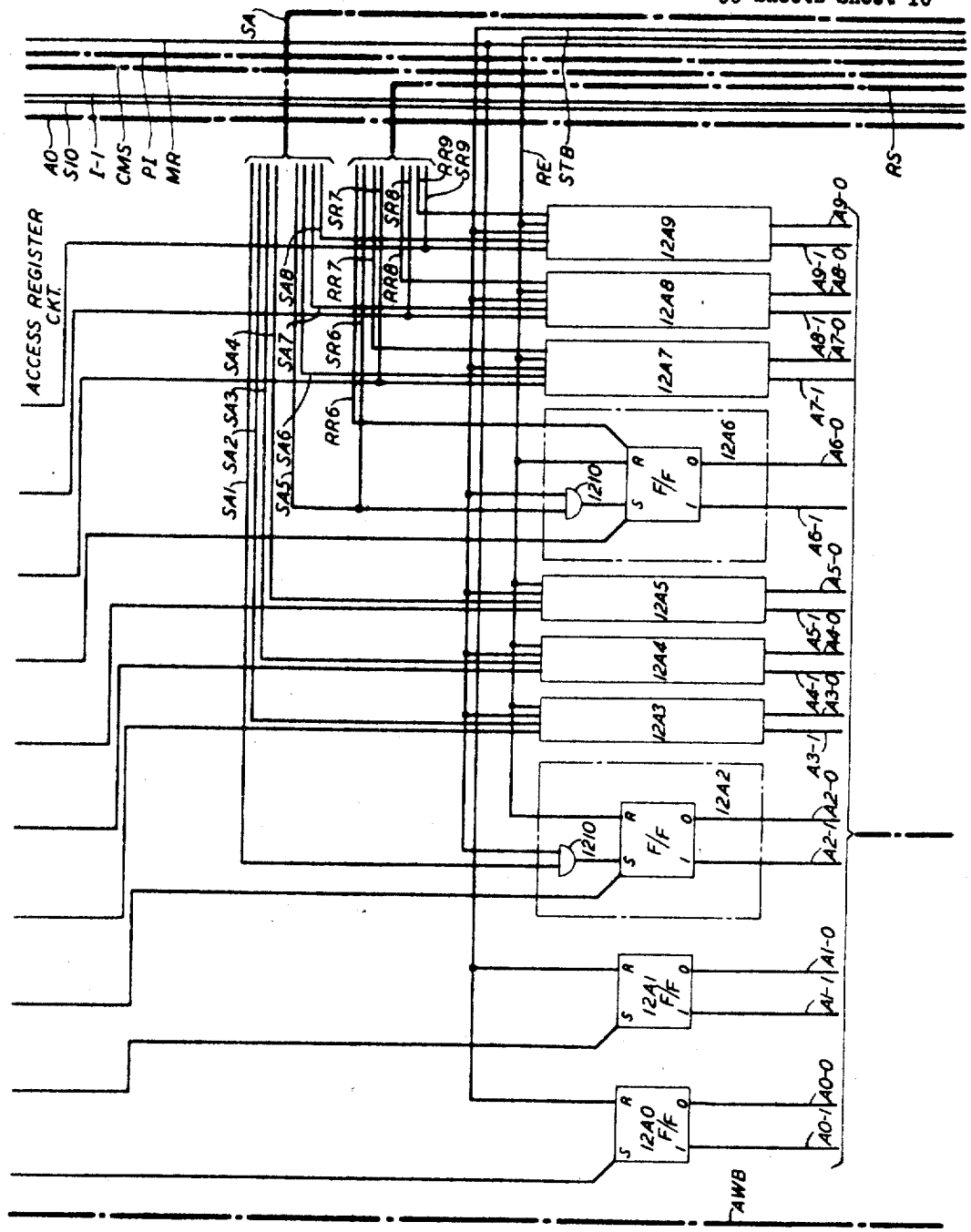

As mentioned above, pulses representative of each digit interval of the multibit word being detected by transducer 611 are provided alternately on leads P1 and P2 by pulse alternator 910. These pulses on leads P1 and P2 advance the mod-N counter (FIG. 10) through its successive stages to generate steering pulses on leads S0 through S11 to gate control circuit I (FIG. 11) to direct the information pulses on leads I-0 and I-1 to respective flip-flop locations in the access register (FIG. 12). In this manner, each binary bit of the multibit data word being detected is steered by gate control circuit I into successive flip-flops of the access register until the entire word is stored therein.

A detailed description of the mod-N counter is not deemed necessary since it is described in detail in F. M. Goetz application, Serial No. 836,411, filed Aug. 27, 1959. The pulses on lead P1 are applied to each of AND gates 1010 and the pulses on lead P2 are applied to each of AND gates 1011. The other inputs to AND gates 1010 and 1011 are derived from the outputs of the counter flip-flops 10F0, 10F1, 10F2 and 10F3 such that the counting is performed in reflected binary code sequence. The digital impulses alternate on leads P1 and P2, each pulse advancing the counter one stage through its cycle to generate successive steering pulses on leads S0 through S11 in numerical sequence. The counter recycles on receiving as many input pulses as is modulo, which in the illustrative embodiment is twelve. The reset terminal of each of the counter flip-flops 10F0 through 10F3 is connected to master reset lead MR to restore the counter to normal when a pulse appears on lead MR.

The mod-N counter (FIG. 10) also includes a counter-off-normal flip-flop 10CON to define the interval during which an error signal is sent to the program circuit (FIG. 27) due to the timeout of monopulser 8MP2. It will be recalled that monopulser 8MP2 times out only at the end of a data word or to indicate a missing bit in the data word, and upon timeout generates a signal on lead TM0. The interval for counting the signal on TM0 as an error signal is established by flip-flop 10CON as when at least five but less than eleven pulses have been counted by the mod-N counter. This interval is established through the connection of lead S10 to the reset terminal and lead S4 to the set terminal of flip-flop 10CON. Thus, flip-flop 10CON is set by each pulse on lead S4 and is reset by each pulse on lead S10, thereby providing an output signal on lead CON through cable CMS to the program control circuit (FIG. 27) between the receipt of the fifth and eleventh bits of each data word. Concurrence in the program control circuit of a signal on lead CON and a signal on lead TM0 generates an error signal on lead ER. Hence, a missing bit in a data word provides an error signal on lead ER only after at least five bits of the word have been counted; and normal time out of monopulser 8MP2 at the end of the data word will not be erroneously considered as an error since the signal on lead CON ceases after the eleventh and last bit of the data word.

Gating data to access register

Gate control circuit I (FIG. 11) corresponds generally to gate control circuit 142 described in connection with FIG. 1, and contains gating and control circuitry to direct successive bits of each data word detected during modes A and B to the respective access register flip-flops 12A0 to 12A9. In gate control circuit I the steering pulses on leads S0 through S9 are applied to respective inputs of AND gates 1110 and the information signals from information signals from information flip-flop 71NF on lead I-1 are applied in common through contacts 1 through 10 of relay 14MC and contacts 1 through 10 of relay 14RC to the other input of AND gates 1110. During modes A and B, relays 14MC, 14RC and 14WR remain unoperated and the contacts thereof remain in the position shown in FIG. 11. The steering pulses arriving successively on leads S0 through S9 in numerical sequence enable the respective AND gates 1110 to gate concurrently-applied binary information pulses on lead I-1 to the associated leads SA0 through SA9. Output signals appearing on leads SA0 through SA9 correspond to a binary 1 for that bit position of the data word being detected and set the respective flip-flops 12A0 through 12A9 in the access register in accordance therewith. Therefore, the first ten bits of the word being detected are steered in succession into flip-flops 12A0 to 12A9. The 11th and last bit of the data word being detected is retained in information flip-flop 71NF and, hence, no flip-flop in the access register is required for it. When the first ten bits of the data word have been stored in flip-flops 12A0 through 12A9, output signals indicative of the binary character thereof are provided on leads A0–1 and A0–0 through A9–1 and A9–0. The binary character of the 11th bit of the data word appears on leads I–0 and I–1 from information flip-flop 71NF.

The contacts 1 through 11 of relay 14RC and the manual switches 11R0–SW through 11R10–SW are provided for observation and maintenance purposes. When relay 14RC is operated, one input of each of AND gates 1110 and 1120 is connected to a respective one of switches 11R0–SW through 11R10–SW. Therefore, by appropriate settings of these switches any desired word may be either placed into flip-flops 12A0 through 12A9 or recorded in output recorder 1510, depending upon the state of contacts 1 through 11 of relay 14WR. When one of the manual switches is operated to ground the corresponding bit binary value is zero; when the switch is opened, the corresponding bit binary value is one.

To recapitulate, as the data words are read from one of the magnetic tracks of multichannel recorder 610 each bit is serially detected to provide an indication of the binary character thereof at information flip-flop 71NF. The output of flip-flop 71NF provides binary bit pulses on lead I–1 to AND gates 1110 in gate control circuit I (FIG. 11). The detection of each bit generates a clock pulse on lead CP to monopulser 8MP1 which provides an output pulse upon timeout on lead P to pulse alternator 910. Responsive to the pulses on lead P, pulse alternator 910 advances the mod-N counter (FIG. 10) through its successive stages. Each stage of the mod-N counter provides a unique steering pulse on one of the leads SO through S11 to AND gates 1110 to a respective one of AND gates 1110 to direct a concurrently-applied binary bit pulse on lead I–1 to a corresponding one of flip-flops 12A0 to 12A9 in the access register. In this manner, the first ten binary bits of each data word being detected is steered by gate control circuit I in succession to flip-flops 12A0 through 12A9, the 11th bit being stored in information flip-flop 71NF. At this point a signal is provided on lead S10 to the program control circuit (FIG. 27) to indicate that an entire data word has been detected. Concurrently, a parity check is made by parity circuit 718 and a signal indicative of the check is applied on leads PA–0 and PA–1 over cable P1 to the program control circuit.

*Start word detection*

Figure 13:
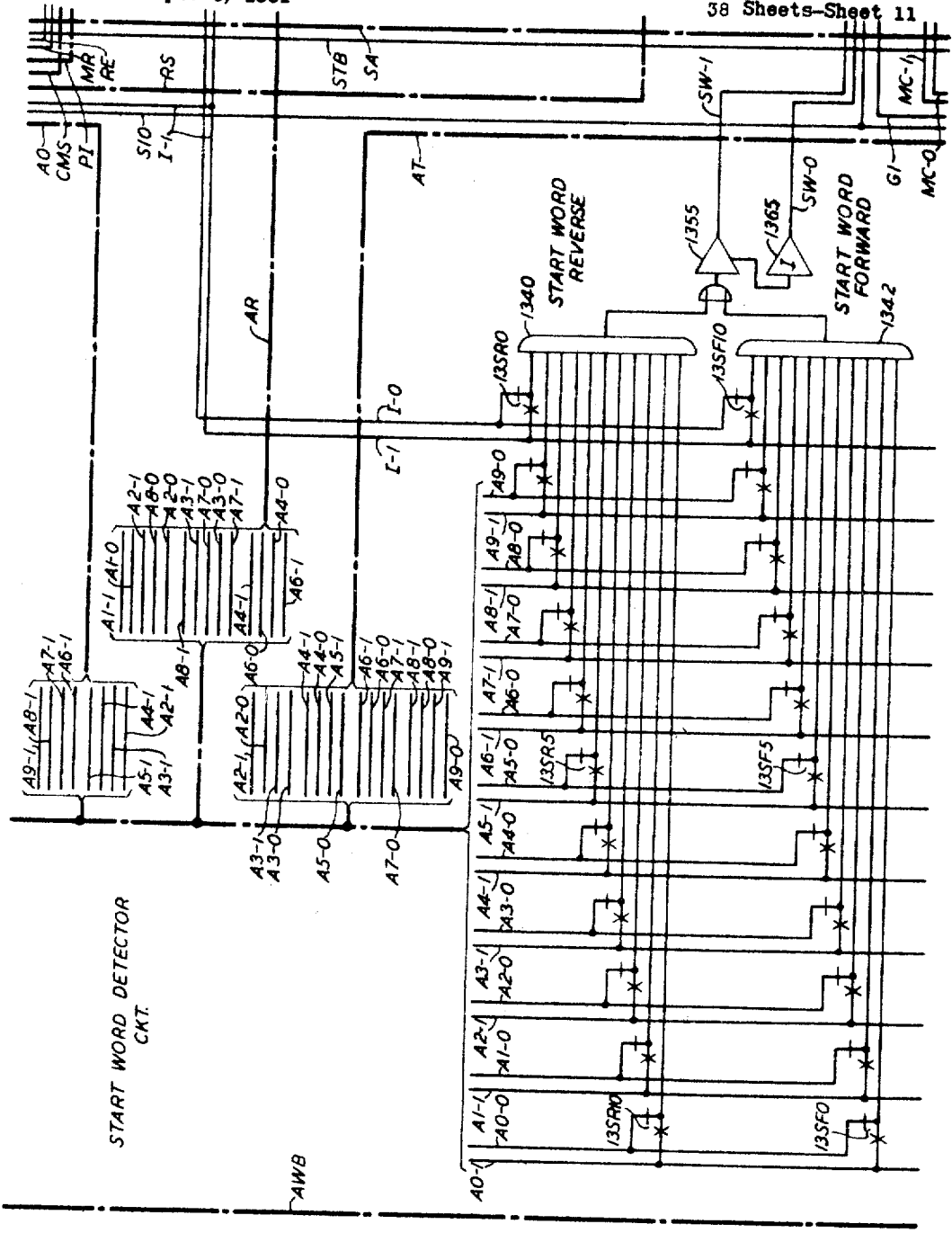

Initally, the program control circuit (FIG. 27) is searching for instructions to begin processing the traffic data. This instruction, as pointed out in connection with FIG. 5, may be a start word advantageously situated intermediate the identity data and the traffic data. Thus, each word detected from multichannel recorder 610 and gated into flip-flops 12A0 through 12A9 is examined in search of this start word; and until it is detected, each word is discarded in sequence with no other action taking place. When a start word appears in flip-flops 12A0 through 12A9 and flip-flop 71NF, its unique code is reflected on leads A0–0 and A0–1 through A9–0 and A9–1, and on leads I–0 and I–1 to the start word detector circuit (FIG. 13). Manual start word forward switches 13SF0 through 13F10 and start word reverse switches 13SR0 through 13SR10 are selectively operated prior thereto to enable AND gates 1340 and 1342 to respond to the unique start word code, whether the start word is received in the forward or the reverse direction. As discussed above, the magnetic tracks of recorder 610 may be processed regardless of whether the magnetic track is moving in a forward or reverse direction. If the magnetic track is moving in the forward direction, appearance of the start work in flip-flops 12A0 through 12A9 and flip-flop 71NF is reflected through the contacts of start word forward switches 13SF0 through 13SF10 to AND gate 1342. If the magnetic track is moving in a reverse direction, appearance of the start word is reflected through the contacts of start word reverse switches 13SR0 through 13SR10 to AND gate 1340. In any event, one of AND gates 1340 and 1342 will be enabled upon the detection of the start word to provide an indication thereof through amplifier 1355 on lead SW–1 to the program control circuit (FIG. 27). Words being detected which are not start words provide a signal through inverter 1365 on lead SW–0 to the program control circuit. In response to the start word indication on lead SW–1 and a pulse on lead S10 (which indicates detection of the last bit of the word) AND gate 2745 is enabled to provide a signal on lead MA setting mode A flip-flop 28MA and lighting mode A lamp 28MAL in the program circuit. All subsequent words detected from the magnetic track of recorder 610 are treated as traffic data words and processed under the mode A cycle of operation.

The first traffic data word following the start word provides a signal on lead SW–0 to enable AND gate 2741, setting flip-flop 27MX. The output of flip-flop 27MX permits start words at the beginning and end of a block of traffic data to be distinguished to initiate modes A and B, respectively. With mode A flip-flop 28MA and flip-flop 27MX set upon detection of the start word at the beginning of the traffic data, detection of a subsequent start word enables AND gate 2746 to set mode B flip-flop 28MB over lead MB to initiate mode B processing. Flip-flop 27MX is reset by the 6th bit (as indicated by the pulse on steering lead S5) of the data word following the detection of the start word which initiates mode B operation.

*Gating data to address register*

During the mode A cycle of processing, each traffic data word is stored bit by bit in flip-flops 12A0 through 12A9 and flip-flop 7INF in the manner discussed above. Assuming the parity check by parity circuit 718 to indicate a correct data word, a signal therefrom on lead PA–0 enables AND gate 2735 in the program circuit to provide a gating signal on lead G1 to AND gate 1412 in gate control circuit II (FIG. 14), the other input of which is provided by lead S10. Responsive to the gating pulse on lead G1 and the steering pulse on lead S10, AND gate 1412 enables each of AND gates 1410 and AND gate 1411 to transfer the stored data word which is reflected on leads A0–1 through A9–1 and I–1 to the other inputs of AND gates 1410 and 1411 and to corresponding leads M0 through M9, R0 and R1. These latter leads are connected through cable AM to the set terminals of respective address register flip-flops 34M0 through 34M6, 35M7 through 35M9, 35R0 and 35R1. Thus each data word detected from recorder 610 and found to be correct is transferred to the address register flip-flops in FIGS. 34 and 35 for mode A processing. If the magnetic track in recorder 610 is moving in the reverse direction, reverse relay 14R is energized to operate contacts 1 through 10 thereof to transfer the bits of the detected data word to leads M0 through M9, R0 and R1 in reverse order.

The address register comprises ten register flip-flops 34M0 through 34M6, 35M7 through 35M9 which receive the data words from the access register (FIG. 12) on leads M0 through M9, respectively, to define the address in the summarization store (FIGS. 38 and 39) at which a processing cycle is to be performed. The summarization store address selects the unique register location corresponding to the unit of telephone equipment from which the traffic data was obtained. At each such register location a record is maintained of the number of times that a particular traffic condition has been observed on the corresponding unit of telephone equipment. Also included in the address register are control flip-flops 35R0, 35R1 and 35R2 which function during mode A to modify the data word for processing when the summarization store is in the high-count field, and which function during modes B and C to advance the address register as an address generator or counter in a manner described below. Control flip-flops 35R0 and 35R1 are set by signals on leads R0 and R1, respectively, from gate control circuit II (FIG. 14) and control flip-flop 35R2 is set by signals on lead SW-0 from the start word detector circuit (FIG. 13).

The address register is reset at the end of each processing cycle by a signal on lead EA through AND gate 3372, OR gate 3373, and AND gates 3374 and 3375 to leads M0-R through M9-R and R0-R through R2-R connected to the respective reset terminals of flip-flops 34M0 through 34M6, 35M7 through 35M9, and 35R0 through 35R2. The signal on lead EA is developed through AND gate 3028 and OR gate 3051 in response to a signal on lead T6 from the clock pulse generator circuit (FIG. 31) indicating the end of a processing cycle. The address register flip-flops may be reset manually through the operation of address register reset switch 30ADR-SW to provide a reset signal through OR gate 3051 on lead EA.

Incorrect traffic data words

When the check by parity circuit 718 indicates an incorrect traffic data word during mode A processing, a signal therefrom on lead PA-1 enables AND gate 2744 to provide an error signal on lead ER to AND gates 3021 and 3022 in the program circuit. Enablement of AND gate 3022 pulses lead EA to cause an error count to be added to an error register in summarization store in a manner described below. The reset state of address register flip-flops 34M0 through 34M6, and 35M7 through 35M9, effected by the signal on lead EA, has been chosen arbitrarily as the summarization store register location whereat the count of errors is maintained. The incorrect data word is not transferred to leads M0 through M9, R0 and R1 since no gating signal appears on lead G1 to enable AND gates 1410 and 1411. Rather, flip-flops 12A0 and 12A1 are reset by a signal on master reset lead MR, and flip-flops 12A2 through 12A9 are reset by a signal on reset lead RE from the program circuit (FIG. 30), thereby discarding the incorrect data word with no further action with regard to it taking place.

Figure 14:
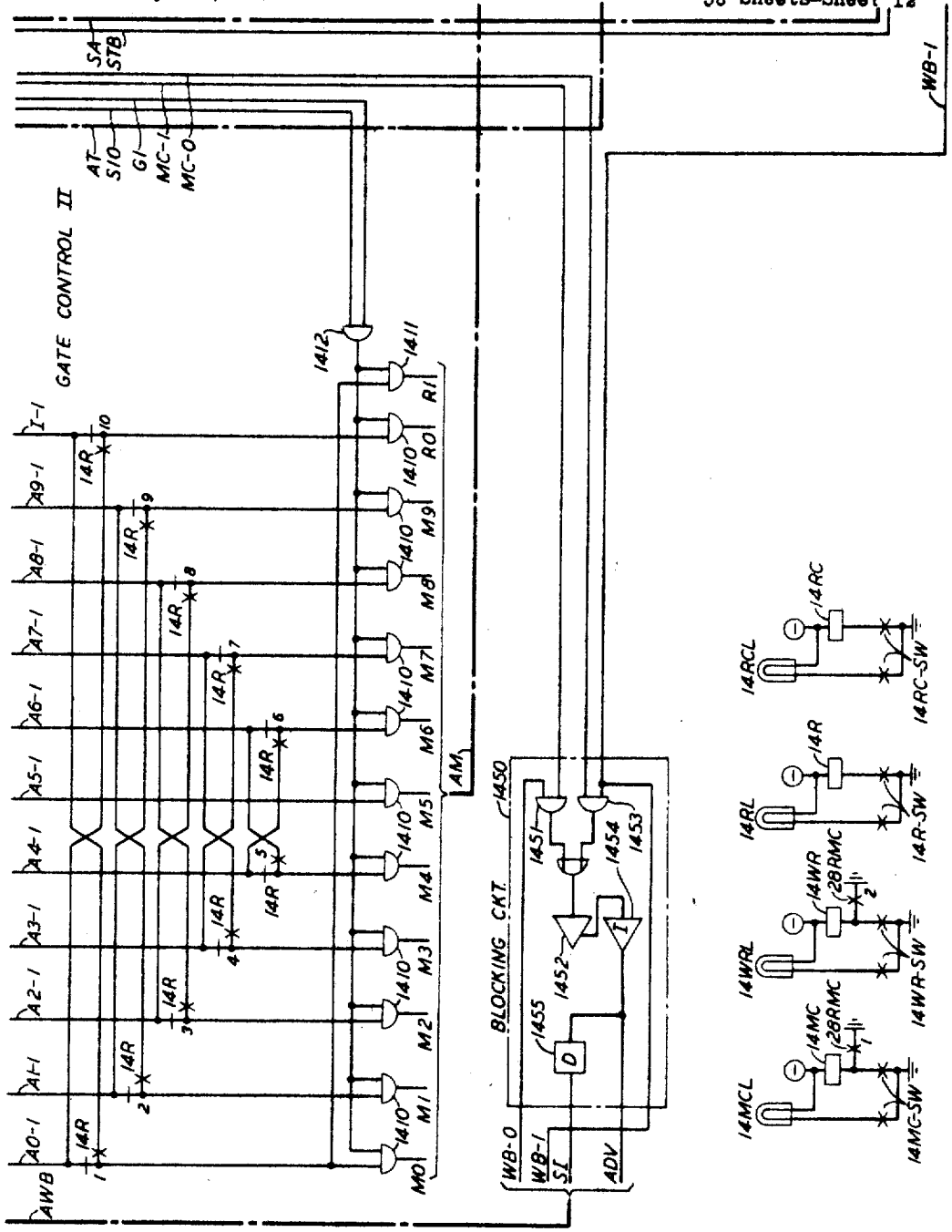
Figure 15:
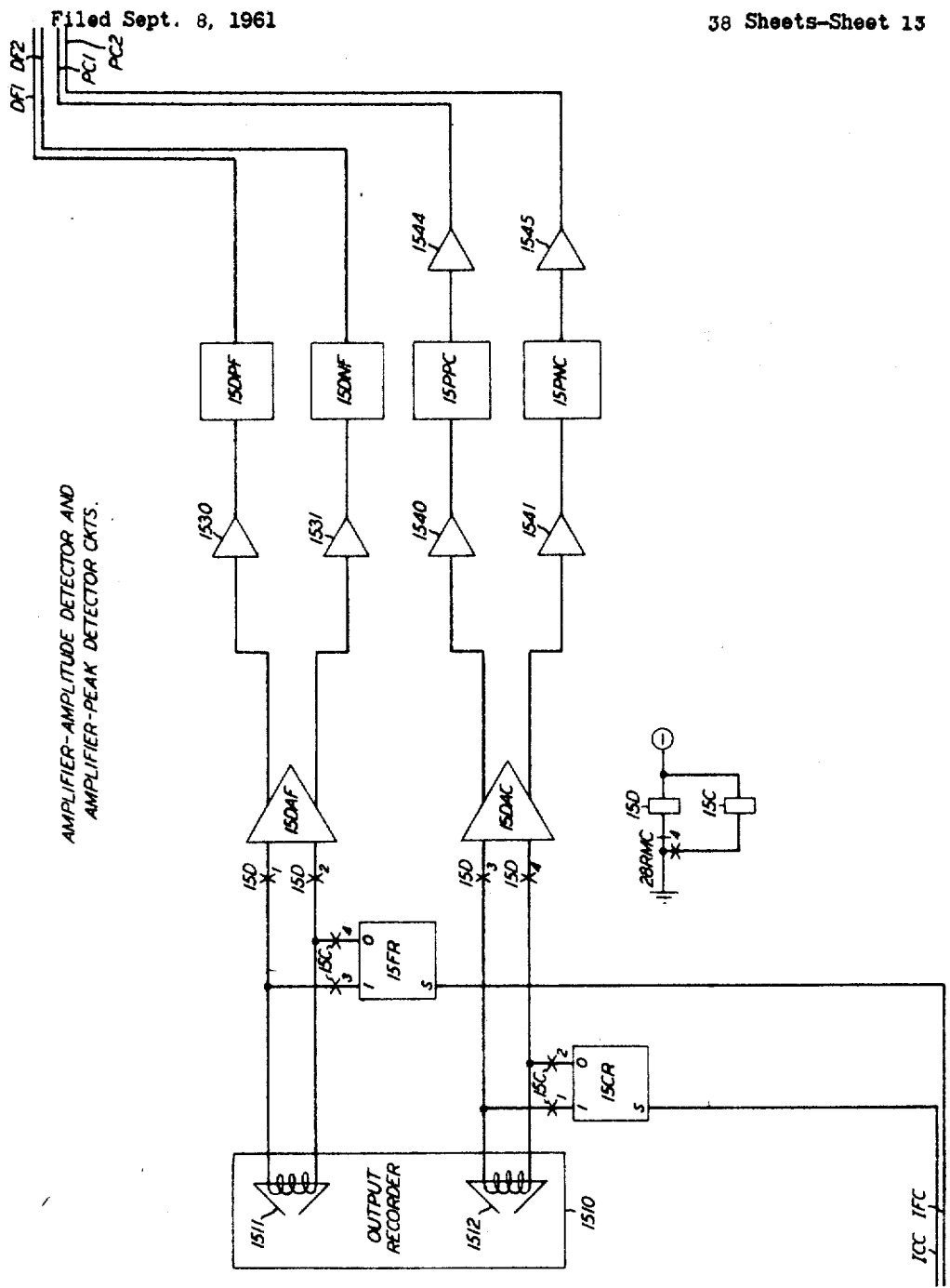

To digress for a moment, in the lower portion of FIG. 14 are shown mode C relay 14MC, output write relay 14WR, reverse relay 14R, register control relay 14RC and their associated control circuitry. The control circuitry of each of these relays includes respective manual switches 14MC-SW, 14WR-SW, 14R-SW and 14RC-SW. Operation of the respective manual switches energizes the associated relay and lights corresponding ones of lamps 14MCL, 14WRL, 14RL and 14RCL. Further, relays 14MC and 14WR are also energized during mode C through contacts 1 and 2, respectively, of relay 28RMC in the program circuit. The functions of relay 14MC, 14WR, 14R and 14RC have been considered above and the operation thereof will be considered further hereinbelow. In particular, relays 14MC and 14WR are energized during mode C operation to connect the circuitry in gate control circuit I (FIG. 11) for parallel-to-serial conversion. Relay 14R is energized during modes A and B when playback of the data recorded on multichannel recorder 610 is performed in the reverse direction; and relay 14RC is provided for maintenance and observation purposes.

Clock pulse generation for synchronous processing

Figure 28:
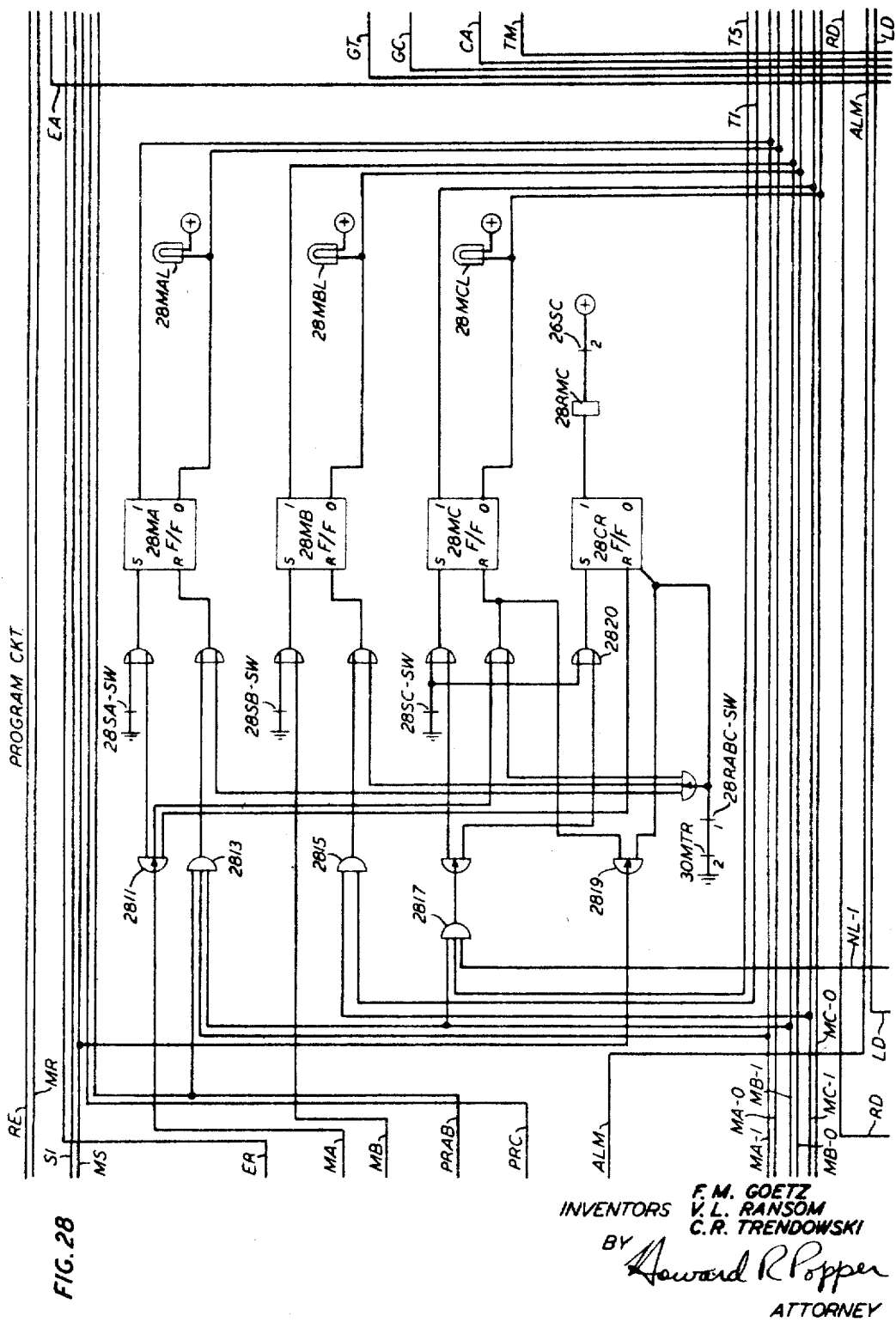
Figure 29:
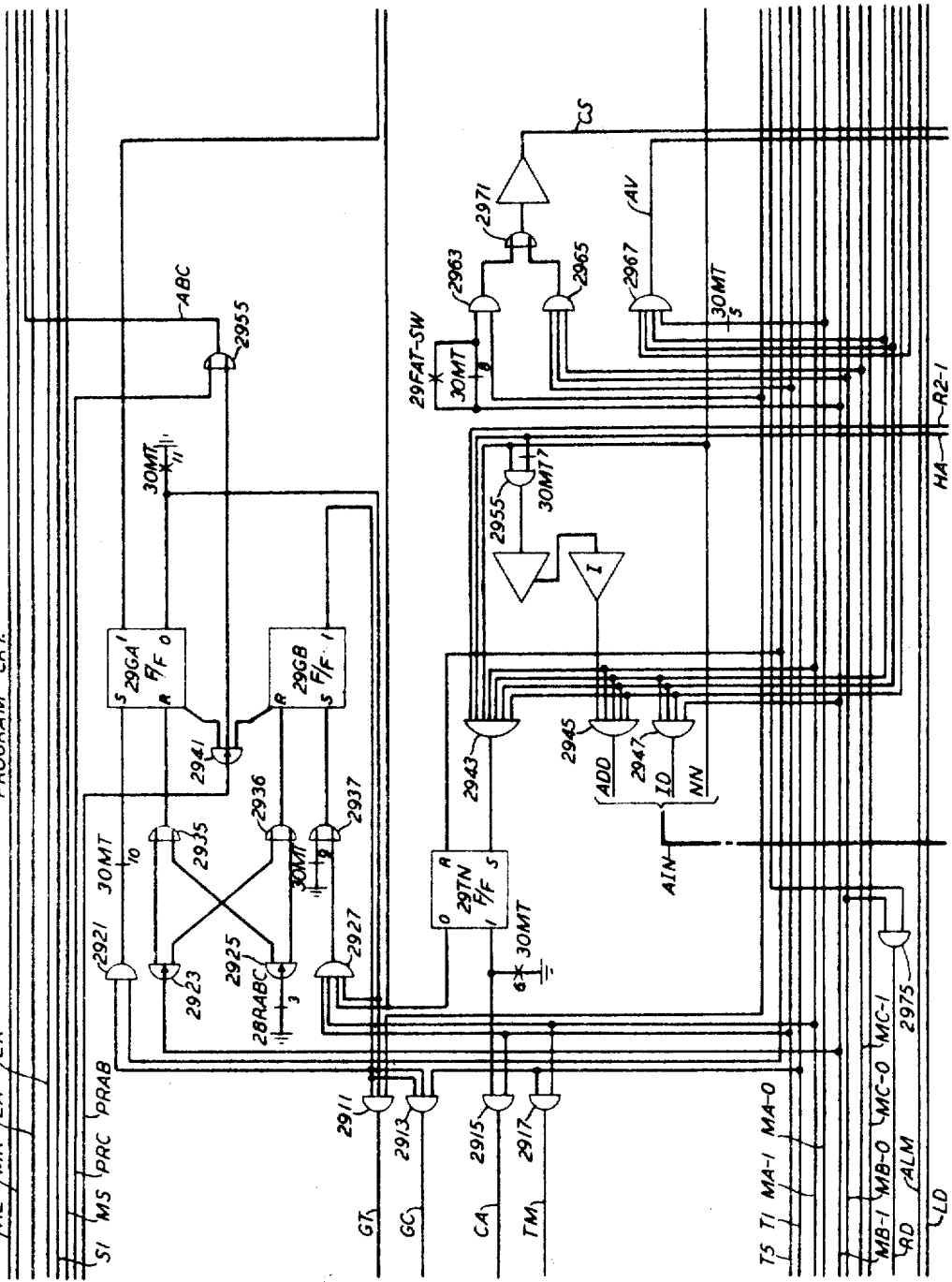
Figure 30:
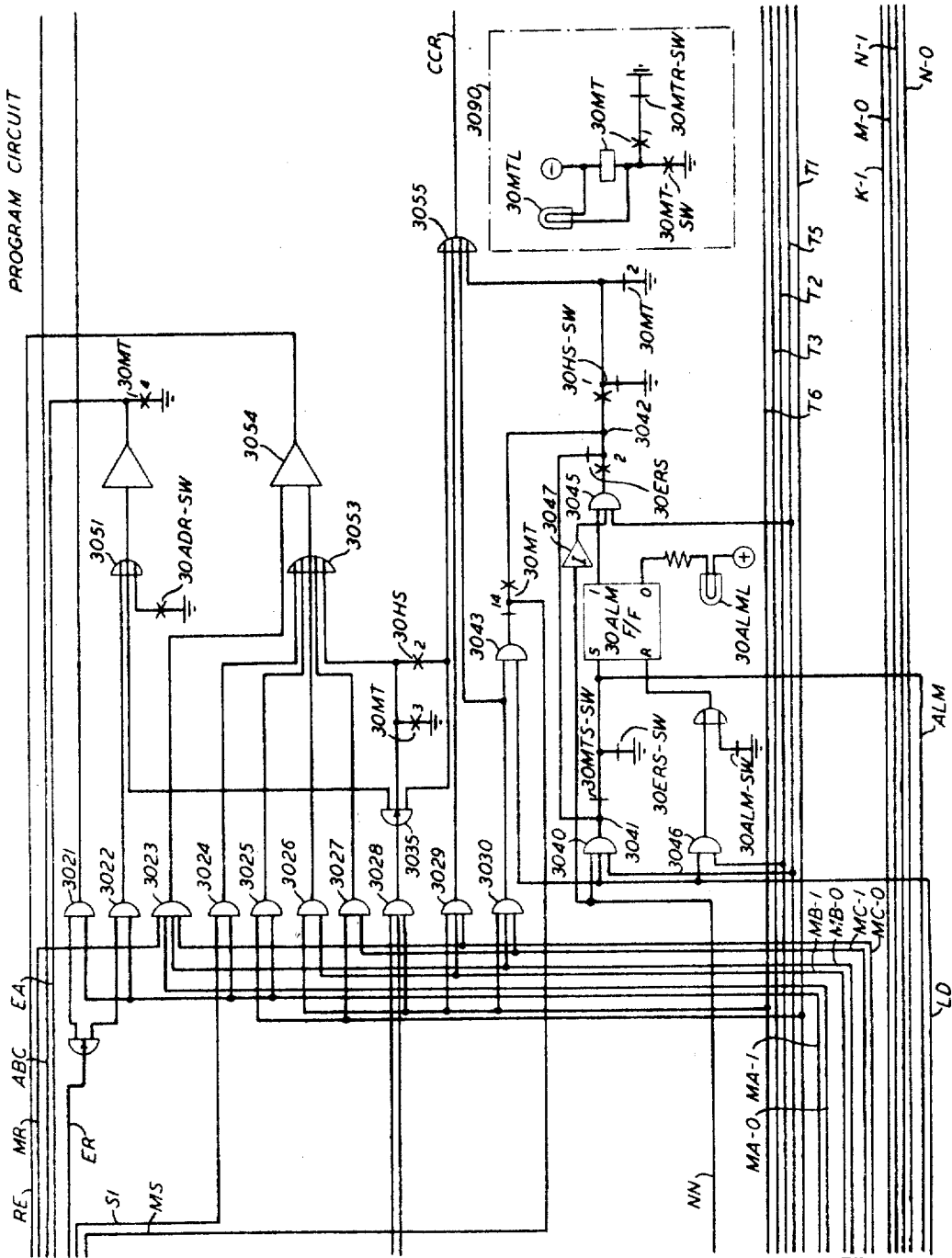

Returning to the processing of traffic data words, at the same time that the traffic word is transferred from the access register flip-flops (FIG. 12) in parallel to the address register flip-flops (FIGS. 34 and 35), a mode A process signal is generated through AND gate 2747 over process lead PRAB to the program circuit (FIGS. 28 and 29). One function of the mode A process signal on lead PRAB is to initiate the generation of a train of clock pulses for synchronously processing the traffic data word. Although the overall operation of the present circuit is of an asynchronous nature the processing of each data word is accomplished on a synchronous basis. Synchronous operation is started with each new data word and stopped upon the completion of processing that word and is achieved through the operation of the clock pulse generator circuit (FIG. 31). The clock pulse generator circuit comprises clock pulse generator 31CPG, operated under the control of flip-flop 31CC, and steering flip-flops 31K, 31M and 31N, and AND gates 3121 through 3126. The mode A process signal on lead PRAB sets flip-flop 31CC via OR gate 2955 and lead ABC to initiate operation of clock pulse generator 31CPG upon the detection of each new traffic data word; and upon the completion of a mode A process cycle, a signal from OR gate 3055 on lead CCR resets flip-flop 31CC.

Advantageously, generator 31CPG may be an astable multivibrator circuit which operates as long as a signal appears on its input terminal. Thus, upon the setting of flip-flop 31CC generator 31CPG operates to provide clock pulses alternately on leads CP1 and CP2 until flip-flop 31CP is reset. These alternating clock pulses are utilized to provide six sequential timing pulses T1 through T6 in corresponding sequential time intervals $t_1$ through $t_6$, as illustrated in FIG. 42. The outputs of flip-flops 31K, 31M and 31N are connected to the inputs of AND gates 3121 through 3126 in such a manner that the clock pulses appearing on leads CP1 and CP2 enable AND gates 3121 through 3126 in succession. The outputs thereof provide the sequential timing pulses T1, T2, T3, T5 and T6, respectively, on correspondingly designated timing leads T1, T2, T3, T5 and T6. Timing lead T4 has been omitted because a timing pulse during time interval $t_4$ is not required for the operation of the present circuit. Upon the generation of a complete cycle of successive timing pulses the pulse on lead T6 through one of AND gates 3028, 3029 or 3030 and through OR gate 3055 resets flip-flop 31CC. At this point flip-flops 31K, 31M and 31N are in the reset state ready for the initiation of a new cycle of timing pulses.

Clock start switch 31CST-SW is provided to initiate the generation of clock pulses by generator 31CPG during periods of maintenance and observation. Before operation of switch 31CST-SW, a path is provided through the break portion of the switch transfer contact to charge capacitor 3101. Therefore, upon the operation of switch 31CST-SW, capacitor 3101 discharges through the make portion of the switch transfer contact to set clock control flip-flop 31CC, and thus turn on clock pulse generator 31CPG. Clock control flip-flop 31CC may be manually reset at any point by the operation of switch 31CSP-SW to halt the generation of clock pulses by generator 31CPG. Further, manual reset switch 31CTR-SW is provided for resetting flip-flops 31K, 31M and 31N during periods of maintenance and observation.

Summarization store

As mentioned above, each traffic data word which is gated into the memory register flip-flops 34M0 through 34M6 and 35M7 through 35M9 may be considered as the address of a specific register location within the summarization store which corresponds during processing to the unit of equipment from which the data obtained. The summarization store in the present illustrative embodiment comprises a random access, word organized coincident current magnetic core memory of a type well known in the art. The illustrative magnetic core memory includes eight digit planes SS1 through SS8 each containing a rectangular array of magnetic cores. Thus, if each of the individual digit planes SS1 through SS8 contain a 32 by 32 array of cores, by way of example, the memory provides specific register locations for 1024 eight-bit binary words.

The magnetic cores in each digit plane are threaded by respective sense leads connected to a corresponding one of sense amplifiers SAA1 through SAA8, and by respective inhibit leads connected to a corresponding one of inhibit amplifiers IHA1 through IHA8. Individual row conductors are threaded through the rows of all digit planes and are connected to respective row leads SX1 through SX32. Similarly, column conductors are threaded through the columns of all digit planes and are connected to respective column leads SY1 through SY32. When one-half of the required magnetic core set current is applied via write amplifier 38WAX to a row conductor and one-half the required set current is applied via write amplifier 38WAY to a column conductor, the magnetic cores at the intersection of the selected row and column conductors in each plane will be set (indicating a binary 1). If, as is generally the case, it is desired to set the cores in certain planes (writing binary 1's thereat) while preventing the setting of cores in other planes at the same selected address (writing binary 0's thereat), an inhibit signal is applied to those other planes on the corresponding ones of inhibit leads IH1 through IH8. The signal on an inhibit lead opposes and cancels the effect of the set current provided to the associated digit plane on the row conductor, thereby inhibiting the setting of the magnetic core in that digit plane and leaving it in the zero state.

To sense or read the binary information stored at a selected address, one-half the required core reset current is applied via read amplifier 38RAX to the row conductor of the selected address and one-half the reset current is applied via read amplifier 38RAY to the column conductor thereof. Output signals indicative of the stored information in each digit plane at the selected address are produced thereby on the respective sense leads SA1 through SA8. The output from an unset core is of lesser magnitude and shorter duration than that from a set core permitting a stored binary 0 to be distinguished from a stored binary 1. Whenever a stored word is read from a selected address, the magnetic core in each plane at that address is left in the reset state.

*Summarization store address translation*

Selection of a particular address in the summarization store is perfomed by a pair of diode translators 40DTX and 40DTY which convert the traffic data word located in address register flip-flops 34M0 through 34M6 and 35M7 through 35M9 into selection signals for an appropriate one of leads SX1 through SX2 and for an appropriate one of leads SY1 through SY32. In the illustrative embodiment, each of diode translators 40DTX and 40DTY comprises essentially a set of 32 five-input AND gates. The inputs to row translator 40DTX are derived from the binary information located in address register flip-flops 34M0 through 34M4 over leads M0-0 and M0-1 through M4-0 and M4-1, respectively; and the inputs to column translator 40DTY are derived from the binary information located in flip flops 34M5, 34M6 and 35M7 through 35M9 over leads M5-0 and M5-1 through M9-0 and M9-1, respectively. Thus, the first half of the traffic data word stored in the address register defines the row address, and the second half of the stored word defines the column address. Each combination of binary inputs signals to the respective translators 40DTX and 40DTY selects one, and only one, of the row translator output leads DX1 and DX32 and one of the column leads DY1 and DY32. The translator output leads are connected through respective selector switches 40SWX1 through 40SWX32 and 40SWY1 through 40SWY32 to the corresponding row leads SX1 through SX32 and to the corresponding column leads SY1 through SY32, respectively.

Selection switches 40SWX1 through 40SWX32 and 40SWY1 through 40SWY32 may be advantageously of the type illustrated as switch 40SWX32. Each switch therefore comprises a bilateral transistor $Q_x$, the base of which is connected through a resistor $R_b$ to one of the translator output leads. One electrode of transistor $Q_x$ is connected to ground, and the other electrode is connected through a small resistance $R_1$ to a respective one of the summarization store row or column conductors. Bias is applied from a negative source $Y_b$ through current limiting resistance $R_s$ to the input of the selector switch. An unselected switch has a positive potential applied to the input thereof by the associated translator output lead which reverse biases transistor $Q_x$ to present a very high impedance to the row or column conductor connected thereto. When all diodes associated with a specific translator output lead are reverse-biased by the signals on the input leads from the address register, the input to the selected switch is effectively open-circuited, thereby permitting transistor $Q_x$ to be forward-biased by the negative source $V_b$. The current resulting therefrom saturates transistor $Q_x$ to present a low impedance ground to the selected summarization store row or column conductor.

*Processing traffic data on individual basis*

As has been pointed out, a mode A processing cycle begins when a traffic data word is registered in address register flip-flops 34M0 through 34M6 and 35M7 through 35M9, and a mode A process signal is generated over lead PBAB. Initially, the traffic data word is counted on an individual basis in the register location in the summarization store corresponding to the unit of telephone equipment from which the data is obtained. The mode A process signal sets flip-flop 31CC starting the generation of timing pulses by generator 31CPG on leads T1, T3, T5 and T6 as discussed above. The process signal also resets flip-flops 29GA and 29GB through AND gate 2941.

The resulting mode A process cycle is as follows: The first timing pulse, on lead T1, enables AND gate 3025 to provide a signal through OR gate 3053 and amplifier 3054 on lead RE to reset access register flip-flops 12A2 through 12A9. This prepares these flip-flops to receive the number stored at the selected address in the summarization store. In the interval between timing pulses on lead T1 and T3, the address in the address register is propagated through the address register translators 40DTX and 40DTY to connect a low impedance ground to the row and column conductor of the summarization store reigster location corresponding to the selected address. The third timing pulse, on lead T3, enables AND gate 2975 to provide a read signal on lead RD to read monopulser 38RMP. Responsive to the read signal, monopulser 38RMP provides a one-half reset current pulse through read amplifiers 38RAY and 38RAX to the column and row conductors, respectively, which have been connected to a low impedance ground by diode translators 30DTX and 30DTY. Outuput binary signals produced thereby on sense leads SA1 through SA8 are applied through cable SA and AND gates 1210 to the set terminals of access register flip-flops 12A2 through 12A9, respectively. The AND gates 1210 are enabled by a pulse on lead STB from monopulser 38DMB, the input of which is derived from the read signal on lead RD through monopulser 38RMP. Thus the number stored at the selected register location in the summarization store is transferred to the access register and the summarization store register location is left reset by the read signal.

The number registered in flip-flops 12A2 to 12A9 represents the number of times the traffic data word registered in the address register flip-flops has previously appeared during the block of traffic information being processed. It is now desired to add a count of one to the number in flip-flops 12A2 through 12A9 and to write the numerically greater count back into the summarization store at the same register location from which the original number was read. The add-one operation is accomplished through the access register translator (FIG. 32) which receives the number from access register flip-flops 12A2 to 12A9 on leads A2–0 and A2–1 through A9–0 and A9–1 via cable AT, and which provides a number which is numerically one greater at the output of AND gates 3210 and 3230 on leads IT1 through IT8 to inhibit amplifiers IHA1 through IHA8, respectively.

Since the output of the translator is used to control inhibit amplifiers IHA1 through IHA8 during the write operation, the number developed at the translator output is inverted. This is required, as was pointed out above, because writing in the summarization store is accomplished by applying a set current to each core of the selected address; and where it is desired to write a binary 0, a one-half reset inhibit current is applied to the magnetic core to oppose the setting field. This inhibit current must be applied before the application of the set or writing current and it must remain until after the set current has been removed. The only exception to this method of writing binary zeros occurs when it is desired to write a zero in all bits of the binary word. In this case, the write command is simply omitted.

The traffic counts registered in summarization store registers are encoded in binary-decimal form. Thus, the indication on leads A2–0 and A2–1 through A5–0 and A5–1 represents the decimal units digits and the indication on leads A6–0 and A6–1 through A9–0 and A9–1 represents the decimal tens digit. The total count capacity of each 8-bit register location therefore is 99. However, for greater flexibility and to provide greater count capacity where required, the summarization store registers are organized into high-count and low-count fields, and observed telephone units of expected high activity are associated with the registers in the high-count field. The registers in the high-count field each comprise two adjacent 8-bit register locations, thus permitting a total count capacity of 9999. As will be explained below, two complete cycles of timing pulses are required to process a traffic data word at a high-count register location in the summarization store.

*Processing traffic data in low-count field*

Considering first mode A processing at a low-count register location, the signal to perform the add-one operation to the number provided on input leads A2–0 and A2–1 through A9–0 and A9–1 is a pulse on lead ADD through cable AIN from AND gate 2945 which is enabled during time interval $t_4$ by the binary state of flip-flops 31K, 31M and 31N. The pulse on lead ADD is applied through amplifier 3205 to the inputs of AND gates 3222 and 3223. The AND gate 3222 is enabled thereby when the register count reflected on leads A2–1, A5–1, A6–1 and A9–1 is equal to 99; and AND gate 3223 is enabled thereby when the register count is less than 99. Thus, when the number in the units position is less than 9, as indicated by a signal at the output of inverter 3243, AND gate 3225 is enabled by the output of AND gate 3223 to provide a signal through OR gate 3251 on lead 3260. Enabled by the signal on lead 3260, AND gates 3230 transfer the same tens digit to output leads IT5 through IT8 as received on input leads A6–0 and A6–1 through A9–0 and A9–1. At the same time the number in the units position is propagated through AND gates 3210 which are enabled by the pulse on lead ADD through AND gates 3223 to develop a units digit which is numerically one greater on lead IT1 through IT4.

However, when the number in the units position which is reflected on leads A2–0 and A2–1 through A5–0 and A5–1 is exactly 9, AND gates 217 provides a signal through amplifier 3214 and AND gate 3224 on lead 3261 to AND gates 3231 to develop a tens digit on output leads IT5 through IT8 which is numerically one greater than the tens digit received on leads A6–0 and A6–1 through A9–0 and A9–1. The units digit under this condition is translated to zero through AND gates 3210 to provide an inhibit signal on leads IT1 through IT4 to inhibit amplifiers IHA1 through IHA4, respectively.

Whenever the number registered in access register flip-flops 12A2 through 12A9 is 99, i.e., the count capacity of a low-count summarization store register, AND gate 3211 produces a signal through amplifier 3212 on lead NN which, with the signal on lead ADD, enables AND gate 3222. A signal provided by the enablement of AND gate 3222 is applied to AND gates 3220 and on lead 3260 to AND gates 3230 to control writing back the count of 99 into the same register location. Thus the count of 99 at the input of the access register translator is transferred to output leads IT1 through IT8, and this capacity count is locked into the low-count register to indicate an overflow condition.

In any event, the signal developed on one of leads 3260 and 3261 is transferred to OR gate 3253 and amplifier 3254 to provide a write signal on lead WR to write monopulser 38WMP. A write current pulse is generated thereby through write amplifiers 38WAX and 38WAY to the row and column conductors, respectively, to which a low impedance ground connection has been provided by diode translators 40DTX and 40DTY. By sending the signal on lead ADD first through the access register translator, the inhibit signals are developed on leads IT1 through IT8 before the write current pulse is applied to the summarization store, thereby assuring proper setting of the cores at the selected address. The write operation ceases with the occurrence of a timing pulse on lead T5.

*Processing traffic data in high-count field*

When a traffic data word is received in the address register flip-flops 34M0 through 34M6 and 35M7 through 35M9 which belongs in the high-count field of the summarization store, processing proceeds in a manner substantially similar to that discussed above, except when the count stored in the addressed summarization store register location reaches 99. At this point, the program circuit must cause a zero to be written in the tens and units position for that address, and the address in the address register must be modified to select the adjacent next higher address in the summarization store (which is reserved for the thousands and hundreds digit of the count total for the data word being processed) to increase the count thereat.

To achieve modification of the address registered in the address register flip-flops, utilization is made of control flip-flops 35R0 through 35R2. When the input traffic data word is transferred into the address registers flip-flops, control flip-flop 35R1 is placed by AND gate 1411 in the same binary state as address register flip-flop 34M0, and control flip-flop 35R0 is placed in the same binary state as the parity bit indicated on lead I–1 from flip-flop 7INF. In the case being considered herein where the address registered in the address register flip-flops is in the high-count field, the parity bit signal on lead I–1 always sets flip-flop 35R0 since the addresses in the high-count field include only every other address. Control flip-flop 35R2 is set by a signal on lead SW–0 from the start word detector circuit (FIG. 13). Therefore, flip-flops 35R0 and 35R2 are placed in the set condition and flip-flop 35R1 is placed in the same binary state as register flip-flop 35M0.

In response to the timing pulse on lead T3, a read signal is generated on lead RD and the number (tens and units digit) stored in the summarization store at the address registered in the address register flip-flops is transferred to the access register in the manner discussed above. Assuming this number is 99, a signal is returned on lead NN to AND gates 2943 and 2955 in the program circuit. The signal on lead NN and a high-count register address signal on lead HA from AND gate 3555 in the address register enable AND gate 2955 to block the generation of a signal on lead ADD by AND gate 2945 during timing interval $t_4$. This automatically leaves all zeroes in the 8 bits of the summarization store at the address being processed.

During the timing interval $t_4$ (determined by flip-flops 31K, 31M and 31N), AND gate 2943 is enabled by the signals on leads HA and NN and on lead R2-1 from flip-flop 35R2. The output of AND gate 2943 sets flip-flop 29TN, the output of which on lead TN-1 enables AND gate 2915 upon the concurrence of a timing pulse on lead T5. The output of AND gate 2915 on change address lead CA resets control flip-flop 35R0 and changes the state of register flip-flop 34M0 to the opposite binary state through either AND gate 3341 or AND gate 3342 according to the binary state of control flip-flop 35R1. Recalling that traffic data words are encoded in reflected binary notation (thus the parity bit of each number is always in the opposite state of the zero order flip-flop of the next higher number) it is clearly seen that the change in state of register flip-flop 34M0 changes the address stored in register flip-flops 34M0 through 34M6 and 35M7 through 35M9 to the next higher address; that is, the address of the thousands and hundred digits of the count total of the data word being processed.

Since the clock control flip-flop 31CC is not reset, a new cycle of timing pulses is generated by generator 31CPG. The first timing pulse, on lead T1, resets access register flip-flops 12A2 through 12A9, as before, in preparation for the number stored at the address now registered in the address register flip-flops. The pulse on lead T1 also provides a signal through AND gate 2917 on lead TM to AND gates 3343 through 3346 to place control flip-flop 35R1 in the same binary state as flip-flop 34M0 and to place control flip-flop 35R2 in the same state as flip-flop 35R0. The second timing pulse, on lead T2, resets flip-flop 29TN. A read signal is generated in response to the timing pulse on lead T3, and the hundreds and thousands digits in the addressed register location are transferred to access register flip-flops 12A2 to 12A9, the hundreds digit indication appearing on leads A2-0 and A2-1 through A5-0 and A5-1, and the thousands digit indication appearing on leads A6-0 and A6-1 through A9-0 and A9-1. If the number is less than 99 a signal is provided during interval $t_4$ on lead ADD to the access register translator and to write monopulser 38WMP, as discussed above, to write a number numerically one greater back into the summarization store. If the number is exactly 99, the signal on lead NN is again returned to AND gate 2955 to block the signal on lead ADD during interval $t_4$, thereby leaving zeroes stored at the addressed summarization store register location. In the latter instance, successive traffic data words corresponding to that register location will cause the count contained therein to recycle.

*Processing traffic data on group basis*

This completes the processing of the traffic data word on an individual basis, and on the next timing pulse (on lead T5) the group address flip-flop 29GB is set through AND gate 2927 and OR gate 2937 to begin processing of the data word on a group basis. In the illustrative embodiment the individual register locations in the summarization store have been divided, by way of example, into eight groups. All of the group register locations are in the high-count field and contain partial summaries of the data obtained from predetermined groups of the equipment being observed. Thus (after the data obtained from the observation of a unit of equipment has been counted in the manner described above, it is modified by the program circuit to select the group register in the summarization store with which it is associated, and the count stored thereat is numerically increased by one. The group count process is as follows: With flip-flop 29GB set, the timing pulse on lead T6 enables AND gate 2911 to provide a signal on lead GT to the inputs of AND gates 3331 through 3338 and to the set terminal of control flip-flop 35R0. The outputs of AND gates 3333 through 3336 place address register flip-flops 34M2 and 34M1 in the same binary state as flip-flops 35M8 and 35M7, respectively. The outputs of AND gates 3331 and 3332 place flip-flop 34M3 in the opposite binary state from flip-flop 35M9. Further, if the number of set flip-flops in the group 35M7, 35M8 and 35M9 is "odd," as indicated by an output from AND gates 3360 through OR gate 3361 and amplifier 3362, AND gate 3338 sets register flip-flop 34M0. If, on the other hand, the number of set flip-flops in this group is "even," a signal at the output of inverter 3363 through AND gate 3337 resets flip-flop 34M0.

The next cycle of timing pulses now begins, and the timing pulse on lead T1 enables AND gates 2913 to provide a signal over lead GC through AND gate 3371 to set flip-flop 35M9, and through AND gate 3371, OR gate 3373 and AND gate 3375 to reset register flip-flops 34M4, 34M5, 34M6, 35M7 and 35M8. The address modification is complete at this point and the group address is registered in the address register flip-flops. It can be seen by considering the reflected binary equivalents that the proceding address modification in the exemplary embodiment of 1024 addresses results in the group addresses on the right for the groups of individual addresses on the left in the following table:

*Table 1*

| Individual Addresses | Group Addresses |
|---|---|
| 0– 127 | 1,006–1,007 |
| 127– 255 | 1,008–1,009 |
| 256– 383 | 1,010–1,011 |
| 374– 511 | 1,012–1,013 |
| 512– 639 | 1,014–1,015 |
| 640– 767 | 1,016–1,017 |
| 768– 895 | 1,018–1,019 |
| 896–1,023 | 1,020–1,021 |

The processing now proceeds at the group address in the same manner as at any other address in the high-count field, reading occurring during interval $t_3$ and writing occurring during interval $t_4$. Prior to this, however, the timing pulse on lead T2 sets flip-flop 29GA through AND gate 2921. Thus, upon the completion of this cycle of timing pulses, the pulse on lead T6 enables AND gate 3028 to reset clock control flip-flop 31CC through AND gate 3035 and OR gate 3055 over lead CCR. This halts the generation of timing pulses by generator 31CPG and ends a complete mode A process cycle. Successive mode A process cycles are carried out in a similar manner registering the individual totals and the group totals in the summarization store until all of the traffic data words in the composite block of traffic information have been processed.

*Processing error counts*

As mentioned above, a count is kept at summarization store address 0 of the number of words found to be incorrect, mutilated or unreadable by the input logic detection circuit (FIG. 7). These words may result in parity failures as indicated by parity circuit 718, or in missing bit failures as indicated by time-out monopulser 8MP2 in the middle of a data word. Whenever an error is detected during mode A processing, an error signal is developed on lead ER to enable AND gates 3021 and 3022 in the program circuit. The output of AND gate 3021 sets the clock control flip-flop 31CC to initiate a signal of timing pulses to process the error count. The output of AND gate 3022 provides a signal on lead EA to reset address register flip-flops 34M0 through 34M6, 35M7 through 35M9, thus placing them in the address state 0. The first timing pulse, on lead T1, resets access register flip-flops 12A2 through 12A9, as in all previous mode A processing cycles, to clear the access register for the error count total to be read from the summarization store register location 0. A read signal is developed on lead RD during the interval $t_3$ and the error count is transferred to the access register. During the interval $t_4$ a signal is developed on lead ADD to the access register translator, and a write signal on lead WR causes an error count numerically one larger than the count stored in the access register to be written back into the summarization store register location 0 in the usual manner. Since the error count register location is in the low-count field, if the count total reaches 99 the count is locked in to indicate an overflow condition. Further, since flip-flops 29GA and 29GB remain set from the previous mode A process cycle (no mode A process cycle is developed on lead PRAB through AND gate 2941 to reset flip-flops 29GA and 29GB during error count processing), the timing pulse on lead T6 resets clock control flip-flop 31CC through AND gate 3028 over lead CCR, halting the generation of timing pulses.

Mode B operation

Throughout the mode A processing of traffic data words, each word detected is examined by the start word detector circuit (FIG. 13) in search of another start word, the presence of which indicates that all of the traffic data words have been processed and only the identity data words remain in the composite block of traffic information being processed. Detection of the subsequent start word produces a signal through amplifier 1355 on lead SW-1 to the inputs of AND gates 2737 and 2746 in the program control circuit. The set state of flip-flop 27MX distinguishes this start word from the start word which initiated mode A operation and, upon concurrence of a last bit pulse on steering lead S10, enables AND gate 2746, setting flip-flop 28MB and lighting mode B lamp 28MBL. The output of flip-flop 28MB on lead MB–1 resets flip-flops 29GA and 29GB through AND gate 2923 and OR gates 2935 and 2936. Flip-flops 29GA and 29GB are not used during mode B operation. The set state of flip-flop 27MX also enables AND gate 2737 to provide a signal on lead G1 through AND gate 1412 to enable AND gates 1410 and 1411 in gate control circuit II. Enablement of AND gates 1410 and 1411 transfers the start word from access register flip-flops 12A0 through 12A9 and information flip-flop 71NF over lead M0 through M9, R0 and R1, respectively, to address register flip-flops 34M0 through 34M6, 35M7 through 35M9, and control flip-flops 35R0 and 35R1. No process command, however, is sent to the program circuit since neither of AND gates 2747 and 2748 is enabled. Thus, the start word is retained in the address register flip-flops while the first identity word is detected from the composite block of traffic information being processed.

The identity data words are not processed as the traffic data words were under mode A, but are transferred to predetermined register locations in the summarization store. The start word registered in the address register flip-flops has been chosen to be the address at which the first identity data word is to be stored. Assuming that there are twenty identity data words to be stored, by way of example, in the illustrative embodiment the address of the first identity data word, and thus the number encoded in the start word, has been arbitrarily selected as 21. Successive identity data words are stored in adjacent successively-lower addresses in the summarization store, the final identity data word being stored at address 2. These successive summarization store addresses are obtained through successive modifications of the information contained in the address register flip-flops; i.e., the address register is stepped down sequentially as an address generator.

Identity data word representations

The identity data, it will be recalled, comprises information as to the switching office number, the date and time of the measurements, and the type of circuit groupings to permit subsequent identification of the traffic data. Each identity data word includes one decimal digit of information encoded in binary notation in symmetrical form. Thus each eleven-bit identity data word contains the same five-bit binary-decimal digit, inclusive of parity bit, written in duplicate in reverse order on opposite sides of an over-all parity bit. This permits the identity data words to be checked for both single and double errors in the detection circuitry, as described more fully in the above-mentioned W. J. Lamneck application No. 17,648. In the case of a single-bit error arising in either representation of the decimal digit within the identity word, the other and correct representation is used. If a double error occurs, an alarm signal is provided to the program circuit. The following table illustrates the identity word representations of the various encoded identity word decimal digits, where the individual digit parity bits appear at positions A0 and I, and the overall parity bit appears at position A5:

Table II
IDENTITY DATA WORDS

| Decimal Digit | A0 | A1 | A2 | A3 | A4 | A5 | A6 | A7 | A8 | A9 | I |
|---|---|---|---|---|---|---|---|---|---|---|---|
| 0 | 1 | 0 | 0 | 0 | 0 | 1 | 0 | 0 | 0 | 0 | 1 |
| 1 | 0 | 0 | 0 | 0 | 1 | 1 | 1 | 0 | 0 | 0 | 0 |
| 2 | 0 | 0 | 0 | 1 | 0 | 1 | 0 | 1 | 0 | 0 | 0 |
| 3 | 1 | 0 | 0 | 1 | 1 | 1 | 1 | 1 | 0 | 0 | 1 |
| 4 | 0 | 0 | 1 | 0 | 0 | 1 | 0 | 0 | 1 | 0 | 0 |
| 5 | 1 | 0 | 1 | 0 | 1 | 1 | 1 | 0 | 1 | 0 | 1 |
| 6 | 1 | 0 | 1 | 1 | 0 | 1 | 0 | 1 | 1 | 0 | 1 |
| 7 | 0 | 0 | 1 | 1 | 1 | 1 | 1 | 1 | 1 | 0 | 0 |
| 8 | 0 | 1 | 0 | 0 | 0 | 1 | 0 | 0 | 0 | 1 | 0 |
| 9 | 1 | 1 | 0 | 0 | 1 | 1 | 1 | 0 | 0 | 1 | 1 |

The above bit positions A0 through A9 and I correspond to access register flip-flops 12A0 through 12A9 and information flip-flop 71NF, respectively.

Although duplicate representations of a binary-decimal digit are included in each identity data word for greater reliability, only one of the representations is retained for transfer to the summarization store. The binary-decimal digit represented in access register flip-flops 12A6 through 12A9 is arbitrarily selected for transfer in all instances where the identity word is found to be correct. Where a single error is detected in one digit representation, the other representation is placed in flip-flops 12A6 through 12A9 for transfer; and where a double error is detected, neither decimal digit representation is transferred to the summarization store. Thus, in each case where an identity digit is transferred to the summarization store, it is obtained from access register flip-flops 12A6 through 12A9 and placed in the tens digit position in the appropriate register location in the store. Instead of the information registered in flip-flops 12A2 through 12A5, a special code, generated at the output of the access register translator (FIG. 32) on leads IT1 through IT4, is stored in the units digit position in the summarization store register location. This special code, written in the units digit position, is the binary number 1101 for all identity words except the last. The last identity word, which partially identifies the switching office from which the data has been received, has the binary number 1111 written in the units digit position in the store. These two special codes written in the units position of the identity data words in the store are utilized during mode D operation as an aid to selection of desired data for producing a printed or punched copy thereof.

Identity data error detection

Errors are detected by comparing the two decimal digit representations with each other; i.e., by comparing the binary bit indications of positions A1 through A4 with the bit indications of positions A9 through A6, repectively. If a difference exists in any of these bit comparisons, as indicated by an output from one of AND gates 2710, flip-flop 27CH is set through OR gate 2725 and AND gate 2731, which is enabled by a pulse on steering lead S9. When the pulse on steering lead S9 occurs, the binary value of the tenth bit of the identity word is being transferred to flip-flop 12A9 from information flip-flop 71NF. Therefore, to avoid a race condition, the binary bit indication for position A9 is obtained on leads I–0 and I–1 from flip-flop 71NF for purposes of this comparison.

On the occurence of a pulse on steering lead S10 (indicating reception of the last bit of the identity word), a decision is made as to whether a single or a double error exists; and if a single error exists, a decision is made to either transfer the binary-decimal digit representation already in flip-flops 12A6 to 12A9, or to replace it with the representation stored in flip-flops 12A1 to 12A4. A double error exists if flip-flop 27CH is in the set condition, indicating that t1 ; two digit representations are different, and if, concurrently, parity circuit 718 provides a correct parity check on lead PA–0, indicating that the number of errors, if any, is even. The AND gate 2750 is enable thereby to provide an alarm signal of lead ALM to set alarm flip-flop 30ALM and light alarm lamp 3072. A double error also exists if a correct data word parity check is indicated on lead PA–0 when a signal on lead P5–1 indicates that a parity failure was detected after reception of the first five bits of the data word. In this latter instance, AND gate 2751 is enabled to provide the alarm signal on lead ALM.

SINGLE ERROR CORRECTION

If a single error exists in the data word flip-flop 27CH is set, thereby indicating a discrepancy between the two digit representations, and the binary state of parity flip-flop 7PC5 indicates whether the error is in bit positions A1 through A4 or in bit positions A6 through A9. A signal on lead P5–1 indicates that the single error occurred in the first five bits and, therefore, that the representation in flip-flops 12A6 through 12A9 is correct. A signal on lead P5–0 indicates that the single error did not occur in the first five bits of the word, thereby implying that it occurred in the last five bits of the word. Accordingly, AND gate 2733 is enabled to apply a signal to an input of each of AND gates 2720. The other input of each of AND gates 2720 is derived from respective leads A1–0 and A1–1 through A4–0 and A4–1 such that the outputs of AND gates 2720, over cable RS to the set and reset terminals of access register flip-flops 12A6 through 12A9, replaces the incorrect decimal digit representation in flip-flops 12A6 through 12A9 with the correct representation stored in flip-flops 12A1 through 12A4. Thus, single error correction is effected and the correct binary-decimal digit representation is stored in flip-flops 12A6 through 12A9 for transfer to the summarization store.

*Transfer of identity data to summarization store*

Returning again to the mode B sequence, assuming that the first identity word decimal digit is stored in access register flip-flops 12A6 through 12A9, the last bit pulse on steering lead S10 enables AND gates 2748 to provide a mode B process signal on lead PRAB through AND gate 2941 on lead ABC to set clock control flip-flop 31CC. The first mode B process signal on lead PRAB also resets mode A flip-flop 28MA through AND gate 2813 and thus extinguishes mode A lamp 28MAL. The setting of clock control flip-flop 31CC initiates operation of clock pulse generator 31CPG, as during mode A, to provide sequential timing pulses on leads T1, T2, T3, T5 and T6. During mode B the timing pulses control the sequential stepping of the address register as an address generator and the transfer of each identity data word to the appropriate summarization store register location.

In time interval $t_1$ of each mode B process cycle, indicated by the binary states of flip-flops 31K, 31M and 31N, AND gate 2967 is enabled to provide a signal on lead AV to alternate the state of address generator binary counter 27AGS, thereby producing an output signal alternately on leads 3700 and 3701 to the associated AND gate 3710. This causes no change in the address registered in the address register flip-flops, but enables one of AND gates 3710 to gate a pulse on lead CS during interval $t_6$ which effects the actual address change for the second and each successive identity data word. It will be recalled that the start word in the address register functions as the address (summarization store register location 21) of the first identity data word.

The read signal usually developed on lead RD during interval $t_3$ is blocked at AND gate 2975 since data words are only written into the summerization store during mode B operation. Thus during interval $t_4$, as indicated by flip-flops 31K, 31M and 31N, an identity word write signal is developed on lead ID by AND gate 2947, which is applied over cable AIN to OR gate 3251 in the access register translator. The output of OR gate 3251 over lead 3260 enables AND gates 3230 to transfer the identity word binary-decimal digit appearing on leads A6–0 through A9–0 to translator output leads IT5 through IT8, respectively. The identity word write signal on lead ID also provides a signal on lead IT2 at the output of OR gate 3282 through the enablement of AND gate 3215, the other input of which on lead NL–0 from inverter 3354 indicates that the identity word being processed is not the last identity data word in the block of traffic information. Accordingly, during interval $t_4$, the special identity code, binary number 1011, is provided in inverted form on leads IT1 through IT4 to inhibit amplifiers IHA1 through IHA4, and the identity word binary-decimal digit is provided in inverted form on leads IT5 through IT8 to inhibit amplifiers IHA5 through IHA8. The signal on lead 3260, developed by the write signal on lead ID, is propagated through OR gate 3253 and amplifier 3254 on lead WR to write monopulser 38WMP to cause the special identity code and the identity digit to be written in the units and tens positions, respectively, at the register location in the summarizations store selected by the address register flip-flops. The timing pulse on lead T6 generates a reset signal through AND gate 3026 and OR gate 3053 on lead RE to reset access register flip-flops 12A2 through 12A9 in preparation for the next identity data word to be detected. The timing pulse on lead T6 also resets clock control flip-flop 31CC through AND gate 3029 and OR gate 3055 on lead CCR since this is the end of a mode B process cycle.

*Summarization store address generation*

Further, as mentioned above, the pulse on lead T6 provides a change state signal on lead CS, via AND gate 2963 and OR gate 2971, to enable one or the other of AND gates 3710 in accordance with the state of binary counter 37AGS. Since the state of binary counter 27AGS is alternated during interval $t_1$ of each mode B process cycle by a signal on lead AV, the change state signal on lead CS during interval $t_1$ of each mode B process cycle by a signal on lead AV, the change state signal on lead CS during interval $t_6$ is transferred through AND gates 3710 alternately on leads P1–1 and P1–2. The alternating pulses on leads P1–1 and P1–2 are applied to the counter steering circuitry comprising AND gates 3611, 3612, 3621, 3622, 3631, 3632, 3741 and 3742 to provide signals on leads CM0–S and CM0–R through CR2–S and CR2–R to the respective set and reset terminals of address register flip-flops 34M0 through 34M6, 35M7 through 35M9 and control flip-flops 35R0 through 35R2. The outputs of the address register and control flip-flops on leads M0–0 and M0–1 through R2–0 and R2–1 are connected to the inputs of AND gates 3611, 3612, 3621, 3622, 3631, 3632, 3741 and 3742 such that each successive change state signal on lead CS causes the address registered in the address register flip-flops to advance sequentially in a backward direction to the next lower address. The code adopted for the address sequencing is the reflected binary code, as is the notation used for the traffic data words and the start words, and therefore each address change requires the change of state of only one of the address register flip-flops. A more complete description of this type of address generator or counter circuit may be found in the above-mentioned F. M. Goetz application No. 836,411.

Briefly, however, the address generator in the present illustrative embodiment is seen to comprise four counter stages of the type employed in the mod-N counter (FIG. 10), the first three stages being modulo-8 counters and the fourth stage being a modulo-16 counter. The first stage includes address register flip-flops 34M0 and 34M1, control flip-flop 35R0, and AND gates 3611 and 3612; the second stage includes address register flip-flops 34M2 and 34M3, control flip-flop 35R1, and AND gates 3621 and 3622; the third stage includes address register flip-flops 34M4 and 34M5, control flip-flop 35R2, and AND gates 3631 and 3632; and the fourth stage includes address register flip-flops 34M6 and 35M7 through 35M9, and AND gates 3741 and 3742. The four stages are connected in tandem by leads P1–1 and P1–2, P2–1 and P2–2, P3–1 and P3–2, and P4–1 and P4–2, respectively. Each change stage signal reflected alternately on input leads P1–1 and P1–2 causes one, and only one, of the flip-flops in the first counter stage to change state. Every fourth change state signal causes the first stage control flip-flop 35R0 to change state, and is gated alternately to leads P2–1 and P2–2 to change the state of one of the flip-flops in the second counter stage. Similarly, every sixteenth change state signal causes the second stage control flip-flop 35R1 to change state, and is reflected on leads P3–1 and P3–2 alternately to change the state of one of the flip-flops in the third stage; and every sixty-fourth change state signal effects a change in the state of flip-flop 35R2 and is reflected on leads P4–1 and P4–2 alternately to change the state of one of the flip-flops in the fourth stage.

During mode C operation, the address register is utilized as an address generator to provide all of the summarization store addresses sequentially in a backwards direction, starting at address 1. However, for mode B operation only sufficient addresses are required to store the identity data words, i.e., 21 addresses in the illustrative embodiment of 21 identity data words. Thus, the start word registered in the address register defines the first summarization store address as 21; and successive change state signals on lead CS advance the address register sequentially in a backwards direction to address 20, address 19, and so on. Accordingly, when the start word appears in the address register, register flip-flops 34M0 through 34M4 and control flip-flops 35R0 and 35R1 are set, the remaining flip-flops in the address register remaining reset. The first change state signal on lead CS, therefore, is directed through AND gate on lead P1–1 to reset register flip-flop 34M0; the second signal on lead CS is directed through AND gate on lead P1–2 resetting control flip-flop 35R0, and on lead P2–1 resetting register flip-flop 34M2; and so on, each successive change state signal on lead CS effecting a change in the binary state of one of the register flip-flops 34M0 through 34M4 to provide successively lower summarization store addresses in reflected binary notation.

Each identity data word detected during mode B is stored in the summarization store in the manner discussed above, with the address register providing the next lower address after each word is stored in preparation for the next identity word. When the last identity data word, in this example the twentieth identity word, is stored in access register flip-flops 12A6 through 12A9 and a mode B process signal is developed on lead PRAB, the address in the address register stands at 2. The address 2 in the address register flip-flops is reflected on leads M0–1, M1–1, and M2–0 through M9–0, through AND gates 3323 and 3325 to provide a last digit signal on lead NL–1 to AND gate 2817. During this last mode B process cycle, AND gate 2817 is enabled by the timing pulse on lead T5 to set the mode C flip-flop 28MC and flip-flop 28CR.

The last mode B process cycle is essentially the same as those preceding it. In interval $t_1$, AND gate 2967 pulses binary counter 27AGS to change the state thereof for the next address change. A write signal is developed on lead ID by AND gate 2947 during interval $t_4$ which enables AND gate 3251 to transfer the identity word binary-decimal digit through AND gates 3230 over leads IT5 through IT8 to inhibit amplifiers IHA5 through IHA8, respectively. Since this is the last identity decimal digit, the special identity code associated therewith is the binary number 1111. This is applied in inverted form on leads IT1 through IT4, no signal appearing at the output of OR gate 3282 since no signal appears on lead NL–0 to transfer the write signal on lead ID through AND gate 3215. Mode B is now complete as all identity words have been stored in the summarization store.

The timing pulse on lead T5 through AND gate 2817 sets flip-flops 28MC and 28CR, the latter energizing relay 28RMC and the former lighting lamp 28MCL to indicate mode C operation. Energization of relay 28RMC energizes relay 15C through transfer contact 4 to connect binary counters 15FR and 15CR to transducers 1511 and 1512, respectively, in output recorder 1510. Further, the recorder start forward circuitry 26RSF is energized through the make portion of contact 6 of relay 28RMC, and relay 26TC is energized through contact 5 of relay 28RMC. Relay 26TC locks up through its own contact 1 and contact 10 of relay 20MD.

The remaining timing pulse in the cycle, on lead T6, resets access register flip-flops 12A2 through 12A9 and provides a change state signal on lead CS to step the address register to the next lower address (address 1). However, with both the mode B and mode C flip-flops 28MB and 28MC set at this point, no signal is provided through OR gate 3055 or lead CCR to reset clock control flip-flop 31CC. Therefore, the next cycle of timing pulses starts immediately to begin mode C processing.

Mode C operation

In mode C, the summarized traffic data and the associated identity data are transferred from the summarization store to output recorder 1510. As in mode B, the address register is sequentially changed to successive lower addresses during interval $t_6$ of each cycle of timing pulses. The last process cycle of mode B left the address registers at address 1, which will therefore be the first address read out of the summarization store. This is followed by address 0, address 1023, address 1022 and so on sequentially in a backwards direction through all of the addresses of the summarization store until address 0 is again registered in the address register, indicating the end of mode C operation. The sequence for recording the information at output recorder 1510, therefore, is error count, high-count register data (capacity of 9999 per register location), low-count register data (capacity of 99 per register location), and identity data, in that order.

Since clock control flip-flop 31CC is not reset during the last mode B process cycle, the first mode C cycle follows immediately. The first timing pulse, on lead T1, resets mode B flip-flop 28MB through AND gate 2815, thus extinguishing mode B lamp 28MBL, and provides a signal of lead RE via AND gate 3027 and OR gate 3053 to reset access register flip-flops 12A2 through 12A9. Further, during interval $t_1$, AND gate 2967 is enabled to apply a signal on lead AV to change the binary state of counter 27AGS in anticipation of the next subsequent change in the address stored in the address register. Thereafter the timing pulse on lead T3 enables AND gate 2975 to develop a read signal on lead RD to read monopulser 38RMP. The output of monopulser 38RMP through read amplifiers 38RAX and 38RAY is applied to the row and column conductors, respectively, associated with the address registered in the address register; i.e., address 1 for the first mode C cycle. The binary signal outputs developed thereby on leads SA1 through SA8, indicative of the word stored at the addressed register location in the summarization store, are applied to AND gates 1210 in the access register. The output of monopulser 38RMP through delay monopulser 38DMP on lead STB enables AND gates 1210 to place the contents of the addressed summarization store register, reflected on leads SA1 through SA8, in access register flip-flops 12A2 through 12A9, respectively. The magnetic cores of the addressed register location are left in the reset condition, containing all zeros, due to the automatic erase nature of the readout operation.

A change state signal is developed on lead CS by the timing pulse on lead T5 to enable AND gates 3710, the output of which advances the address register to the next lower address in the summarization store. Clock control flip-flop 31CC is reset by the timing pulse on lead T6 through AND gate 3030 and OR gate 3055 to lead CCR. The generation of timing pulses is thus halted until the word stored in access register flip-flops 12A2–12A9 is recorded in output recorder 1510. This word is the binary number zero since no word or error counts are stored at summarization store address 1 in the present illustrative embodiment.

*Parallel-to-serial conversion of data*

The transfer of this first word and each successive word from access register flip-flops 12A2 through 12A9 to recorder 1510 is effected synchronously via gate control circuit I (FIG. 11) under the control of the timing circuit (FIG. 7). During mode C operation, however, the function of gate control circuit I is essentially the converse of that during modes A and B. Rather than converting the data words from serial to parallel form as in modes A and B, the output data words are transferred from the summarization store in parallel form and are converted to serial form for recording at output recorder 1510. When mode C begins, the setting of flip-flop 28CR energizes relay 28RMC, contacts 1 and 2 of which operate relays 14MC and 14WR, respectively, to reconnect the inputs and outputs of AND gates 1110 of gate control circuit I for serial-to-parallel conversion. Under this connection the data word stored in flip-flops 12A2 through 12A9 is reflected on leads A2–1 through A9–1 over cable A0 through the make portion of transfer contacts 3 through 10, respectively, of relay 14MC to the inputs of corresponding AND gates 1110. The remaining inputs to AND gates 1110 appear on steering leads S2 through S9, which are derived through the mod-N counter (FIG. 10) from the timing circuit pulses generated by monopulsers 8MP1 and 8MP2. Therefore, steering pulses on leads S2 through S9 in succession transfer the bits of the data word appearing on leads A2–1 through A9–1 in cable A0 through the make portion of transfer contacts 3 through 10, respectively, of relay 14WR to the common output information lead INF, and through OR gate 1150, contact 11 of operated relay 14WR, and AND gate 1155 to the output information channel lead IFC. The eight-bit output data words are thus provided in serial order over lead IFC to output recorder 1510 for semipermanent storage. A ninth bit is generated for parity purposes under control of output parity circuit 930 over lead OIP to AND gate 1120. As mentioned above, output parity circuit 930 counts the number of binary 1's in each word appearing on lead INF to control the recording of the parity bit with the word in output recorder 1510. A steering pulse on lead S10, indicating that all of the information bits have been recorded, enables AND gate 1120 to transfer the parity bit indications over lead OIP through OR gate 1150 and AND gate 1155 to lead IFC to be recorded. Further, a tenth bit, a binary 0 for control purposes, is recorded by the absence of a binary bit at the output of AND gate 1155 when the steering pulse on lead S11 through OR gate 1111 enables AND gate 1165.

The steering pulses on leads S2 through S9 for effecting the synchronous transfer, it will be recalled, are obtained from monopulsers 8MP1 and 8MP2, connected in a loop to form a pulse generator as described hereinabove. The interconnection of monopulsers 8MP1 and 8MP2 for mode C operation is established through the make portion of contact 11 of operated relay 14MC; and once started, monopulsers 8MP1 and 8MP2 generate a serial train of pulses on each of leads P and ADV to pulse alternator 910 as long as flip-flop 8STP remains set. Prior to the initiation of mode C operation, monopulser 8MP4 is in the reset condition and a signal thereof on lead WB–0 enables AND gate 1451. When mode C flip-flop 28MC is set to begin mode C operation, a signal is directed on lead MC–1 through AND gate 1451 and amplifier 1452 to inverter 1454. In response to the signal at the input thereof, inverter 1454 provides a ground clamp on lead ADV to prevent the operation of contact 11 of relay 14MC from falsely setting monopulser 8MP1 and to permit output recorder 1510 to achieve recording speed before the generation of pulses on lead ADV begins. This clamp remains until monopulser 8MP4 has been set by the completed operation of contacts 14 and 12 of relays 14MC and 14WR, respectively, to remove the enabling signal from lead WB–0. Filter network 8FN4 provides capacitive filtering to insure that relays 14MC and 14WR have completely operated and their contact chatter fully subsided before monopulser 8MP4 is set. Thus after a delay introduced by filter network 8FN4, monopulser 8MP4 is set, disabling AND gate 1451 to remove the ground clamp from lead ADV. The disablement of AND gate 1451 produces a pulse at the output of inverter 1454 through differentiator circuit 1455 on lead SI. The pulse on lead SI through OR gate 833 and amplifier 834 sets flip-flop 8STP and sets monopulser 8MP1 to initiate the generation of pulses on leads P and ADV for mode C operation. As discussed more fully hereinabove, the pulses on lead P are provided alternately on leads P1 and P2 by pulse alternator 910 to advance the mod-N counter (FIG. 10) through its successive stages to generate the steering pulses as leads S0 through A11.

Thus, when the generation of pulses on leads P and ADV to pulse alternator 910 begins, the word from address 1 of the summarization store has been transferred to access register flip-flops 12A2 through 12A9 and awaits transfer in serial form to output recorder 1510. This serial transfer is effected over lead INF upon the sequential enablement of AND gates 1110, by successive steering pulses on leads A2 through S9, and the enablement of AND gate 1155. The steering pulse on lead S10 transfers the parity bit indication through AND gate 1120 and AND gate 1155 to lead INF. In this manner the individual bits of the output data words read from the summarization store are applied over output information channel lead IFC to information transducer 1511 in output recorder 1510.

However, two channel recording is utilized at recorder 1510 in the illustrative embodiment, one channel being the information channel recorded by transducer 1511 and the other channel being a clock channel recorded by transducer 1512. To provide the clock pulses for recording the clock channel adjacent the information channel, the steering pulses on leads S2 through S11 via OR gate 1111 and AND gate 1165 are applied on output clock channel lead ICC to transducer 1512. The AND gates 1155 and 1165 are enabled only during mode C operation via a signal on lead WB–1 from monopulser 8MP4 which remains set throughout mode C. Further, to prevent false pulsing of the output recorder transducers 1511 and 1512 during periods of maintenance and observation, manual switches 11WI–SW and 11WC–SW may be operated to disable AND gates 1155 and 1165, and thus isolate leads IFC and ICC from gate control circuit I.

Recording of data

The illustrative mode of recording the summarized traffic data and associated identity data employed in output recorder 1510 is on a non-return to zero basis, but need not be self-clocking since a clock channel is recorded adjacent the information channel. The clock channel lead ICC is connected to the input of clock channel binary counter 15CR, and the information channel lead IFC is connected to the input of information channel binary counter 15FR. Each pulse on leads ICC and IFC, therefore, changes the state of the binary counter 15CR or 15FR connected thereto, thereby providing recording signals alternately on the two outputs of each of counters 15CR and 15FR through contacts 1 through 4 of relay 15C to transducers 1512 and 1511, respectively. Therefore, each pulse on lead ICC or IFC provides a reversal of the current applied to the associated transducer 1512 or 1511. Thus, each bit position recorded in output recorder 1510 is marked by a flux reversal on the clock channel of the magnetic medium thereof; and if the binary character of the bit is 1, a corresponding flux reversal is made on the information channel. If the binary character of the bit is 0, no flux reversal is made in the information channel at that bit position. Accordingly, the binary character of each bit may be readily determined during subsequent playback by the presence or absence of a flux reversal in the information channel adjacent a flux reversal in the clock channel marking the bit position.

After steering pulses on leads S2 through S11 have directed the transfer of the ten-bit word, inclusive of parity bit and control bit, from access register flip-flops 12A2 through 12A9 and lead OIP to output recorder 1510, the steering pulse on lead S11 enables AND gate 2749 to develop a mode C process signal on lead PRC to initiate a new mode C process cycle. The process signal on lead PRC through OR gate 2959 on lead ABC sets clock control flip-flop 31CC to begin the generation of timing pulses on leads T1 through T6. This cycle of timing pulses sets access register flip-flops 12A2 through 12A9 and advances counter 27AGS (interval $t_1$), places the word stored in address 0 of the summarization store in flip-flops 12A2 through 12A9 (interval $t_3$), changes the address in the address register flip-flops to the next address of the summarization store to be read out (interval $t_5$), and resets flip-flop 31CC to halt the generation of timing pulses (interval $t_6$). The read out operation is effected and the word is placed in access register flip-flops 12A2 through 12A9 before the occurrence of the subsequent steering pulse on lead S2. Thereafter the steering pulses on leads S2 through S11 again sequence the serial transfer of the word, inclusive of parity bit, to output recorder 1510; and the pulse on lead S11 initiates a new mode C process cycle which follows the same pattern as the one just discussed.

Last mode C processing cycle

These mode C process cycles continue in this manner until all of the register locations in the summarization store have been read out and recorded at output recorder 1510, the last words recorded being the identity words. At the beginning of the last mode C process cycle, the address register contains address 1. As in previous mode C cycles, the process signal on lead PRC starts the generation of timing pulses, and during interval $t_1$, the access register flip-flops 12A2 through 12A9 are reset and counter 37AGS is advanced. Address 1 of the summarization store is read during interval $t_3$, placing the binary number zero in the access register; i.e., retaining access register flip-flops 12A2 through 12A9 in the reset condition. The address register is moved to address 0 during interval $t_5$, which is recognized by the enablement of the AND gate 3322 to provide a last cycle indication on lead LD to AND gate 3043. The address 0 registered in the address register during the last cycle of mode C operation is distinguished from that of the first cycle of mode C operation by the enabling signal on lead WB-1 to AND gate 3322. The signal on lead WB-1 is not present during interval $t_5$ of the first mode C cycle, thereby preventing a false last cycle indication of lead LD at that time.

During interval $t_6$, the timing pulse on lead T6 through AND gate 3030 resets flip-flop 31CC as in all previous cycles to stop generator 31CPG. Further, the pulse on lead T6 through AND gate 3030 enables AND gate 3043 to apply the last cycle indication on lead LD over lead MS to reset flip-flop 8STP, stopping the generation of pulses by monopulsers 8MP1 and 8MP2. The signal on lead MS also resets flip-flops 28MC and 28CR through AND gate 2819, thereby releasing relay 28RMC, extinguishing lamp 28MCL, and ending mode C operation. The reset output of flip-flop 28MC on lead MC-0 is reflected through AND gate 1453, which is enabled by the signal on lead WB-1 from monopulser 8MP4, to provide a ground clamp on lead ADV during the transition from mode C. The release of relay 28RMC de-energizes relays 14MC and 14WR to restore the input stage circuitry, including monopulsers 8MP1 and 8MP2 and gate control circuit I, to normal for subsequent mode A processing. After contacts 14 and 12 of relays 14MC and 14WR, respectively, have fully released and all contact chatter has subsided, monopulser 8MP4 resets to disable AND gate 1453, thereby removing the ground clamp from lead ADV. The disablement of AND gate 1453 produces a signal through inverter 1454 and differentiator 1455 on lead SI. The signal on lead SI is provided through OR gate 833 and amplifier 834 to set monopulser 8MP1. Upon the subsequent timeout of monopulsers 8MP1 and 8MP2, AND gate 812 is enabled to provide a signal on lead 845 through the break portion of contact 12 of relay 14MC and amplifier 851 to master reset lead MR to reset the input stage circuitry for mode A. The release of relay 28RMC further de-energizes relay 15C and energizes relay 15D to disconnect counters 15FR and 15CR from transducers 1511 and 1512, respectively, and to connect transducers 1511 and 1512 through contacts 1 through 4 of relay 15D to difference amplifiers 15DAF and 15DAC, respectively. The recorder stop circuitry 26RS is enabled through the break portion of transfer contact 6 of relay 26RMC to stop recorder 1510.

Grouping recorded data in word pairs

A predetermined interval of separation may be provided between each pair of ten-bit data words recorded in recorder 1510 during mode C through the operation of word separation switch 8WS–SW. Word alternator 920 generates a pulse on lead SWA through OR gate 840 which indicates receipt at recorder 1510 of the last bit of alternate data words. When switch 8WS–SW is operated, this pulse on lead SWA resets flip-flop 8STP to stop the generation of pulses by interconnected monopulsers 8MP1 and 8MP2. The pulse on lead 8WA sets monopulser 8MP3 which times out after a predetermined interval of time to set flip-flop 8STP and restart the generation of pulses by monopulsers 8MP1 and 8MP2. Assuming that recorder 1510 continues to run, a predetermined interval of separation is thus provided between each pair of data words. In this manner, the summarized traffic data words read from the low-count field of the summarization store are grouped in pairs of low-count data words in recorder 1510; and the words from the high-count field are grouped in pairs, each pair comprising the thousands and hundreds digits and the tens and units digit of one high-count data word. The interval recorded between the pairs of data words permits output recorder 1510 to be stopped and started during these intervals to allow time for the printing operations during mode D.

Automatic testing operation

In addition to the various arrangements mentioned above for purposes of maintenance and observation, individual switches are provided for manually setting the circuitry in mode A, mode B, or mode C processing operation. These switches include mode A switch 28SA–SW, mode B switch 28SB–SW and mode C switch 28SC–SW which, when operated, set flip-flops 28MA, 28MB and 28MC, respectively. Operation of switch 28SC–SW also sets flip-flop 28CR through OR gate 2820. To reset flip-flops 28MA, 28MB, 28MC and 28CR, reset switch 28RABC–SW is operated to remove the ground connection from the reset terminals of the respective flip-flops. Further, operated contact 2 of switch 28RABC–SW resets flip-flop 27MX; and operated contact 3 thereof resets flip-flops 29GA and 29GB through AND gate 2925 and OR gates 2935 and 2936.

For automatic testing of the input and accumulator stages of the present invention, automatic test circuit 3090 is provided. Under the control of automatic test circuit 3090, the system is operated in essentially the same manner as mode A operation; i.e., the count stored in the summarization store at the address registered in the address register is transferred to the access register, the count is increased by one in the access register translator, and the numerically greater count is returned to the same address in the summarization store. However, during automatic test operation, as distinct from mode A operation, the address register is operated as an address generator in the manner of mode C operation to sequentially address the entire set of 1024 addresses in the summarization store. Each address is treated as a low-count address and the count stored thereat is increased by one. After the system has been thus cycled through all addresses 99 times, the number 99 is stored at each of the 1024 addresses. At this point, each of the addresses may be checked for the correct total of 99. On the 100th cycle the register locations in the summarization store are reset to zero.

The automatic test operation may be effected in two distinct ways. Under one method the timing circuit (FIG. 8) is operated as a mode C pulse generator to provide a pulse on lead PRC in response to each steering pulse on lead S11. Each pulse on lead PRC initiates one test cycle to increase the count at a single address in the summarization store. For this method of automatic test operation switches 14MC–SW and 14WR–SW are operated to energize relays 14MC and 14WR, respectively, to establish the connections in gate control circuit I (FIG. 11) and in the timing circuit (FIG. 8) described above for mode C operation. In this manner of testing the timing circuit (FIG. 8), the mod-N counter (FIG. 10) and gate control circuit I (FIG. 11) are thus tested along with the operation of the accumulator stage.

With switches 14MC–SW and 14WR–SW operated, test switch 30MT–SW is operated to set relay 30MT through an obvious path and light test lamp 30 MTL. Relay 30MT locks up through its contact 1 and contact 1 of test release switch 30MTR-SW. Operation of relay 30MT establishes the following test conditions:

(1) Contact 2 removes the ground clamp from the connection between OR gate 3055 and contact 1 of switch 30HS–SW.

(2) Contact 3 provides ground to the output of AND gate 3028 which is connected through OR gate 3053 and amplifier 3054 to lead RE to prevent the resetting of access register flip-flops 12A2 through 12A9 at the end of each memory test cycle.

(3) Contact 4 connects ground to lead EA to prevent the resetting of address register flip-flops 34M0 through 34M6, 35M7 through 35M9 and 35R0 through 35R2.

(4) Contact 5 opens the lead MA–0 input to AND gate 2967 to permit address register counter 37AGS to be advanced by each pulse on lead AV during timing interval $t_1$; and contact 8 opens the lead MB–1 input to AND gate 2963 to permit each pulse on lead T6 to be transferred to lead CS to change the address registered in the address register.

(5) Contact 6 grounds the input to AND gate 2915 from flip-flop 29TD to prevent a signal on lead CA and contact 13 grounds the lead TM input to AND gates 3343 through 3346 to block any address changes which would normally occur upon the indication of a count of 99.

(6) Contact 7 opens the lead HA input to AND gate 2955 and contact 15 grounds lead HA to prevent writing operation upon reaching a count of 99 such that all addresses recycle at 99.

(7) Contacts 9 and 10 open the input leads to the set terminals of flip-flops 29GB and 29GA, respectively, and contact 11 grounds the reset output of flip-flop 29GA, thus preventing the taking of group totals.

(8) Contact 12 opens the lead WB–1 input to AND gate 3322 to permit a signal on lead LD for the last address of each cycle.

(9) Contact 14 transfers lead MS from the output of AND gate 3043 to point 3042.

With these test conditions established, a method of stopping the automatic test operation is selected by operating test stop switch 30MTS–SW or error stop switch 30ERS–SW, depending upon whether it is desired to stop the test operation after 99 test cycles storing a count of 99 at each summarization store address, or only upon the detection of an error when testing each of the summarization store addresses for a count of 99. Then all that remains to begin the automatic test operation is the operation of mode A switch 28SA–SW to set mode A flip-flop 28MA.

On the first pulse on lead S10 enabling AND gate 2747 to provide a signal on lead PRAB, clock control flip-flop 31CC is set to initiate the generation of timing pulses by generator 31CPG. The first timing pulse therefrom on lead T1 through AND gate 3025 and OR gate 3053 on lead RE resets access register flip-flops 12A2 through 12A9; and AND gate 2967 is enabled during timing interval $t_1$ to provide a signal on lead AV to advance counter 37AGS. Since the address register is initially in the zero state, the signal on lead RD developed by the timing pulse on lead T3 through AND gate 2975 effects the read out of the summarization store at address 0 and transfers the number to flip-flops 12A2 through 12A9. During timing interval $t_4$, AND gate 2945 is enabled to provide a signal on lead ADD to the access register translator to provide a number numerically one greater to be stored back at address 0 in the summarization store. The timing pulse on lead T6 through AND gate 2963 and OR gate 2971 on lead CS advances the address register to the next address, i.e., address 1023; and finally the pulse on lead T6 through AND gate 3028, AND gate 3035 and OR gate 3055 on lead CCR resets flip-flop 31CC to halt the operation of generator 31CPG.

On the next signal on lead S10 through lead PRAB, generator 31CPG is restarted to provide the same sequence of operation at summarization store address 1023. This sequence of operation continues until the address register has recycled through the 1024 addresses 99 times and the count of 99 is stored at each address. Upon receipt of the signal on lead PRAB on the 100th cycle, when the address register is again in the zero state, generator 31CPG is restarted and the number store at address 0 is read out and transferred to the access register during timing interval $t_3$. The presence of 99 in the access register is detected to provide a signal on lead NN to AND gate 3040. The AND gate 3040 is enabled by the zero state of the address register and the pulse on lead T5 to provide a signal at point 3041. Assuming the test stop switch 30MTS–SW to be operated, this signal is provided through the break portion of contact 2 of switch 30ERS–SW and the make portion of contact 14 of relay 30MT to lead MS to reset flip-flop 8STP, thereby halting the operation of interconnected monopulsers 8MP1 and 8MP2. Thus the automatic test operation ceases and the contents of the summarization store addresses may be inspected.

If, on the other hand, error stop switch 30ERS–SW is operated (and switch 30MTS–SW is not operated), the signal at point 3041 is not transferred to lead MS, but rather sets alarm flip-flop 30ALM enabling AND gate 3045 and lighting lamp 30ALML. Under this connection, a test is made for a count of 99 at each address in the summarization store and the test operation ceases only if an error is detected. The sequence of operation continues as before through the 100th cycle with the address register advancing to successive addresses and the number stored thereat being transferred to the access register. However, the signal on lead ADD is blocked at the count of 99 and each address read out on this cycle is left in the zero state. If the number read from an address is not 99 (as indicated by a signal at the output of inverter 3047), AND gate 3045 is enabled thereby to gate the timing pulse on lead T5 through the make portion of contact 2 of switch 30ERS–SW and the make portion of contact 14 of relay 30MT to lead MS. The signal on lead MS resets flip-flop 8STP and halts the operation of monopulsers 8MP1 and 8MP2. Testing operation thus stops and the incorrect total and the summarization store address at which the error occurred may be determined by reference to the access register and the address register, respectively. The operation of monopulsers 8MP1 and 8MP2 may be then restarted to continue the testing of the remainder of the addresses. After all addresses of the summarization store have been tested, the next appearance of a signal on lead LD (indicating address 0 in the address register) enables AND gate 3046 to gate a pulse on lead T2 therethrough resetting flip-flop 30ALM. A subsequent pulse on lead T6 resets control flip-flop 31CC, halting generator 31CPG, and ending the automatic test operation.

Under another method of automatic test operation provided by the present circuit, the timing circuit (FIG. 8) operated to disable AND gate 2963 and thus prevent the occurrence of change state signals on lead CS during the memory test operation. The desired summarization store address is placed in the address register, and the add-one sequences are performed at the single address, employing any of the above-discussed modes of test operation.

*Mode D operation*

A mode D operating cycle may be initiated when it is desired to print a record of particular summarized traffic data stored in output recorder 1510. Advantageously, this may be performed concurrently with subsequent mode A and mode B processing cycles. The data stored in recorder 1510 is recorded in blocks of data comprising the summarized traffic data and associated identity data from individual switching offices. Assuming the operation of switch 8WS–SW during mode C, each twenty-bit word of the block of data includes the binary information from a pair of adjacent eight-bit register locations in the summarization store. During mode D operation the storage medium of recorder 1510 moves in the reverse direction of that during mode C operation. Thus, the first word of each block of data is an identity word which contains the two-digit office number of the switching office from which the block of data obtained. The first identity word also includes the special identity code, binary number 1111, which signifies the beginning of a block of data. Following the first identity word in the block of data are additional identity words, each containing two decimal digits of information, which indicate the date, time and conditions under which the traffic data was obtained. Each of these identity words includes the special identity code, is not used, and only clock pulse generator 31CPG is utilized to control the cycles of testing operation. Therefore, switches 14WR–SW and 14MC–SW are not operated, and only the accumulator stage is tested under this mode of testing operation. After test switch 30MT–SW is operated to energize relay 30MT–SW to establish the above test conditions, switch 30HS–SW is operated to connect an input of OR gate 3055, and thus lead CCR, to point 3042 through the make portion of its contact 1. Contact 2 of switch 30HS–SW connects the ground through contact 3 of relay 30MT to the output of AND gate 3028 connected to OR gate 3055. The ground on the output of AND gate 3028 prevents the pulse on lead T6 from appearing on lead CCR to reset flip-flop 31CC, and thus generator 31CPG recycles continuously until 99 is stored in all addresses of the summarization store, or until an error is detected, depending upon whether switch 30MTS–SW or switch 30ERS–SW is operated. In either case, upon the happening of the stop condition a signal appears at point 3042, which is provided through the make portion of contact 1 of switch 30HS–SW and OR gate 3055 to lead CCR to halt the operation of generator 31CPG.

The test operation can be terminated in either mode of operation by operating test release switch 30MTR–SW to remove the holding ground from relay 30MT. Contact 2 of switch 30MTR–SW removes the ground connection from the reset terminal of flip-flop 28MA, thereby resetting it. Switch 30ALM–SW may be operated, if necessary, to reset alarm flip-flop 30ALM.

Further, if it is desired to run a test at only a single address, fixed address test switch 29FAT–SW may be binary number 1011, which indicates that it is an identity word. Following the identity words are the low-count data words (each including two, two-digit register count totals), the high-count data words and group totals (each including one four-digit register count total), and the error count total. Thus the twenty-bit words in a block of data recorded in recorder 1510 each include four binary-decimal digits and associated parity check information. Exemplary structure for each of these types of words is shown in FIG. 44. Therein it will be noted that the binary 0 recorded for control purposes by the pulse on lead S11 during mode C is found in bit positions 1 and 11 during mode D playback. The parity bits for each digit are located in bit positions 2 and 12, each parity bit therefore serving as a check on one-half of the word. Bit positions 3 through 10 and bit positions 13 through 20 each contain a two-digit binary-decimal coded word.

*Scanning of recorded data to locate desired information*

A mode D operating cycle is initiated by placing information in the data selector circuit (FIG. 20) to indicate the switching office from which summarized traffic data is to be printed out, and by scanning the storage medium of recorder 1510 to locate this data. Scanning operation is started by operating nonlocking switch 260N–SW to energize relay 260N which locks up through its contact 1 and contact 1 of relay 260NR2. Relay 20P2 is energized thereby through contact 2 of relay 260N and the break portion of transfer contact 1 of relay 26PR. Energization of relay 26P2 initiates the operation of scanning drive in the reverse direction to output recorder 1510 via contact 1 of relay 26P2 and contact 3 of relay 260NR1 to connect battery to recorder start reverse circuitry 26RSR. Lamp 260NL is lighted through contact 3 of relay 260N to indicate that scanning is in progress.

Impartation of relative motion between the storage medium of recorder 1510 and transducers 1511 and 1512, via the operation of circuitry 26RSR, thus provides pulse signals on leads 1517 and 1519 to difference amplifier 15DAF and on leads 1527 and 1529 to difference amplifier 15DAC. The information signals from difference amplifier 15DAF are provided on complementary outputs through amplifiers 1530 and 1531 to amplitude detector circuits 15DPF and 15DNF, respectively; and the clock signals from difference amplifier 15DAC are provided on complementary outputs through amplifiers 1540 and 1541 to peak detector circuits 15PPC and 15PNC, respectively. The outputs of detector circuits 15PPC and 15PNC accurately define a discretely-timed pulse for each clock pulse recorded in the clock channel of recorder 1510, and may be advantageously of the form shown in the above-identified F. M. Goetz application No. 79,444. The amplitude detector circuits 15DPF and 15DNF may be of the forms well known in the art for generating an output pulse of predetermined length and amplitude only upon receipt of an input pulse of greater than a predetermined minimum amplitude.

Figure 16:
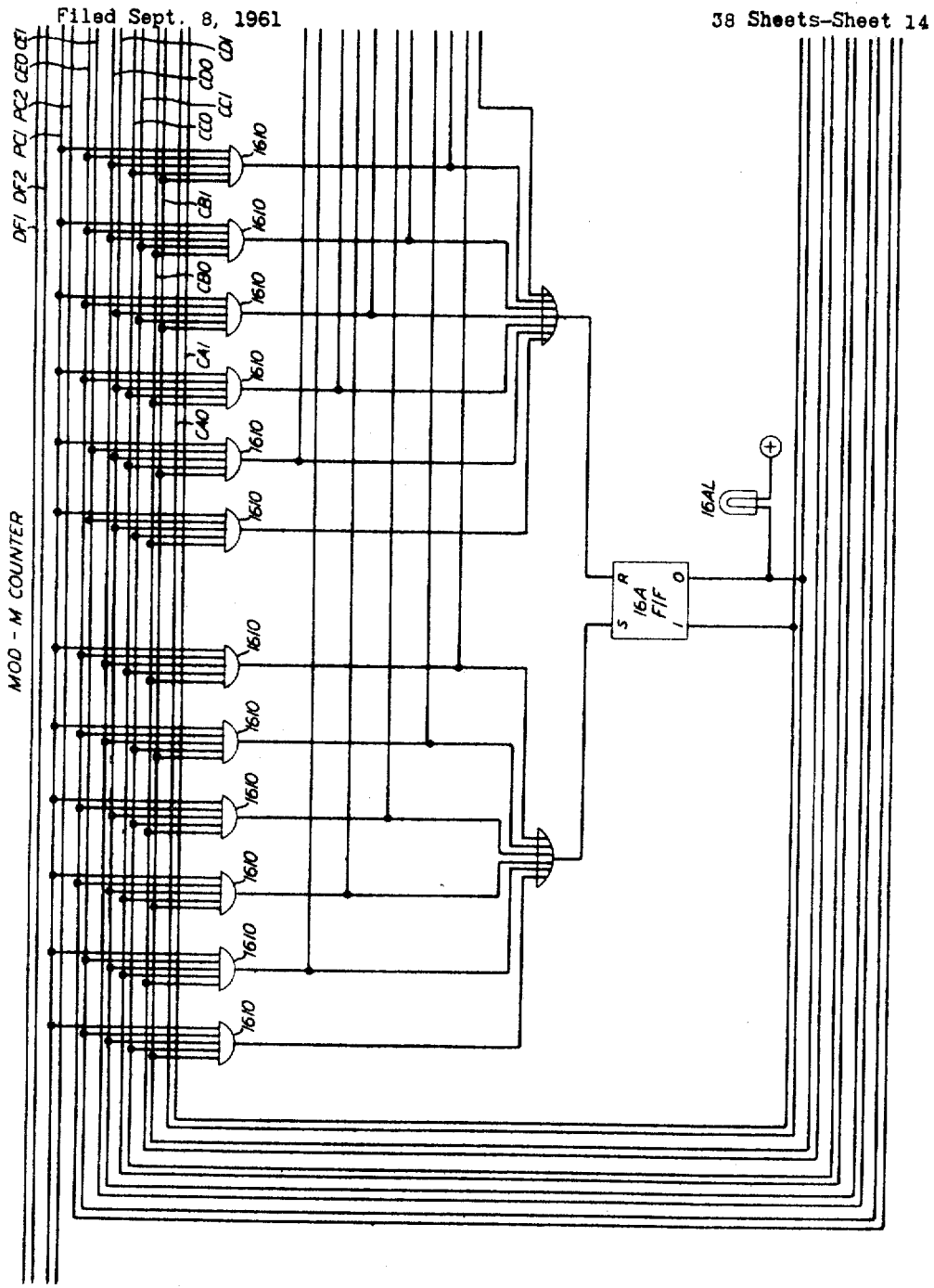
Figure 17:
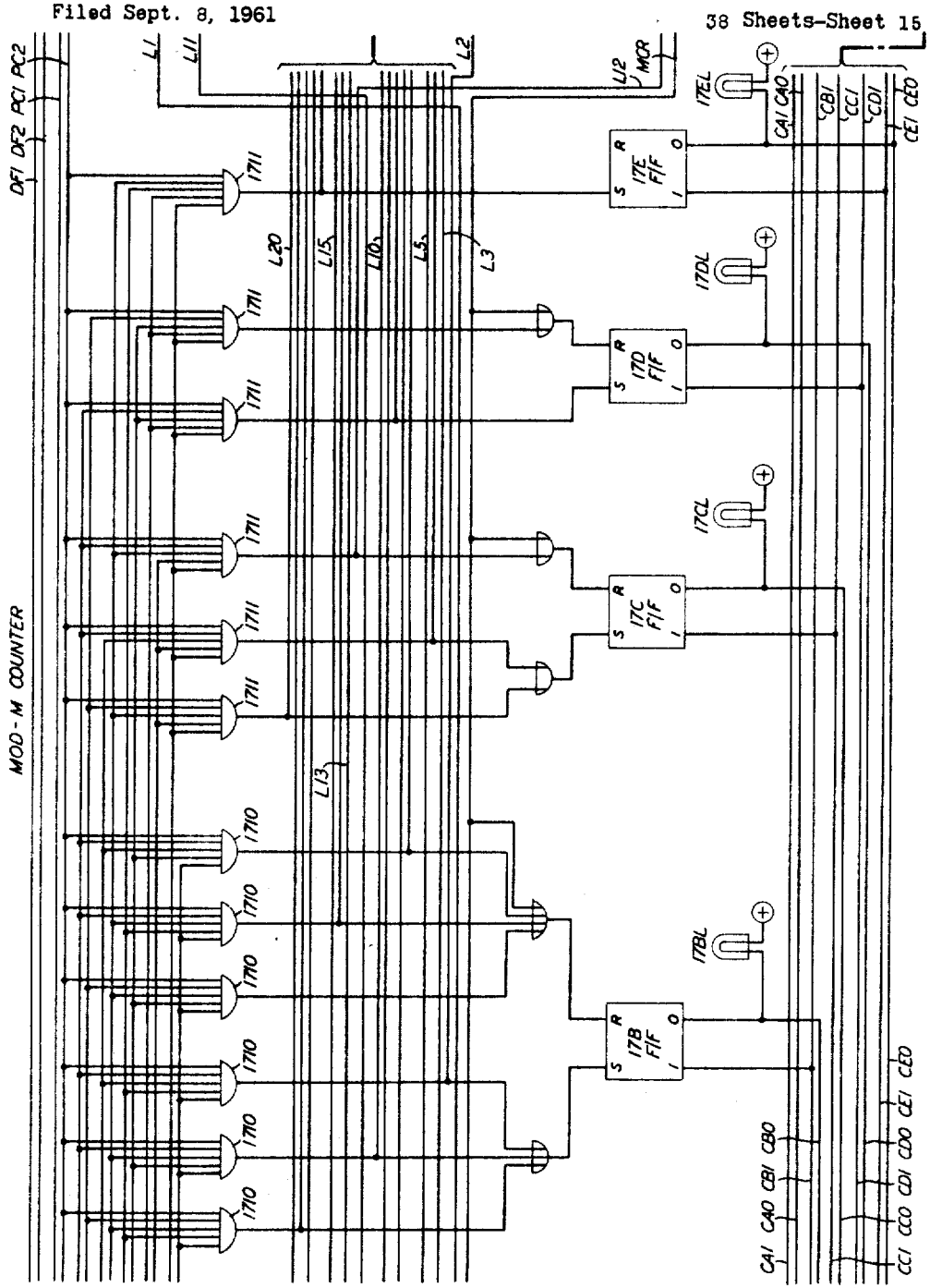

The outputs of peak detector circuits 15PPC and 15PNC are amplified and shaped by gate amplifiers 1544 and 1545, and are applied on leads PC1 and PC2 to AND gates 1810 and 1811, respectively, and to the mod-M counter (FIGS. 16 and 17). The output of amplitude detector 15DPF is applied on lead DF1 to AND gates 1810 and 1811 and through AND gate 1815 to an input of each of AND gates 1840. The output of amplitude detector 15DNF is applied on lead DF2 through AND gate 1865 to leads LS1 and LS10. Due to the nature of the recorded signals and to the complementary form of detection pulses appearing on leads PC1 and PC2 alternate in occurrence. A pulse appearing on either PC1 or PC2 represents a single flux reversal in the clock channel of recorder 1510 and indicates a bit position. The binary character of the bit in that bit position is determined through reference to the pulse signals on leads DF1 and DF2. The presence of a concurrent pulse signal on lead DF1 indicates a recorded binary 1 and the absence thereof indicates a recorded binary 0 in that bit position.

Figure 18:
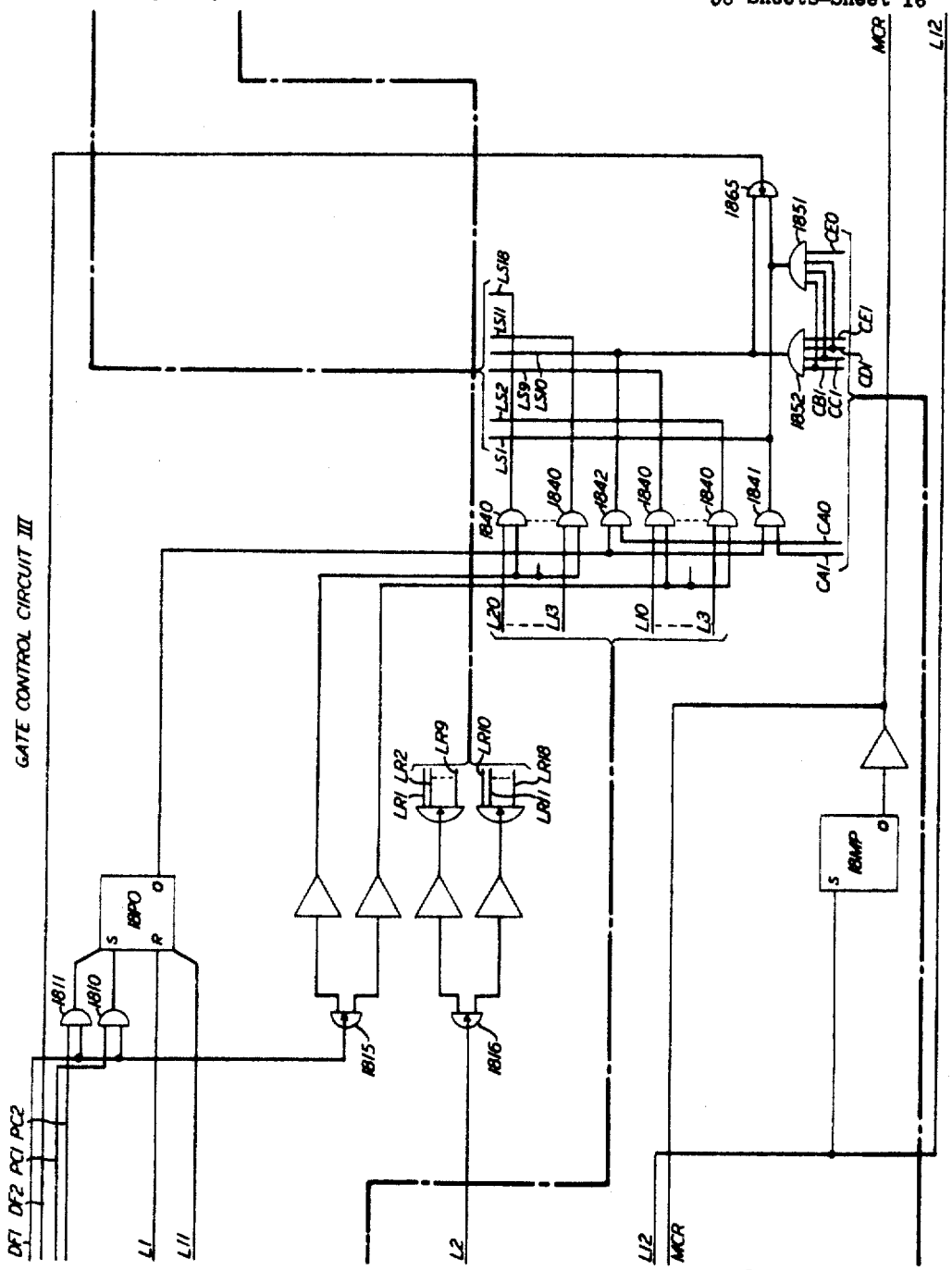

The pulses representative of each bit position of the word being detected from recorder 1510 are provided therefore alternately on leads PC1 and PC2 to advance the mod-M counter (FIGS. 16 and 17) in much the same manner as the pulses on leads P1 and P2 during modes A and B advance the mod-N counter (FIG. 10). The mod-M counter is similar in operation to the mod-N counter and advances, responsive to the input pulses on leads PC1 and PC2, in a reflected binary code sequence through its successive stages to generate steering pulse on leads L1 through L20 to gate control circuit III (FIG. 18). The pulses on lead PC1 are applied to each of AND gates 1610 and the pulses on lead PC2 are applied to each of AND gates 1710 and 1711. The other inputs to AND gates 1610, 1710 and 1711 are derived from various combinations of the outputs of the counter flip-flops 16A, 17B, 17C, 17D and 17E. Each pulse on leads PC1 and PC2 advance the counter one stage through its cycle to generate successive pulses on leads L1 through L20 in numerical sequence. The counter normally recycles on receiving as many input pulses as its modulo, which in this embodiment is twenty-four; however, since only twenty steering pulses are required here, the pulse on lead L12 resets the counter flip-flops 16A and 17B through 17E after a delay provided by monopulser 18MP. The pulse on lead L12 sets monopulser 18MP, which times out after an interval of time sufficient for the receipt of the remaining eights bits of the data word being detected, to provide the reset signal over lead MCR to the reset terminals of flip-flops 16A and 17B through 17E. The pulse on lead L12 is used to reset the mod-M counter, rather than the pulse on lead L20, to prevent any loss in phase should there be an error in the number of bits in this word geing detected. Lamps 16AL and 17BL through 17EL are provided for a visual indication of the binary state of flip-flops 16A and 17B through 17E, respectively.

Gating data words to output register

The successive bits of each word detected from recorder 1510 during mode D are directed to the respective output register flip-flops 19R1 through 19R18. In gate control circuit III the steering pulses on leads L3 through L10 and L13 through L20 are applied to respective inputs of AND gates 1840; and the information signals on lead DF1, determinative of the binary character of the bits, are applied through AND gate 1815 in common to the other input of AND gates 1840. The steering pulses arriving successively on leads L3 through L10 and L13 through L20 thus enable the respective AND gates 1840 to gate concurrently-applied binary information signals on lead DF1 to the associated leads LS2 through LS9 and LS11 through LS18, respectively. Output signals appearing on leads LS2 through LS9 and LS11 through LS18 correspond to a binary 1 for that bit position of the word being detected, and set the respective flip-flops 19R2 through 19R9 and 19R11 through 19R18 in the output register. Therefore, the binary information signals appearing in bit positions 3 through 10 of each word detected, determinative of a two-digit binary-decimal number in the exemplary word structure of FIG. 44, are steered in succession into flip-flops 19R2 through 19R9; and the binary information signals appearing in bit positions 13 through 20, determinative of another two-digit binary-decimal number, are steered in succession into flip-flops 19R11 through 19R18.

Parity check

Concurrently with the gating operation, a parity check is made of each binary-decimal number in the word being detected. It will be recalled that separate parity bits are recorded for the two, two-digit numbers in each word in bit positions 2 and 12, respectively. The steering pulses on leads L1 and L11 are utilized to reset the parity output flip-flop 18P0 preparatory to making the parity check of the respective two-digit numbers in the word being detected. Each binary information signal in bit positions 2 through 10 and 12 through 20 are applied through AND gates 1810 and 1811 to the set terminals of flip-flop 18P0. Hence, flip-flop 18P0 reveals the recorded pattern of each data word and the output thereof on lead 1821 permits detection of single bit errors in a manner well known in the art. A parity error indication for the number in bit positions 3 through 10 is provided on lead LS1, by the enablement of AND gates 1841 and 1851 after receipt of the bit in bit position 10, as indicated by mod-M counter output signals on leads CA1, CB1, CC1, CD1, and CE0. If a parity error is detected for the number in bit positions 13 through 20, an indication thereof is provided on lead LS10 by the enablement of AND gates 1842 and 1852 after receipt of the bit in bit position 20, as indicated by signals on leads CA0, CB1, CC1, CD1 and CE1. Parity error indications appearing on leads LS1 and LS10 set flip-flops 19R1 and 19R10, respectively, to permit an error indication to be printed adjacent the incorrect number by printer 2610.

Selecting desired block of data

Figure 20:
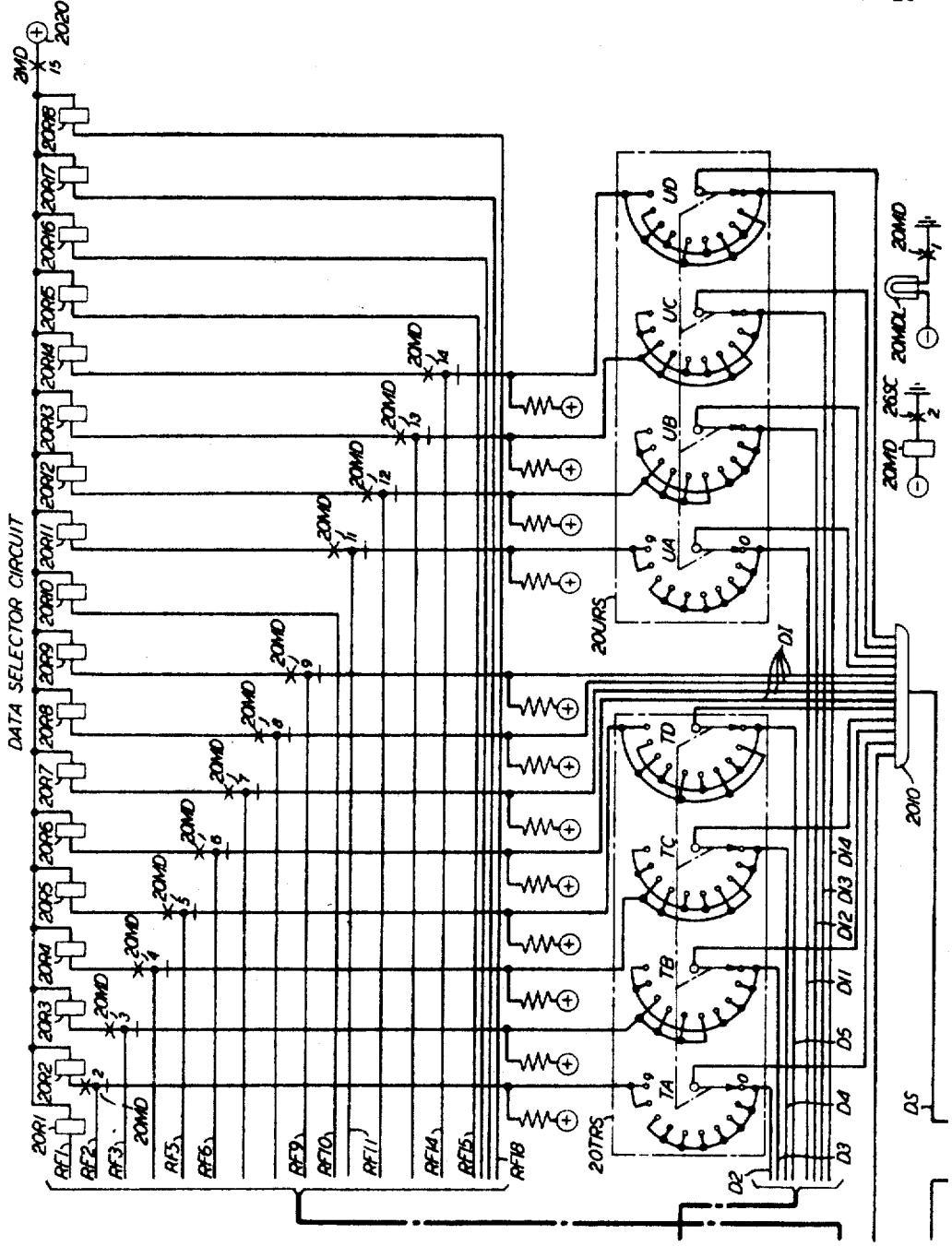

Throughout the scanning operation of mode D, each word detected from recorder 1510 in the manner discussed above and transferred to output register flip-flops 19R1 through 19R18 is compared with the information initially placed in the data selector circuit (FIG. 20). Until a match indicates that the word stored in flip-flops 19R1 through 19R18 is the first word of the block of data desired to be printed out, each word detected is discarded in sequence with no other action with regard to it taking place. The detection of the first word of the desired block of data essentially includes two parts. The special identity code, binary number 1111, is contained in bit positions 7 through 10 of the first word of each block of data recorded in recorder 1510. When a first word of a data block is detected and transferred to the output register, this special identity code is stored in flip-flops 19R6 through 19R9, the outputs of which are applied over leads RF6 through RF9 via the break portion of transfer contacts 6 through 9, respectively, of relay 20MD on leads DI to AND gate 2010. The first word of each block of data further includes a two-digit number which uniquely identifies the particular switching office from which the data obtained. These two digits are stored in binary-decimal notation in flip-flops 19R2 through 19R5 and in flip-flops 19R11 through 19R14, and are reflected on leads D2 through D5 and RF2 through RF5, and on leads D11 through D14 and RF11 through RF14, respectively, to the data selector circuit. If the switching office number reflected on leads D2 through D5, RF2 through RF5, D11 through D14 and RF11 through RF14 is the same as the number initially placed in the data selector circuit, a match obtains to enable AND gate 2010, indicating that the desired data has been located.

The data selector circuit (FIG. 20) shown in the illustrative embodiment comprises a pair of rotary switches 20TRS and 20URS, each including four ten-point arcs of terminals and their associated intercoupled wipers. The terminals of arcs TA through TD of tens digit switch 20TRS are wired in accordance with a binary-decimal code such that the ten positions thereof correspond to the digits 0 through 9. Similarly, the ten positions of the units digit switch 20URS correspond to the digits 0 through 9 in binary-decimal code. The tens digit of the switching office number, stored in flip-flops 19R2 through 19R5, is reflected on leads D2 and RF2 through D5 and RF5 to the terminals of arcs TA through TD, respectively. If the intercoupled wipers of switch 20TRS are placed in a tens digit position corresponding to the tens digit registered in flip-flops 19R2 through 19R5, output signals are provided on each of leads DTA through DTD to AND gate 2010. In a similar manner, if the intercoupled wipers of switch 20URS are placed in a units digit position corresponding to the units digit registered in flip-flops 19R11 through 19R14, signals are provided on each of leads DUA through DUD to AND gate 2010. Thus, when the first word of the desired block of data is registered in flip-flops 19R1 through 19R18, each of leads DTA through DTD, DUA through DUD, and DI to AND gate 2010 are energized. A signal on lead MCR from monopulser 18MP, indicating that the word has been completely received, enables AND gate 2010 to provide a detect signal on lead DS to set flip-flop 26SCD and monopulser 26PDT.

*Printing desired block of data*

The setting of flip-flop 26SCD signifies the end of the mode D scanning operation and the beginning of the mode D printing operation. Relay 26SC1 is energized thereby to provide battery through its contact 1 and the break portion of transfer contact 1 of relay 26SC to recorder stop circuitry 26RS to stop recorder 1510. Thereafter relay 26SC operates through contact 2 of relay 26SC1 to transfer control of the recorder stop circuitry 26RS through the make portion of transfer contact 1 of relay 26SC1 to contact 1 of relay 26P3. Control of the recorder start reverse circuitry 26RSR is under the control of contact 1 of relay 26P2. Further, relay 20MD is energized through contact 2 of relay 26SC to connect leads RF2 through RF5 and RF11 through RF14 to relays 20R2 through 20R9 and 20R11 through 20R14, respectively, via the make portion of contacts 2 through 9 and 11 through 14 of relay 20MD. Leads RF1, RF10 and RF15 through RF18 are permanently connected to relay 20R1, 20R10 and 20R15 through 20R18, respectively. Each of relays 20R1 through 20R18 is connected in common through contact 15 of relay 20MD to voltage source 2020. Thus the presence of a ground on any of leads RF1 through RF18, indicating the reset condition of associated flip-flops 19R1 through 19R18, energizes the corresponding ones of relays 20R1 through 20R18. Whenever one of flip-flops 19R1 through 19R18 is set, the corresponding relay 20R1 through 20R18 is released. Accordingly, the condition of relays 20R1 through 20R18 reflects the binary content of the word stored in flip-flops 19R1 through 19R18. Lamp 20MDL is lighted through contact 1 of relay 20MD to indicate that mode D printing is in progress; and the operate path of relay 28RMC is disrupted by operated break contact 2 of relay 26SC to prevent mode C operation while mode D printing is in progress.

*Binary-to-decimal translation*

Figure 24:
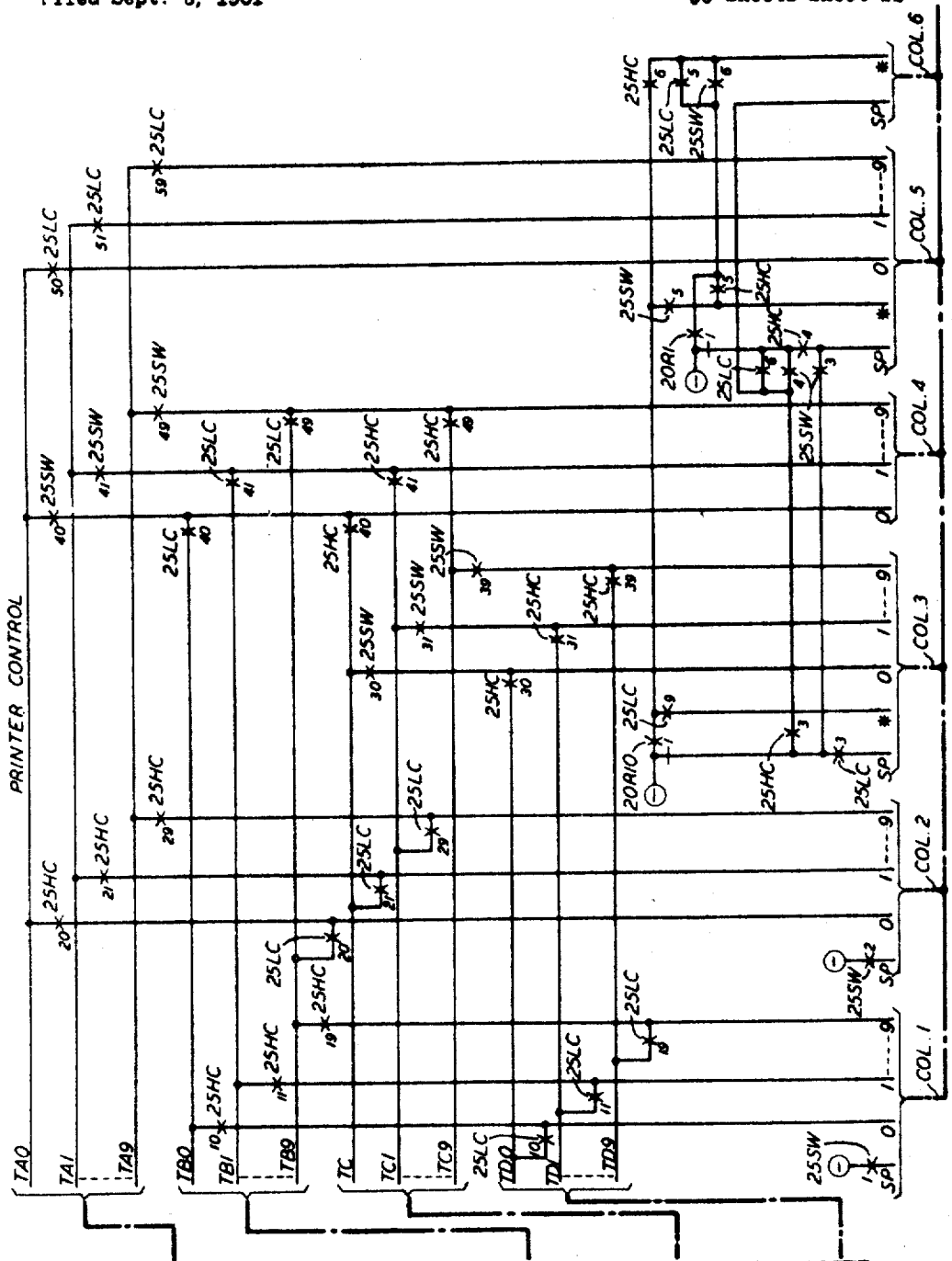
Figure 26:
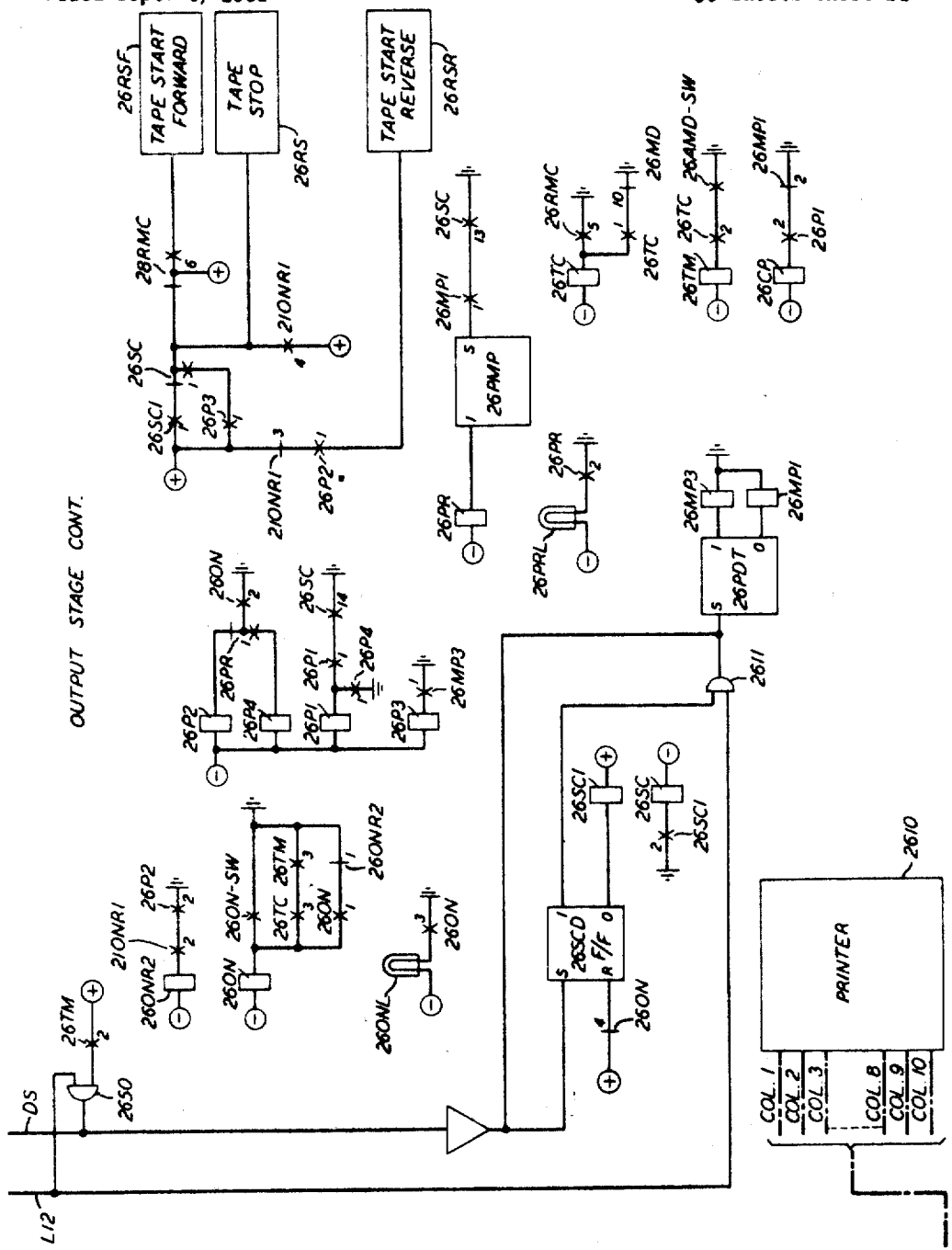

The contacts of relays 20R2 through 20R9 and 20R11 through 20R18 are located in binary-to-decimal translators 23BD1 through 23BD4, each of which translates one of the binary-decimal coded digits in the word being detected into a decimal digit indication. Translator 23BD1 performs this translation process on the binary-decimal coded digit registered in flip-flops 19R2 through 19R5, and thus reflected by transfer contacts 1 of relays 20R2 through 20R5, to provide a decimal digit indication on one of the translator output leads TA0 through TA9. Translator 23BD2 translates the encoded digit registered in flip-flops 19R6 through 19R9 into a decimal indication on one of leads TB0 through TB9; translator 23BD3 translates the encoded digit registered in flip-flops 19R11 through 19R14 into a decimal indication on one of leads TC0 through TC9; and translator 23BD4 translates the encoded digit registered in flip-flops 19R15 through 19R18 into a decimal indication on one of leads TD0 through TD9. The information registered in flip-flops 19R1 and 19R10 for each word, it will be recalled, is utilized to indicate parity failures, and is reflected on leads RF1 and RF10 through relays 20R1 and 20R10 to respective transfer contacts 1 thereof in the printer control circuitry (FIG. 24).

Figure 19:
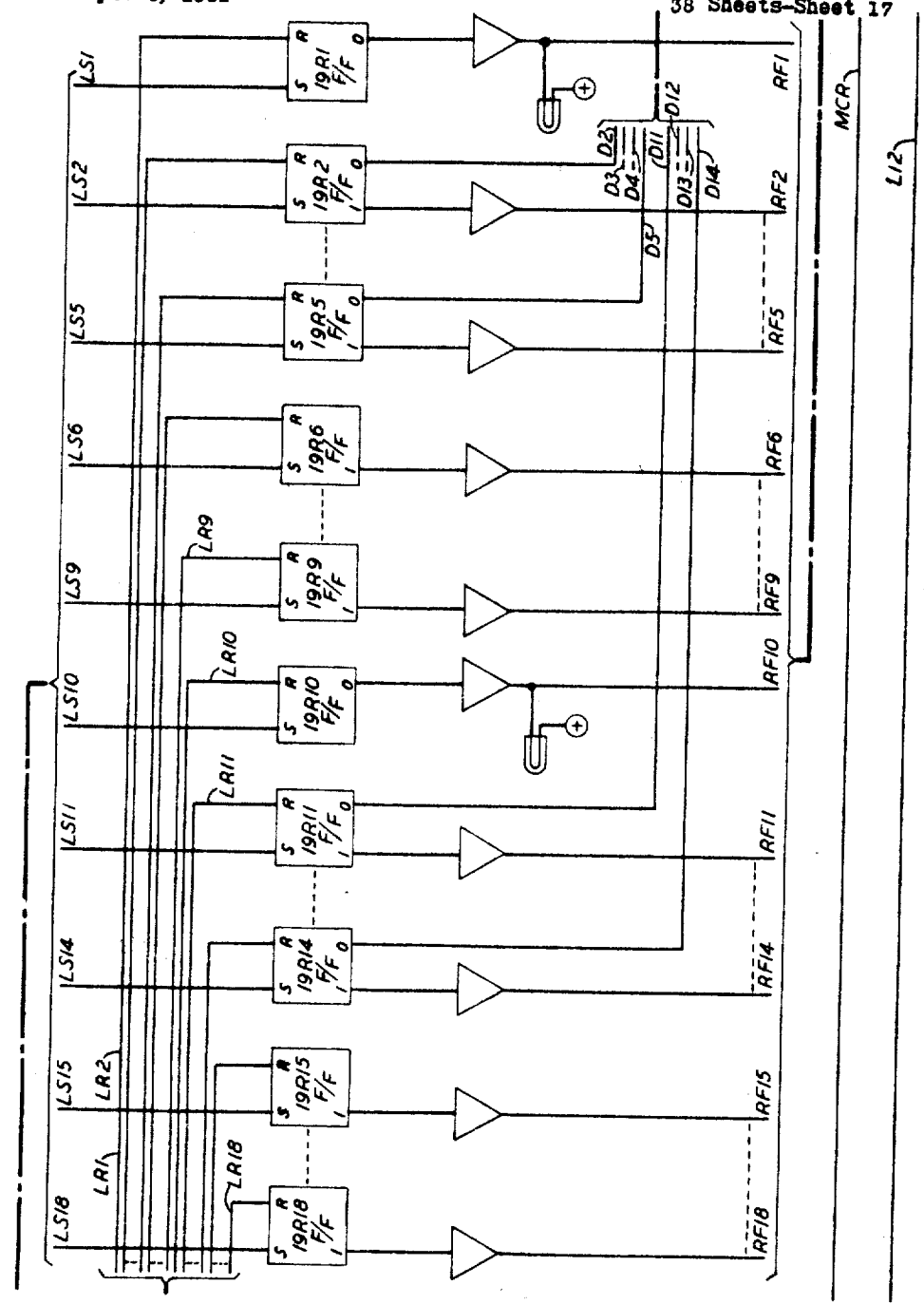

Each of the binary-to-decimal translators contain circuitry similar to that shown in detail in translator 23BD1. Ground is connected in common through a make contact of relay 20MD to a transfer contact of each of four relays associated with the translator, which in the case of translator 23BD1 are relays 20R2, 20R3, 20R4 and 20R5. The respective transfer contacts 1 of relays 20R2 through 20R5 reflect the binary character of the four bits of information stored in flip-flops 19R2 through 19R5, operation of the respective make portion of the transfer contact indicating a binary 0 and operation of break portion of the contact indicating a binary 1. Each of the transfer contacts is connected through a respective group of relays A, B, C and D to a common voltage source 2310, the relay groups A, B, C and D corresponding to the binary equivalents 8, 4, 2 and 1, respectively, of the binary-decimal coded digit registered in flip-flops 19R2 through 19R5. Thus, the encoded binary-decimal digit reflected on the transfer contacts of relays 20R2 through 20R5 energize corresponding unique combinations of the relays in relay groups A, B, C and D. The individual make contacts 1 of the energized relays in relay groups A, B, C and D operate to connect voltage source 2320 to one, and only one, of decimal output leads TA0 through TA9. Translators 23BD2, 23BD3 and 23BD4 function in a similar manner to provide a voltage signal on one of their respective decimal output leads for each word registered in the output register (FIG. 19).

*Transfer of translated information to printer*

The output leads of binary-to-decimal translators 23BD1 through 23BD4 are connected through the printer control circuitry (FIGS. 24 and 25) to printer 2610. Printer 2610 may comprise any of the well known data printer circuitry in the art for printing lines of data characters in accordance with various combinations of voltage input signals. The exemplary printer 2610 employed in the present illustrative embodiment has ten print positions or columns per line, and has a choice of twelve characters per column. The twelve characters per column include decimal digits 0 through 9, a space, and an asterisk, the asterisk being employed as a parity error indication. Therefore each of the ten columns has twelve input leads, where each lead corresponds to one of the twelve characters. Print relay 26PR is energized to operate a contact (not shown) in printer 2610 to print each line of data characters received on the column input leads, and the printed medium advances to the next line automatically.

The function of the printer control circuitry, therefore, is to connect the outputs of translators 23BD1 through 23BD4 and the parity indications reflected on contacts 1 of relays 20R1 and 20R10 to the proper columns of printer 2610 in accordance with the type of information that is being printed. The words in each block of data to be printed out are divided into three types—identity words, low-count words, and high-count words—and a different connection is provided by the printer control circuitry for the printing of each of these word types under the control of relays 25SW, 25LC and 25HC, respectively.

Initially, during the mode D printing operation the printer control circuitry establishes the proper connections for identity word printing through the energization of relay 25SW via operated contact 3 of relay 26SC and unoperated contacts 1 of relays 25HC and 25CC. The operated contacts 1 through 6, 8 through 10, and 30 through 49 of relay 25SW establish the following obvious connections to the printer column input leads:

(1) The identity word units digit on leads TC0 through TC9 is connected to the decimal digit input leads 0 through 9, respectively, of column 3. (Contacts 30 through 39.)

(2) The identity word tens digit on leads TA0 through TA9 is connected to the decimal digit input leads 0 through 9, respectively, of column 4. (Contacts 40 through 49.)

(3) The parity error indications reflected on contacts 1 of relays 20R10 and 20R1 are connected to the asterik character input leads of columns 5 and 6, respectively. (Contacts 5 and 6.)

(4) A voltage source is connected to the space character input lead SP of each of columns 1, 2, 5, 6, and 8 through 10. The connections to the space character input lead SP of columns 5 and 6 are established through the break portion of contacts 1 of relays 20R10 and 20R1, respectively, such that a space is provided in the absence of a parity error. (Contacts 1, 2, 3, 4, and 8 through 10.)

When the next to last identity word has been received and printed, as indicated by the operation of contact 6 of relay 21U9 in the word counter circuit (FIG. 21), relay 25DC is energized and locks up to ground through the make portion of its transfer contact 1 and operated contact 3 of relay 26SC. The operation of relay 21U0 in the word counter circuit, indicating receipt of the last identity word, energizes low-count relay 25LC through contact 4 of relay 26SC, contact 6 of relay 21U0, contact 7 of relay 25SW and contact 2 of relay 25DC. Relay 25LC locks up to ground through its contact 2, contact 2 of relay 25HC and operated contact 3 of relay 26SC. Operation of relay 25LC also releases relay 25SW through contact 1 of relay 25LC. The operated contacts 3 through 29 and 40 through 59 of relay 25LC in the printer control circuitry establish the following connections to the printer column input leads:

(1) The units and tens digits of a low-count total (from an odd-numbered summarization store register location) on leads TD0 through TD9 and TC0 through TC9, respectively, are connected to the corresponding decimal digit input leads of columns 1 and 2, respectively. (Contacts 10 through 29.)

(2) The units and tens digits of a low-count total (from an adjacent even-numbered summarization store register location) on leads TB0 through TB9 and TA0 through TA9 are connected to the corresponding decimal digit input leads of columns 4 and 5, respectively. (Contacts 40 through 59.)

(3) The parity error indications reflected on contacts 1 of relays 20R10 and 20R1 are connected to the asterik character input leads of columns 3 and 6, respectively. (Contacts 9 and 5.)

(4) A voltage source is connected to the space character input lead SP of each of columns 3 and 6. The connections to the space character input leads SP of columns 3 and 6 are established through the break portion of contacts 1 of relays 20R10 and 20R1, respectively, such that a space is provided in the absence of a parity error. (Contacts 3 and 6.)

Upon receipt of all of the low-count words, as indicated by operated contacts 5 of relays 22T6 and 22H7 and by unoperated contacts 5 of relays 22T7 and 22H8 in the word counter, high-count relay 25HC operates and locks up to ground through its contact 50 and operated contact 3 of relay 26SC. Energization of relay 25HC releases relay 25LC and establishes the following connections via contacts 3 through 6 and 10 through 49 of relay 25HC to the printer column input leads:

(1) The units and tens digits of a high-count total on leads TB0 through TB9 and TA0 through TA9, respectively, are connected to the corresponding decimal digit input leads of columns 1 and 2. (Contacts 10 through 29.)

(2) The hundreds and thousands digits of the high-count total on leads TD0 through TD9 and TC0 through TC9, respectively, are connected to the corresponding decimal digit input leads of columns 3 and 4. (Contacts 30 through 49.)

(3) The parity error indications reflected on the make portion of contacts 1 of relays 20R1 and 20R10 and connected to the asterik character input leads of columns 5 and 6, respectively. (Contacts 5 and 6.)

(4) A voltage source is connected to the space character input lead SP of column 7, and through the break portion of contacts 1 of relays 20R1 and 20R10 to the space character input leads SP of columns 5 and 6, respectively. (Contacts 3 and 4.)

The printer control circuitry is restored to normal at the end of the mode D printing operation by the release of relay 26SC, which releases contacts 3 and 4 to remove ground from relays 25SW, 25LC, 25HC and 25DC.

*Word counter*

Figure 21:
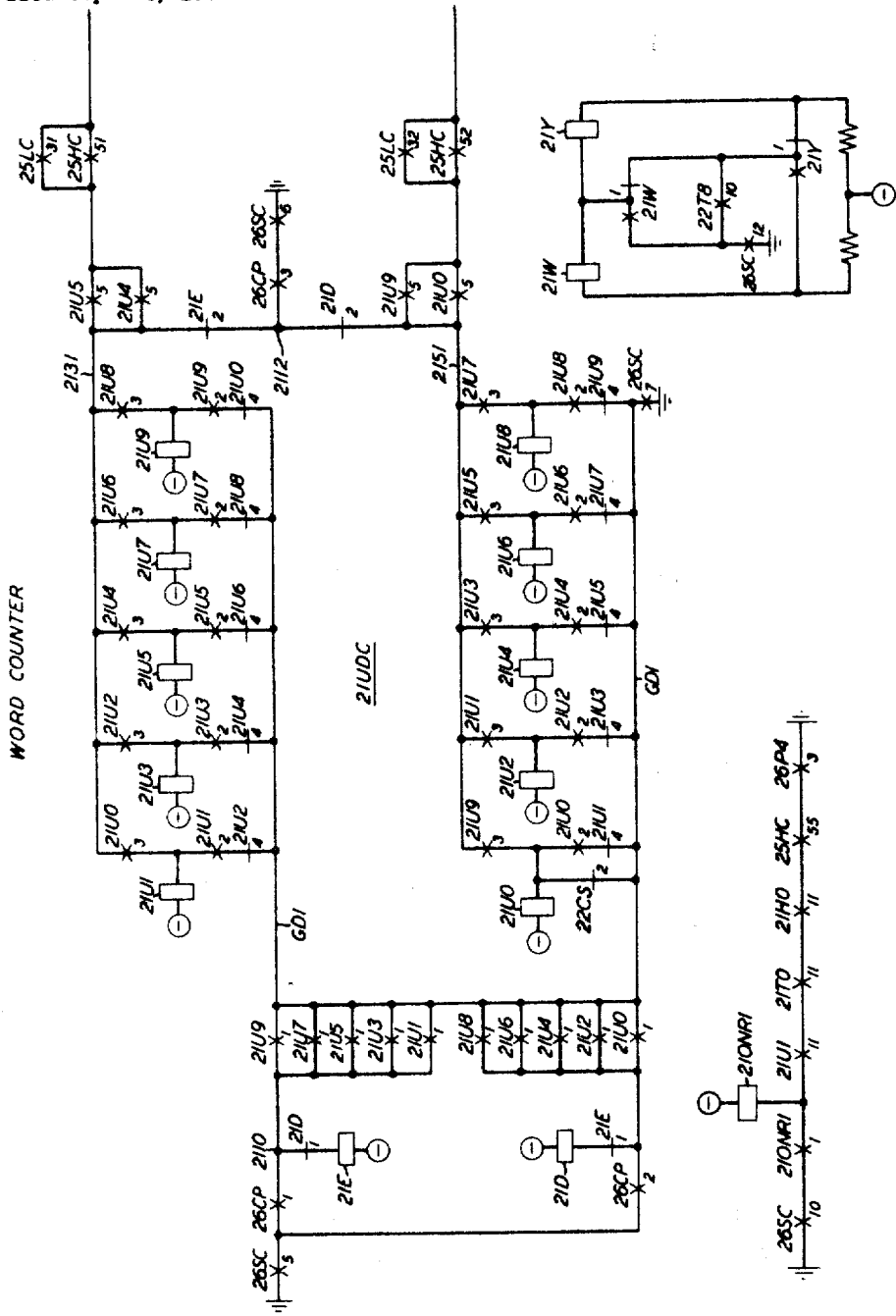
Figure 22:
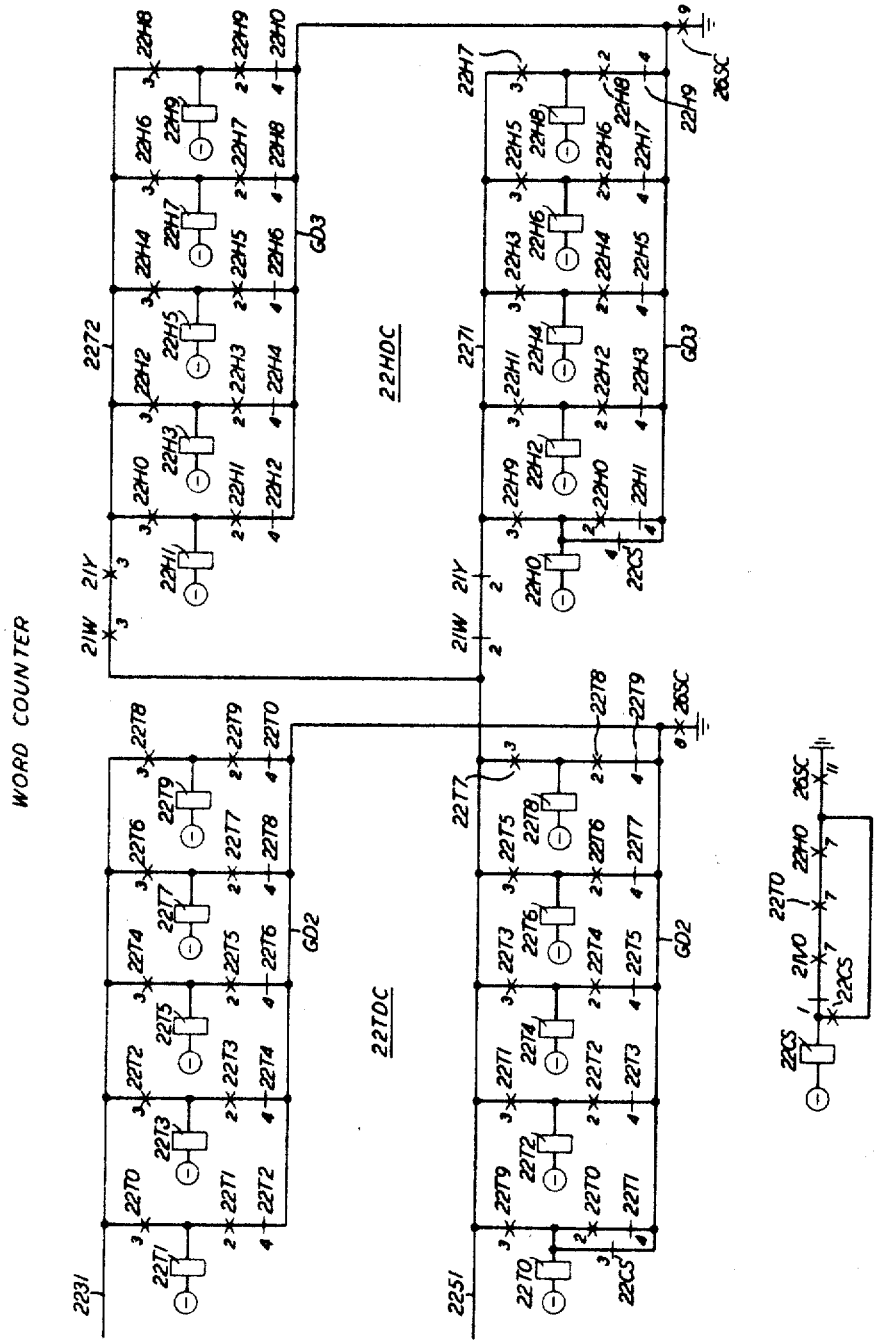
Figure 23:
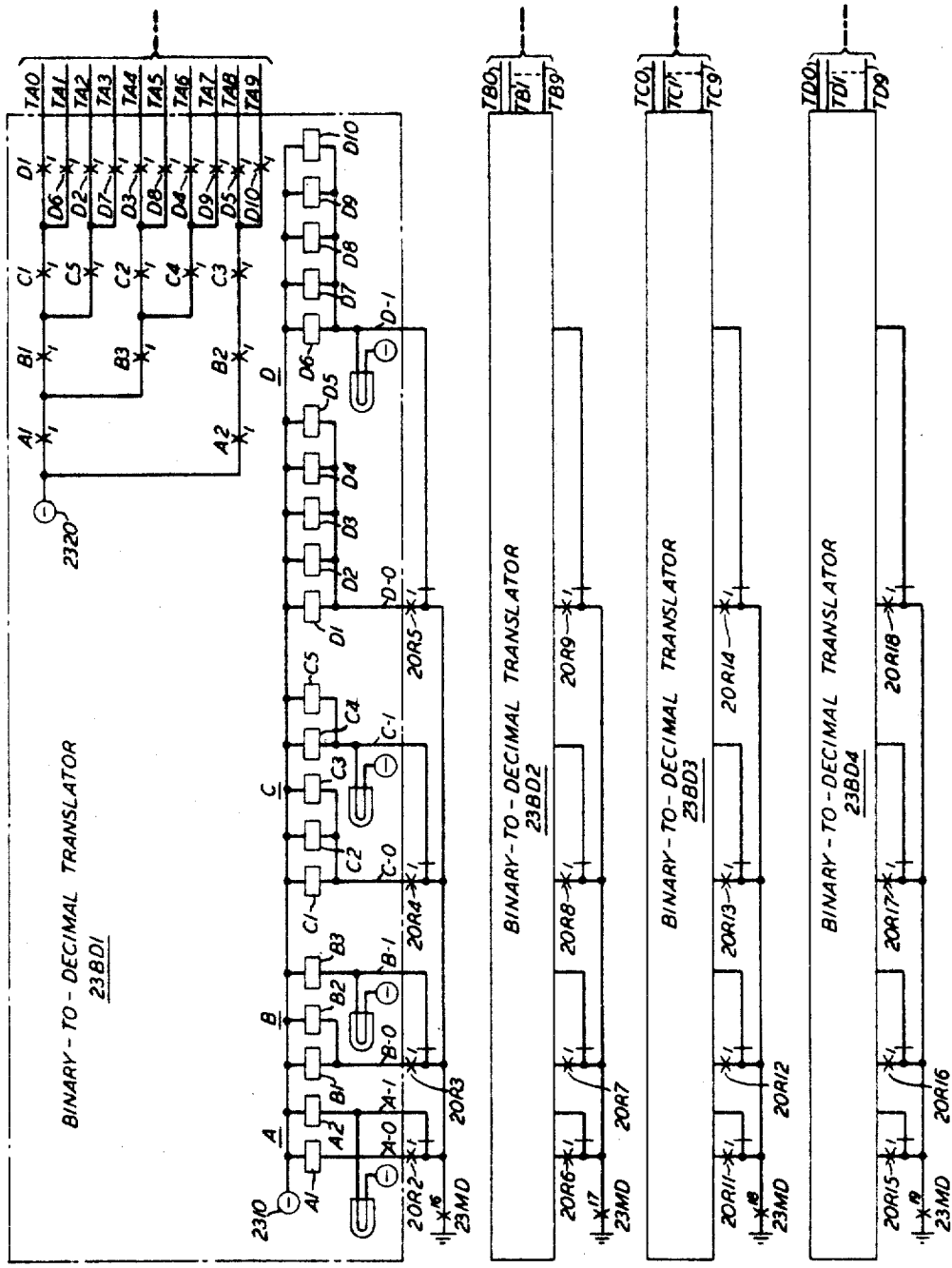

It will be noted from the above description of the printer control circuitry that operation of low-count relay 25LC and high-count relay 25HC are controlled by the word counter (FIGS. 21 and 22). Each block of data recorded in recorder 1510 contains a predetermined number of four-digit words equal to one-half of the number of two-digit register locations in the summarization store. Thus for the exemplary summarization store of 1024 such register locations, each block of data in recorder 1510 contains 512 words. Similarly, the words in each data block are divided into predetermined numbers of identity words, low-count words and high-count words. For example, the 512 words in the data block may include ten identity words, 380 low-count words, and 122 high-count words (including the group totals and the error count). Therefore by maintaining a count of the words read from recorder 1510 during the printing of a block of data, the several types of words being detected may be distinguished to control the connection of the printing circuitry in accordance therewith, in the manner discussed above. Further, as described below, the word counter may be used advantageously to control the printing of identification numbers adjacent the count totals printed out for readily identifying the summarization store register location, and thus the unit of observed equipment, from which the count obtained.

The word counter (FIGS 21 and 22) basically comprises three decade counters 21UDC, 22TDC and 22HDC, one for each of the decimal digits in the word count. The first words read from recorder 1510 during the printing of a block of data are the identity words; and since there are only ten identity words in the illustrative example set forth herein, the units decade counter 21UDC has sufficient capacity to maintain the count thereof. Therefore, during the identity word printing sequence, the tens and hundreds decade counters 22TDC and 22HDC are disconnected from units decade counter 21UDC through unoperated contacts 31 and 32 of relay 25LC and contacts 51 and 52 of relay 25HC. In the low-count and high-count word printing sequences, contacts 31 and 32 and 51 and 52 of relays 25LC and 25HC, respectively, are operated to connect counters 22TDC and 22HDC to counter 21UDC. Further, since each word read from recorder 1510 during the low-count and high-count printing sequences represent two summarization store register locations, units decade counter 21UDC is arranged to count by two's, i.e., the word count advances by two for each four-digit word detected from recorder 1510. This facilitates the printing of identification numbers adjacent the count totals.

The operation of the word counter is as follows: At the start of mode D printing operation, the detection of the first word of the desired block of data in the output register (FIG. 19) sets flip-flop 26SCD over lead DS, resulting in the operation of relays 26SC1 and 26SC as pointed out above. Operated contacts 5 through 9 of relay 26SC provide ground connections to appropriate circuit points in the word counter to permit it to operate. The ground thus provided on lead GD1 through contact 7 of relay 26SC operates relay 21U0 through unoperated contact 2 of relay 22CS. Relay 21U0 locks up through its contact 2 and contact 4 of relay 21U1 to ground on lead GD1. The ground provided on leads GD2 and GD3 via contacts 8 and 9 of relay 26SC is extended through contacts 3 and 4 of relay 22CS to operate relays 22T0 and 22H0 in a similar manner, which lock up through contacts 4 of relays 22T1 and 22H1, respectively. Operation of contacts 7 of relays 21U0, 22T0 and 22H0 energizes relay 22CS, which locks up to ground through an obvious circuit including its contact 1 and contact 11 of relay 26SC. Energization of relay 22CS removes the operate ground on contacts 2, 3 and 4 thereof from relays 21U0, 22T0 and 22H0. The operation of relay 21U0 also operates relay 21D by extending the ground on lead GD1 through operated contact 1 thereof and contact 1 of relay 21E. The word counter state at this point is the decimal number 000.

Each successive word detected from recorder 1510 operates relay 26CP in a manner described below to extend a ground connection to points 2110, 2111, and 2112 via its contacts 1, 2 and 3, respectively, for an interval of time determined by delay monopulser 26PDT. The ground pulse connection at point 2112 is provided alternately to leads 2131 and 2151 to energize counter relays 21U1 through 21U9 in sequence through an operated make contact of the preceding counter relay. The counter relay energized by the ground connection on lead 2131 or 2151 locks up through a break contact of the succeeding counter relay to the ground on lead GD1, and releases the preceding counter relay. Further, the energized relay extends the ground on lead GD1 to the one of points 2110 and 2111 which corresponds to the unoperated one of relays 21D and 21E. Therefore when relay 26CP releases to terminate the ground pulse at points 2110 and 2111, the ground extended thereto from lead GD1 energizes the previously unoperated one of relays 21D and 21E. It is this alternate operation of relays 21D and 21E which provides the ground pulse connected at points 2112 through break contacts of relays 21D and 21E alternately to lead 2131 and 2151.

Thus, when the word counter is in the zero state and the second identity word is detected from recorder 1510, thereby operating relay 26CP, a ground pulse connection is provided through contacts 1 and 2 thereof to points 2110 and 2111, and through contact 3 to point 2112. The ground pulse connection at point 2112 is extended through contact 2 of relay 21E to lead 2131. The ground pulse on lead 2131 energizes relay 21U1 through operated contact 3 of relay 21U0, and relay 21U1 locks up through its contact 2 and unoperated contact 4 of relay 21U2 to lead GD1. Operation of contact 4 of relay 21U1 removes the ground on lead GD1 from relay 21U0, thereby releasing it, and contact 1 of relay 21U1 extends the ground on lead GD1 to point 2110. The release of contact 1 of relay 21U0 removes the ground on lead GD1 from point 2111. Therefore upon the release of contacts 1 and 2 of relay 26CP, terminating the ground pulse connection at points 2110 and 2111 and releasing relay 21D, relay 21E is operated through released contact 1 of relay 21D by the lead GD1 ground at point 2110. The next ground pulse connection at point 2112 is thus directed to lead 2151 through contact 2 of relay 21D to operate relay 21U2, and so on, each successive ground pulse operating relays 21U3 through 21U9 in sequence.

Operation of relay 21U9, indicating that the last identity word is registered in the output register, energizes relay 25DC in the manner pointed out above. The next word registered in the output register is the first low-count word. The detection thereof provides the ground pulse connection at point 2112 through contact 2 of relay 21D to lead 2151 to energize relay 21U0 via operated contact 3 of relay 21U9. Low-count relay 25LC is operated thereby to establish the printer control circuitry connections noted above. Further, operated contacts 31 and 32 of relay 25LC connect units decade counter 21UDC to tens decade counter 22TDC and hundreds decade counter 22HDC. At this point, the counter is connected to maintain a count of the low-count words, and is in the present decimal state 000. Succeeding words detected from recorder 1510 provide ground pulse connections, as before, to points 2110, 2111 and 2112 to operate relays 21U1 through 21U9 in sequence. Thereafter, units decade counter 21UDC continues to recycle and operate relays 21U1 through 21U9 in sequence until all of the words in the block of data have been printed out.

Each time relay 21U4 operates, it connects lead 2131 through its contact 5 to lead 2231. Thus, the succeeding ground pulse connection on lead 2131 to operate relay 21U5 is extended to lead 2231 and thus through contact 3 of relay 22T0 to operate relay 22T1, which locks up through its contact 2 and unoperated contact 4 of relay 22T2 to lead GD2. Contact 5 of relay 21U5 also interconnects leads 2131 and 2231 to assure that the ground pulse connection on lead 2131 will be provided to relay 22T1 for sufficient duration to operate it. In a similar manner, each time relay 21U9 operates, it connects lead 2151 through its contact 5 to lead 2251; and the succeeding ground pulse connection on lead 2151 operates relays 21U0 and 22T2. Operation of tens decade counter 22TDC is similar, therefore, to the operation of units decade counter 21UDC. A ground pulse connection is provided alternately to leads 2231 and 2251, each time advancing counter 22TDC one step by operating relays 22T1 through 22T0 in sequence and by releasing the preceding relay. However, the ground pulse connections advancing tens decade counter 22TDC are provided thereto for each five words counted by units decade counter 21UDC. Therefore, during the low-count and high-count counting sequences, each word detected from recorder 1510 effectively advances the word counter two steps.

Hundreds decade counter 22HDC is controlled by a pulse divider network comprising relays 22W and 22Y which is driven by tens decade counter 22TDC. Initially, when the word counter is in decimal state 000, relays 22W and 22Y are unoperated, permitting ground pulses appearing on lead 2251 to appear through contacts 2 thereof on lead 2271. These ground pulses have no effect since initially only relay 22H0 is operated in counter 22HDC. Relay 22W is operated through the break portion of its contact 1, contact 12 of relay 26SC and contact 10 of relay 22T8 each time relay 22T8 is energized, i.e., upon receipt of the fortieth data word and each odd multiple thereof, to operate contact 2 of relay 22W and thus disconnect lead 2271 from lead 2251. When contact 10 of relay 22T8 releases, relay 22Y is operated through the make portion of contact 1 of relay 22W to connect lead 2271 through contacts 3 of relay 21W and 21Y to lead 2251. Consequently, the subsequent ground pulse connection on lead 2251 to operate relay 22T0, indicating receipt of the fiftieth data word or odd multiple thereof, is extended to lead 2272 through contact 3 of relay 22H0 to operate relay 22H1 in the hundreds decade counter 22HDC. Relay 22H1 locks up through its contact 2 and unoperated contact 4 of relay 22H2 to lead GD3. The next time relay 22T8 operates, indicating receipt of an even multiple of the fortieth data word, both terminals of relay 22W will be grounded through the make portions of transfer contacts 1 of relays 22W and 22Y, thereby releasing relay 22W and releasing contact 3 thereof to disconnect lead 2271 from lead 2251. Upon the release of relay 22T8, relay 22Y releases to connect lead 2271 through unoperated contacts 2 of relays 21W and 21Y to lead 2251. Thus the subsequent ground pulse connection on lead 2251 to operate relay 22T0, indicating the receipt of an even multiple of the fiftieth word, is extended on lead 2271 to operate relay 22H2 in the counter 22HDC, which locks up through its contact 2 and unoperated contact 4 of relay 22H3 to lead CD3. Accordingly, the pulse divider network relays 22W and 22Y cause the ground pulses on lead 2251 to be provided alternately to leads 2271 and 2272 each time tens decade counter 22TDC is recycled. The operation of hundreds decade counter 22HDC is therefore substantially the same as that of counters 21UDC and 22TDC. The capacity of the word counter is 500 input words (registering a capacity count of 1000), after which the counter recycles.

*Printing of identification numbers adjacent data*

As mentioned above, the word counter may also be used advantageously to control the printing of identification numbers adjacent the count totals. It will be recalled that each word in the block of data contains the information from two adjacent summarization store register location. In the case of the high-count data words, the thousands and hundreds digits to be printed in columns 4 and 3, respectively, by printer 2610 are derived from an even-numbered register location in the summarization store, the adjacent odd-numbered summarization store register location providing the units and tens digits of the high-count word. Therefore, "even" decimal numbers have been chosen arbitrarily as the identification numbers to be printed adjacent the count totals in columns 8, 9 and 10 by recorder 2610. Since the word counter is arranged to count by two's during the low-count and high-count sequences, an indication of such even identification numbers is readily available on contacts 8 and 9 of the word counter relays 21U0 through 21U9, 22T0 through 22T9, and 22H0 through 22H9. Battery is connected through contacts 4, 7 and 8 of relay 25LC and through contacts 7, 8 and 9 of relay 25HC to energize the digit leads in columns 8, 9 and 10, respectively, selected by the operated combinations of contacts 8 and 9 of relays 21U0 through 22H9 during the low-count and high-count printing operations. During the identity word printing operation, battery is connected to leads SP of columns 8, 9 and 10 through contacts 8, 9 and 10, respectively of relay 25SW. Throughout all of the mode D printing operation, battery is connected to space input lead SP of column 7 (not shown) of printer 2610.

The contacts 8 and 9 of relays 21U0 through 21U9 of units decade counter 21UDC correspond to the units digit of the word count, and are connected to decimal digit input leads 0, 2, 4, 6 and 8 of column 8 of printer 2610. The operation of counter relays 21U0 through 21U4 in sequence energizes the respective input leads 0, 2, 4, 6 and 8 in sequence through obvious circuits to cause the printing of a corresponding even-numbered units digit by printer 2610 in column 8. Similarly, the sequential operation of counter relays 21U5 through 21U9 sequentially energizes the respective printer input leads 0, 2, 4, 6 and 8 to cause the printing of a corresponding even-numbered units digit in column 8. The contacts 8 and 9 of relays 22T0 through 22T9 correspond to the tens digit of the word count, and are connected to the decimal digit input leads 0 through 9, respectively, of column 9 of printer 2610 to cause the printing of a tens digit. The input leads 0 through 9 of column 10 of printer 2610 are connected to contacts 8 and 9 of relays 22H0 through 22H9, respectively, to cause the printing of a hundreds digit. Thus, the word count registered at any time during the low-count and high-count printing sequences is reflected on contacts 8 and 9 of the operated counter relays to energize a corresponding decimal digit input lead in each of columns 8, 9 and 10 of printer 2610.

*Control of printing operation*

To return now to the control of the mode D printing operation, assume that the first word of the desired block of data is registered in flip-flops 19R1 through 19R18 and reflected through the contacts of relays 20R1 through 20R18 on translator output leads TA0 through TD9, in the manner described above. The detect signal from the data selector circuit on lead DS has set flip-flop 26SCD and monopulser 26PDT, recorder 1510 has stopped and recorder stop circuitry 26RS is under the control of relay 26P2, and relay 25SW has operated to establish the printer control circuit connections indicated above for the identity word printing sequence. The printing operation of printer 2610, it will be recalled, is under the control of print relay 26PR. Thus when monopulser 26PDT times out after a predetermined delay, relay 26MP1 is energized to set print monopulser 26PMP through contact 1 of relay 26MP1 and contact 13 of relay 26SC. The set output of monopulser 26PMP energizes print relay 26PR, thereby causing the first identity word to be printed. Monopulser 26PMP times out after an interval sufficient for the completion of the printing operation and releases relay 26PR.

Relay 26PR also energizes relay 26P4 through the make portion of transfer contact 1 of relay 26PR and contact 2 of relay 26ON to operate relay 26P1 via contact 1 of relay 26P4. Relay 26P1 locks up through its contact 1 and operated contact 14 of relay 26SC. When print relay 26PR releases at the completion of the printing operation, relay 26P4 is released and a path is completed through the break portion of contact 1 of relay 26PR operating relay 26P2 to connect battery through its contact 1 and contact 3 of relay 21ONR1 to recorder start reverse circuitry 26RSR. Motion is imparted to the storage medium of recorder 1510 and the next identity word is detected therefrom and registered in the output register. When twelve of the twenty bits of the word have been detected from recorder 1510, a steering pulse on lead L12 through AND gate 2611 sets monopulser 26PDT, operating relay 26MP3 and releasing relay 26MP1. Operation of relay 26MP3 closes its contact 1 energizing relay 26P3 to apply battery through the make portion of transfer contact 1 of relay 26SC to recorder stop circuitry 26RS. The recorder stop command is sufficiently delayed to allow the remaining eight bits of the word being detected to enter the output register. The release of relay 26MP1 operates relay 26CP through contact 2 of relay 26MP1 and operated contact 2 of relay 26P1, thereby providing ground connections at points 2110, 2111 and 2112 to advance the word counter in the manner indicated above. Upon timeout of monopulser 26PDT, relay 26MP1 reoperates to energize print relay 26PR to cause the word in the output register to be printed out, as above.

The printing of the identity words continues in this manner until all ten words have been printed out. Units decade counter 21UDC will have recycled at this point and will be in the zero state with relay 21U0 operated. Low-count relay 25LC is operated thereby as discussed above to release relay 25SW, to connect counters 22TDC and 22HDC to counter 21UDC, and to establish the printer control circuitry connections for the low-count word printing sequence. The word counter therefore stands at 000 as the first low-count data word is detected and transferred into the output register. From this point on the printing operation continues in the same manner as with the identity words, with the exception that an identifying number corresponding to the count registered by the word counter is printed adjacent the low-count words in columns 8, 9 and 10. Thus the decimal number 000 is printed adjacent the first low-count word, the decimal number 002 is printed adjacent the second low-count word, and so on until the count in the word counter reaches 760 (380 low-count words).

When the counter reaches 760, all of the low-count data words have been printed out and all that remain in the block of data are the high-count words. The count of 760 in the word counter is indicated by the operation of relays 22H7, 22T6 and 21U0. The operation of contacts 5 of relays 22H7 and 22T6 closes a ground path to energize high-count relay 25HC. Through contacts thereof, connections are established in the printer control circuitry as noted above; and the printing operation continues in the same manner, with the decimal number 760 being printed adjacent the first high-count word by printer 2610. The last high-count word to be printed out, therefore, for the exemplary block of data containing 122 such words, will be at word count 1002. The word count will have recycled and will be in the decimal state 002. The last word printed out for the block of data, printed adjacent the identifying number 002, contains the error count from summarization store register location 0 and the decimal number 00 from summarization store register location 1.

When the word counter is in the last state for the block of data being printed out, registering the count 002, relays 21U2, 22T0 and 22H0 will be operated. Therefore, when relay 26P4 is operated the make portion of contact 1 of print relay 26PR for this last print cycle, a path is closed to operate last word relay 210NR1 which locks up through its contact 1 and contact 10 of relay 26SC. The operate path completed for relay 210NR1 when the word counter is in its last state is through contacts 11 of relays 21U1, 22T0 and 22H0, contact 3 of relay 26P4 and contact 55 of high-count relay 26HC. The word count 1002 is distinguished from the word count of 002 by the operation of high-count relay 25HC for the former word count, contact 55 of relay 25HC being in the operate path of relay 210NR1. Contact 3 of relay 210NR1 disrupts the circuit to recorder start reverse circuitry 26RSR, and contact 4 of relay 210NR1 connects battery to recorder stop circuitry 26RS to prevent any further movement of recorder 1510. Upon the completion of the printing operation and the release of print relay 26PR to operate relay 26P2, a path is closed through contact 2 of relay 26P2 and contact 2 of relay 210NR1 to operate relay 260NR2, indicating that the entire block of data has been printed out. Operation of contact 1 of relay 260NR2 removes the holding ground from relay 260N. Release of relay 260N extinguishes lamp 260NL, releases relay 26P2 and thus relay 260NR2, and resets flip-flop 26SCD, through obvious paths. The reset state of flip-flop 26SCD deenergizes relay 26SC1, thus releasing relay 26SC, thereby removing the ground connections from the word counter and the printer control circuitry. Release of relay 26SC also releases relay 20MD to remove the ground connections from translators 23BD1 through 23BD4 and to disconnect relays 20R1 through 20R18 from leads RR1 through RR18. Further, release of relay 26SC releases relay 210NR1 and relay 26P1, thereby opening the operate path of relay 26CP; and the operate path of relay 28RMC in the program circuit is reestablished for subsequent mode C operation. Recorder 1510 is now ready for another mode C processing cycle to store another block of data therein, or another mode D cycle may be initiated to print out another block of data from recorder 1510.

*Automatic mode D operation*

If desired, a mode D cycle of operation may be commenced automatically following the completion of a mode C cycle of operation by priorly operating automatic mode D switch 26AMD–SW. When mode C operation is initiated, flip-flop 28CR is set, operating relay 28RMC. This completes a path through contact 5 of relay 28RMC to operate relay 26TC, which locks up to ground through its contact 1 and unoperated contact 10 of relay 20MD. Assuming automatic mode D switch 26AMD–SW to be operated, the operation of contact 2 of relay 26TC energizes relay 26TM. Contacts 3 of relays 26TC and 26TM complete a path to operate relay 260N to begin mode D operation. The operation of this relay chain to begin mode D operation is sufficiently slow to permit the completion of mode C operation and the stopping of recorder 1510. From this point on the mode D cycle of operation is substantially the same as described above, except that mode D scanning is omitted since the desired block of data has just been recorded on recorder 1510. Instead of the detect signal from AND gate 2010 on lead DS to set flip-flop 26SCD and initiate the mode D printing operation, flip-flop 26SCD is set through the enablement of AND gate 2650 by operated contact 2 of relay 26TM and the steering pulse on lead L12 corresponding to the twelfth bit of the first word of the block of data to be printed out.

It is to be understood that the above-described arrangements are but illustrative of the application of the principles of applicants' invention. Numerous other arrangements may be devised by those skilled in the art without departing from the spirit and scope of the invention.

What is claimed is:

1. A data system for processing indications representative of the presence of predetermined conditions on particular units of equipment comprising means for receiving said indications from a plurality of equipment monitoring apparatus individually associated with respective pluralities of said particular units of equipment and for recording said indications on a magnetic storage medium in individual channels each of which is associated with one of said plurality of equipment monitoring apparatus, each of said indications being encoded to peculiarly identify one of said particular units of equipment, means for sorting and summarizing said encoded indications in accordance with the respective ones of said particular units of equipment from which said indications were derived, means for recording the summarized indications on a final storage medium in blocks individually identifiable with one of said plurality of equipment monitoring apparatus, and means settable in accordance with individual of said plurality of equipment monitoring apparatus for selectively printing a record of the summarized indication identifiable therewith.

2. A data system in accordance with claim 1 wherein said sorting and summarizing means includes means for sorting and summarizing said encoded indications on both an individual basis and a group basis, said individual basis providing summarized indications corresponding to individual ones of said particular units of equipment and said group basis providing summarized indications corresponding to predetermined groupings of said particular units of equipment.

3. A data system in accordance with claim 1 wherein said blocks of summarized indications are individually identified by identity information peculiarly signifying the equipment monitoring apparatus from which each of said blocks of summarized indications were derived and wherein said data system further comprises means for distinguishing between said encoded indications and said identity information and for recording said identity information on said final storage medium adjacent the respective blocks of summarized indications.

4. A traffic data processing system comprising means for receiving traffic indications and associated identity data from a plurality of traffic observing circuits simultaneously and for temporarily storing said traffic indications and said associated identity data in individual locations corresponding to respective ones of said plurality of traffic observing circuits, each of said traffic indications being encoded to peculiarly identify a particular unit of equipment at which a predetermined condition has been observed and said associated identity data being encoded to peculiarly identify one of said plurality of traffic observing circuits, means for distinguishing between said traffic indications and said associated identity data, recording means, first means responsive to said distinguishing means for sorting and summarizing said traffic indications in accordance with respective ones of said particular units of equipment whereat said predetermined condition has been observed and for transferring said summarized traffic indications to said recording means, and second means responsive to said distinguishing means for transferring said associated identity data to said recording means.

5. A traffic data processing system in accordance with claim 4 wherein said first and second means comprise a storage medium having first storage locations respectively associated with said particular units of equipment and second storage locations for temporarily storing said associated identity data, and wherein said first means includes circuitry for storing a count of said traffic indications in individual of said first storage locations corresponding to said particular units of equipment from which said traffic indications are derived and said second means includes circuitry for directing said associated identity data to said second storage locations.

6. A traffic data processing system in accordance with claim 5 further comprising means including said recording means for selectively generating a record of said summarized traffic indications and said associated identity information.

7. A traffic data processing system comprising input storage means for receiving and storing traffic data and associated identity data at a first speed simultaneously from a plurality of traffic observing equipments, said traffic data comprising encoded indications which signify the observation of predetermined conditions on peculiarly identified units and said identity data comprising encoded indications peculiarly identifying one of said plurality of traffic observing equipments, detector means for reading out said stored traffic data and associated identity data from said input storage means at a second speed, means for distinguishing between said traffic data and said identity data, and means responsive to said distinguishing means for sorting and summarizing said traffic data in accordance with each of said peculiarly identified units from which said traffic data was derived and for providing a record of the summarized traffic data and said associated identity data.

8. A traffic data processing system in accordance with claim 7 wherein said input storage means comprises a magnetic storage medium having a plurality of storage channels individually corresponding to respective ones of said plurality of traffic observing equipments, said magnetic storage medium being operative in either the forward or the reverse direction to receive said traffic data and associated identity data, the combination further comprising means for performing the read out of said traffic data and associated identity data while said magnetic storage medium is operating in the forward direction or the reverse direction without regard to the direction of operation of said magnetic storage medium during the receipt of said traffic data and associated identity data.

9. A traffic data processing system in accordance with claim 8 wherein said last-mentioned means includes transfer circuitry connected to said sorting and summarizing means and operative in accordance with the direction of operation of said magnetic storage medium during the receipt of said traffic data and associated identity data.

10. A system for processing multibit data words representative of the presence of predetermined conditions on particular units of equipment comprising means for receiving said multibit data words simultaneously from a plurality of equipment monitoring apparatus individually associated with respective pluralities of said particular units of equipment and for recording said multibit data words serially on a storage medium in individual locations each of which is associated with one of said plurality of equipment monitoring apparatus, said storage medium recording the individual bits of each of said multibit data words in a first time sequence, means for detecting said individual bits of said recorded multibit data words in either said first time sequence or in a second time sequence which is the reverse of said first time sequence, means for sorting and summarizing said multibit data words in accordance with respective ones of said particular units of equipment from which said data words were derived, transfer means responsive to said detecting means for directing the individual bits of each of said recorded multibit data words to said sorting and summarizing means in said first time sequence regardless of whether said multibit data words are detected in said first time sequence or said second time sequence, and means connected to said sorting and summarizing means and operative to provide a record of the summarized data words which is peculiarly identifiable with one of said plurality of equipment monitoring apparatus.

11. A system for processing indications individually representative of the presence of predetermined conditions on particular units of equipment comprising means for receiving said indications simultaneously from a plurality of equipment monitoring apparatus individually associated with respective pluralities of said particular units of equipment and for serially recording said indications on a magnetic surface in respective channels individually associated with one of said plurality of equipment monitoring apparatus, means operative for sensing said indications recorded in first alternate ones of said channels in a first time sequence and for sensing said indications recorded in second alternate ones of said channels distinct from said first alternate ones in a second time sequence, said second time sequence being the reverse of said first time sequence, means responsive upon the receipt of indications in said first time sequence for sorting and summarizing said indications in accordance with individual of said particular units of equipment, reversible steering means operated by said sensing means for providing said recorded indications in both said first alternate channels and said second alternate channels to said sorting and summarizing means in said first time sequence, and means selectively connected to said sorting and summarizing means and operative to provide a permanent record of the summarized indications.

12. A traffic data processing system comprising input storage means for storing traffic data and identity data from a plurality of observed units in the form of coded signals, detector means for reading said coded signals and for distinguishing between traffic data and identity data, summarization storage means having a plurality of traffic data registers and a plurality of identity data registers, each of said traffic data registers individually associated with one of said plurality of observed units, means responsive to said detector means for transferring said identity data directly to said identity registers, address translation circuitry responsive to said detector means for selectively addressing said traffic data registers, add-one circuitry controlled by said detector means for numerically increasing the data stored in the traffic registers addressed by the address translation circuitry, semipermanent storage means, means for successively scanning said summarization storage registers, and means responsive to said scanning means for transferring the data stored in said summarization storage register to said semipermanent storage means.

13. A traffic data processing system in accordance with claim 12 wherein said add-one circuitry comprises translator means responsive to input data corresponding to a first encoded number for providing output data corresponding to a second encoded number numerically one greater than said first encoded number, sensing means for directing data stored in individual ones of said traffic registers addressed by the address translation circuitry to the input of said translator means, and means connected to the output of said translator means for directing said numerically increased data to said individual ones of said traffic registers.

14. A traffic data processing system in accordance with claim 13 wherein said means for transferring said identity data directly to said identity registers includes said translator means and comprises means responsive to said detector means for inhibiting the add-one operation of said translator means such that the output data therefrom corresponds to the identity data provided to the input thereof.

15. A traffic data processing system comprising input storage means for storing traffic indications and identity data from a plurality of observed units in the form of coded signals, each indication representing the presence of a predetermined condition on one of said plurality of observed units, means for reading said coded signals, means connected to said reading means for distinguishing between said traffic indications and said identity data, summarization storage means having a plurality of storage registers, a first portion of said plurality of storage registers being individually associated with respective ones of said plurality of observed units for maintaining a count of the traffic indications therefrom, a second portion of said plurality of storage registers being arranged for storing said identity data, first gating means responsive to said distinguishing means for transferring said identity data directly to said second portion of said plurality of storage registers, address register means, second gating means responsive to said distinguishing means for transferring said traffic indications to said address register means, translator means connected to said address register means and operative to select individual ones of said first portion of storage registers in accordance with each traffic indication transferred to said address register means, and add-one circuitry controlled by said distinguishing means for numerically increasing the count stored in said individual storage register selected by said translator means.

16. A traffic data processing system in accordance with claim 15 wherein said summarization storage means includes a third portion of said plurality of storage registers individually associated with predetermined groups of said plurality of observed units, the combination further comprising means including said address register means for modifying said traffic indications in accordance with said predetermined groups such that said translator means is operative to select said individual ones of said third portion of storage registers associated with said predetermined groups.

17. A data processing system for processing recorded data in the form of encoded indications individually associated with respective ones of a plurality of units of equipment comprising means for reading said recorded data, means responsive to said reading means for decoding and sorting said encoded indications in accordance with said associated units of equipment, first means controlled by said sorting means for selectively counting the number of said indications associated with each of said units of equipment, means including said decoding and sorting means for individually modifying said encoded indications to provide group indications associated with predetermined groups of said units of equipment, second means controlled by said sorting means for selectively counting the number of said group indications associated with said predetermined groups of said units of equipment, and means responsive to said first and second means for providing a record corresponding to the respective counts of said individual indications associated with each of said units of equipment and of said group indications.

18. A traffic data processing system comprising input storage means for receiving traffic indications and associated identity data from a plurality of monitoring circuits simultaneously and for storing said traffic indications and said associated identity data in individual locations corresponding to respective ones of said plurality of monitoring circuits, each of said traffic indications being encoded to peculiarly identify a particular unit of equipment at which one of said plurality of monitoring circuits detected a predetermined condition, said associated identity data being encoded to peculiarly identify said one of said plurality of monitoring circuits, means for distinguishing between said traffic indications and said associated identity data stored in said input storage means, reading means for providing the traffic indications and associated identity data from one of said individual locations of said input storage means to said distinguishing means, summarization storage means having a first storage portion and a second storage portion, first means responsive to said distinguishing means for sorting and summarizing said traffic indications in accordance with respective one of said particular units of equipment and for transferring the summarized indications to said first storage portion of said summarization storage means, second means responsive to said distinguishing means for transferring said associated identity data to said second storage portion of said summarization storage means, output storage means, means for detecting the completed transfer and summarization of the traffic indications and the transfer of the associated identity data from said one of said individual locations of said input storage means to said summarization storage means, and means connected to said summarization storage means and operative in response to said detecting means for transferring said summarized traffic indications and associated identity data to said output storage means.

19. A traffic data processing system in accordance with claim 18 further comprising recording means responsive to the completed transfer of said summarized traffic indications and associated identity data to said output storage means for printing a record thereof, said printing being performed concurrently with the sorting and summarization of the traffic indications from another of said individual locations of said input storage means.

20. A traffic data processing system in accordance with claim 18 further comprising means operative concurrently with said first means and said second means and responsive to the completed transfer of said summarized traffic indications and said associated identity data to said output storage means for generating a record thereof.

21. A traffic data processing system in accordance with claim 19 further comprising means for selectively inhibiting the operation of said last-mentioned means to generate a record of the summarized traffic indications and associated identity data derived from only particular ones of said individual locations of said input storage means.

22. A traffic data processing system comprising means for receiving and storing traffic data and associated identity data from a plurality of observed units in the form of coded signals, means for reading said coded signals and for distinguishing between traffic data and identity data, intermediate storage means, means for sorting and summarizing said traffic data in accordance with respective ones of said plurality of observed units and for transferring said summarized data to said intermediate storage means, means for modifying at least a portion of said identity data to provide a unique coded indication and for transferring said identity data including said modified portion to said intermediate storage means, and means coupled to said intermediate storage means and operative in response to the concurrent detection of said identity data and said unique coded indication for printing a record of said identity data and said traffic data associated therewith.

23. A traffic data processing system in accordance with claim 22 wherein said identity data identifies a particular plurality of observed units and wherein said last-mentioned means is settable in accordance with said plurality of observed units to recognize said associated identity data for selectively printing a record of said identity data and said traffic data associated therewith.

24. A traffic data processing system comprising input storage means for receiving and storing encoded indications from a plurality of observed units, each indication peculiarly identifying a particular one of said plurality of observed units at which a predetermined condition has been detected, a detector circuit connected to said input storage means for reading said encoded indications, access register means, first gating means connected to said detector means for directing individual encoded indications to said access register means, address register means, control means, second gating means responsive to said control means for directing said individual encoded indications from said access register means to said address register means, summarization storage means having a plurality of storage registers respectively corresponding to particular ones of said plurality of observed units for maintaining a count of the encoded indications detected therefrom, translator means connected to said address register means and operative in response to each of said individual encoded indications to select a respective corresponding storage register in said summarization storage means, and add-one circuitry including said access register means and responsive to said control means for numerically increasing the count maintained at said selected storage register.

25. A traffic data processing system in accordance with claim 24 wherein said add-one circuitry comprises sensing means for transferring the count maintained at said selected storage register to said access register means, logic means connected to said access register means for providing a count which is numerically one greater than the count in said access register means, and means for directing said numerically greater count to said selected storage register.

26. A traffic data processing system in accordance with claim 24 further comprising means for sorting and summarizing the encoded indications from particular ones of said observed units arranged in predetermined groupings, the combination comprising a plurality of group storage registers individually associated with respective ones of said predetermined groupings, means for determining the grouping of each of said encoded indications directed to said address register means and for modifying said encoded indications, said translator means being responsive to said modified indications to select the respective group storage register associated with said grouping, and said add-one circuitry numerically increasing the count stored thereat.

References Cited by the Examiner

UNITED STATES PATENTS

| | | | |
|---|---|---|---|
| 2,767,246 | 10/1956 | Betallack | 179—7 |
| 2,885,658 | 5/1959 | Spielberg | 179—7 |
| 3,027,544 | 3/1962 | Atkinson et al. | 340—172.5 |
| 3,040,300 | 6/1962 | Rabenda et al. | 340—172.5 |
| 3,067,290 | 12/1962 | Greenaway et al. | 179—7 |

ROBERT C. BAILEY, *Primary Examiner.*

MALCOLM A. MORRISON, *Examiner.*